US006469751B1

(12) United States Patent
Isobe et al.

(10) Patent No.: US 6,469,751 B1
(45) Date of Patent: Oct. 22, 2002

(54) REMOTE CONTROL DEVICE AND COMPUTER READABLE RECORDING MEDIUM FOR RECORDING A REMOTE CONTROL PROGRAM

(75) Inventors: Yasuhiko Isobe, Kanagawa (JP); Teruo Otake, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/441,079

(22) Filed: Nov. 16, 1999

(30) Foreign Application Priority Data

Jul. 16, 1999 (JP) ........................................... 11-203882

(51) Int. Cl.[7] .................................................. H04N 5/44
(52) U.S. Cl. ........................ 348/734; 348/522; 340/3.5; 340/825.22
(58) Field of Search ................................. 348/552, 734; 340/2.24, 3.43, 3.1, 3.5, 5.5, 825.22; 709/208, 209; 700/9, 11, 19, 23, 86

(56) References Cited

U.S. PATENT DOCUMENTS

| 5,086,385 A | * | 2/1992 | Launey et al. ............... 364/188 |
| 5,410,326 A | * | 4/1995 | Goldstein .................... 348/134 |
| 5,909,183 A | * | 6/1999 | Burgstahl et al. ......... 340/825.22 |
| 6,108,685 A | * | 8/2000 | Kutzik et al. ................ 709/200 |
| 6,243,707 B1 | * | 6/2001 | Humpleman et al. ........ 707/102 |

FOREIGN PATENT DOCUMENTS

| JP | 2-217023 | 8/1990 |
| JP | 3-241555 | 10/1991 |
| JP | 3-280120 | 12/1991 |
| JP | 6-124309 | 5/1994 |
| JP | 7-6027 | 1/1995 |
| JP | 7-65075 | 3/1995 |
| JP | 8-36548 | 2/1996 |

* cited by examiner

Primary Examiner—Victor R. Kostak
(74) Attorney, Agent, or Firm—Staas & Halsey LLP

(57) ABSTRACT

In the remote control device a receiver receives a signal corresponding to a command issued from a remote controller group to a control object appliance. A command string analyzing section registers in a database in a nonvolatile memory a plurality of commands received by the receiver as a command string. When a command is issued from the remote controller group, then a command issuing section retrieves a command string containing this command from the database, estimates the issued command based on the retrieval result, and issues the command. A transmitter transmits the issued command to the control object appliance as a command signal.

12 Claims, 41 Drawing Sheets

FIG.10A

USER REGISTRATION TABLE

| INPUT COMMAND | ISSUED COMMAND |
|---|---|
| A1A2 | A1A2B1B5A5 |
| B3A2 | B3A2C1B1F2G1A5 |
| . | . |
| . | . |
| . | . |

FIG.10B

| A4B3 | A4B3C5 |

FIG.12A

| INPUT COMMAND | ISSUED COMMAND | ADDITION POINT |
|---|---|---|
| A1A2 | A1A2A3 | +50 |
|  | A1A2A4 | +30 |
|  | A1A2A5 | +10 |

FIG.12B

| COMMAND (STRING) | PROBABILITY | BEFORE CHANGE | AFTER CHANGE |
|---|---|---|---|
| A1A2 | 5% | 5 POINT | 5 POINT |
| A1A2A2 | 60% | 60 POINT | 60 POINT |
| A1A2A3 | 20% | 20 POINT | 70 POINT |
| A1A2A4 | 10% | 10 POINT | 40 POINT |
| A1A2A5 | 5% | 5 POINT | 15 POINT |

FIG.14A

DATABASE (LOG)

| COMMAND |
|---|
| A1A2 |
| A1A2 |
| A1B2 |
| A1A3A2 |
| A4 |
| B2A2 |
| A1A2A3 |
| A2A4 |
| A2B5 |
| A1A2A3 |
| A2A5 |
| A1A2A3 |
| B2E5 |
| A1A2A3 |
| B5B9 |
| A1A2A4 |
| B3B3B2AB |
| A1A2A4 |
| A1B2 |
| A1A2A3 |
| A1A3A2 |
| . |
| . |

FIG.14B

LIST OF COMMANDS HAVING A HIGH FREQUENCY

| COMMAND |
|---|
| A1A2 |
| A1A2 |
| A1B2 |
| A1A3A2 |
| |
| |
| A1A2A3 |
| |
| |
| A1A2A3 |
| |
| A1A2A3 |
| |
| A1A2A3 |
| |
| A1A2A4 |
| |
| A1A2A4 |
| A1B2 |
| A1A2A3 |
| A1A3A2 |

FIG.14C

| COMMAND | FREQUENCY OF OCCURRENCE |
|---|---|
| A1A2 | 2 |
| A1A2A3 | 5 |
| A1A2A4 | 2 |
| A1A3A2 | 2 |
| A1B2 | 2 |

FIG.14D

| COMMAND | A1 (PROBABILITY) | A1A2 (PROBABILITY) |
|---|---|---|
| A1A2 | 2/13 (15%) | 2/9 (22%) |
| A1A2A3 | 5/13 (38%) | 5/9 (56%) |
| A1A2A4 | 2/13 (15%) | 2/9 (22%) |
| A1A3A2 | 2/13 (15%) | — |
| A1B2 | 2/13 (15%) | — |

FIG.15A

| COMMAND | TIME | DAY |
|---|---|---|
| A1A2 | 06 : 30 | MONDAY |
| A3 | 06 : 45 | MONDAY |
| B1 | 17 : 30 | MONDAY |
| A1A2A2 | 19 : 55 | MONDAY |
| A4 | 06 : 00 | TUESDAY |
| B2A2 | 20 : 00 | TUESDAY |
| A1A2A3 | 20 : 10 | TUESDAY |
| A2A4 | 06 : 30 | WEDNESDAY |
| A2B5 | 20 : 00 | WEDNESDAY |
| A1A2A3 | 20 : 15 | WEDNESDAY |
| A2A5 | 16 : 00 | THURSDAY |
| A1A2A3 | 20 : 00 | THURSDAY |
| B2E5 | 06 : 30 | FRIDAY |
| A1A2A3 | 20 : 00 | FRIDAY |
| B5 | 21 : 05 | FRIDAY |
| A1A2A4 | 11 : 30 | SATURDAY |
| B3AB2A8 | 17 : 00 | SATURDAY |
| A1A2A4 | 21 : 00 | SATURDAY |
| A1B3 | 20 : 00 | SUNDAY |
| A1A2A3 | 20 : 00 | SUNDAY |
| ⋮ | | |

FIG.15B

| COMMAND | TIME | DAY |
|---|---|---|
| A1A2 | 06 : 30 | MONDAY |
| A1A2A2 | 19 : 55 | MONDAY |
| B2A2 | 20 : 00 | TUESDAY |
| A1A2A3 | 20 : 10 | TUESDAY |
| A2A4 | 06 : 30 | WEDNESDAY |
| A2B5 | 20 : 00 | WEDNESDAY |
| A1A2A3 | 20 : 15 | WEDNESDAY |
| A2A5 | 16 : 00 | THURSDAY |
| A1A2A3 | 20 : 00 | THURSDAY |
| B2E5 | 06 : 30 | FRIDAY |
| A1A2A3 | 20 : 00 | FRIDAY |
| A1A2A4 | 11 : 30 | SATURDAY |
| A1A2A4 | 21 : 00 | SATURDAY |
| A1B3 | 20 : 00 | SUNDAY |
| A1A2A3 | 20 : 00 | SUNDAY |

FIG.16

| COMMAND | TOTAL DATA | DATA LIMITED TO CURRENT TIME (FOR EXAMPLE, 20:00±10 MINUTES) | DATA LIMITED TO CURRENT TIME (FOR EXAMPLE, 20:00±10 MINUTES) AND CURRENT DAY (FOR EXAMPLE, MONDAY) | | | | | | |
|---|---|---|---|---|---|---|---|---|---|
| | | | MONDAY | TUESDAY | WEDNESDAY | THURSDAY | FRIDAY | SATURDAY | SUNDAY |
| A1A2 | 1 | 0 | 0 | 0 | 0 | 0 | 0 | 0 | 0 |
| A1A2A2 | 1 | 1 | 1 | 0 | 0 | 0 | 0 | 0 | 0 |
| A1A2A3 | 5 | 4 | 0 | 1 | 0 | 1 | 1 | 0 | 1 |
| A1A2A4 | 2 | 0 | 0 | 0 | 0 | 0 | 0 | 0 | 0 |
| A1B3 | 1 | 1 | 0 | 0 | 1 | 0 | 0 | 0 | 1 |
| A2A4 | 1 | 0 | 0 | 0 | 0 | 0 | 0 | 0 | 0 |
| A2B5 | 1 | 1 | 0 | 1 | 0 | 0 | 0 | 0 | 0 |
| A2A5 | 1 | 0 | 0 | 0 | 0 | 0 | 0 | 0 | 0 |
| B2A2 | 1 | 1 | 0 | 1 | 0 | 0 | 0 | 0 | 0 |
| B2E5 | 1 | 0 | 0 | 0 | 0 | 0 | 0 | 0 | 0 |

DATA LIMITED TO NEXT TEN MINUTES (FOR EXAMPLE, 20:10±10 MINUTES)

DATA LIMITED TO STILL NEXT TEN MINUTES (FOR EXAMPLE, 20:20±10 MINUTES)

FIG.17

| COMMAND | TOTAL DATA | DATA LIMITED TO CURRENT TIME (FOR EXAMPLE, 20:00±10 MINUTES) | DATA LIMITED TO CURRENT TIME (FOR EXAMPLE, 20:00±10 MINUTES) AND CURRENT DAY (FOR EXAMPLE, MONDAY) |
|---|---|---|---|
| A1A2 | 1/10 (10%) | 0/6 | 0/1 |
| A1A2A2 | 1/10 (10%) | 1/6 (17%) | 1/1 (100%) |
| A1A2A3 | 5/10 (50%) | 4/6 (67%) | 0/1 |
| A1A2A4 | 2/10 (20%) | 0/6 | 0/1 |
| A1B3 | 1/10 (10%) | 1/6 (17%) | 0/1 |

FIG.19

| COMMAND (EXPRESSED IN SYMBOL) | COMMAND (EXPRESSED IN CODE) | CONTROL OBJECT APPLIANCE INFORMATION ||| 
|---|---|---|---|---|
| | | CONTENT OF COMMAND | APPLIANCE | MANUFACTURER |
| A1 | 398A 3A00 0001 | ch1 | TV | COMPANY X |
| A2 | 398A 3A00 0002 | ch2 | TV | COMPANY X |
| A3 | 398A 3A00 0003 | ch3 | TV | COMPANY X |
| A4 | 398A 3A00 0004 | ch4 | TV | COMPANY X |
| ... | ... | ... | ... | ... |
| B1 | 458C 5405 | UNKNOWN | UNKNOWN-A | UNKNOWN |
| B2 | 458C 5416 | UNKNOWN | UNKNOWN-A | UNKNOWN |
| B3 | 458C 5427 | UNKNOWN | UNKNOWN-A | UNKNOWN |
| ... | ... | ... | ... | ... |
| C1 | 458C 99AB | ON | VIDEO | COMPANY Y |
| C2 | 458C 99CD | OFF | VIDEO | COMPANY Y |
| ... | ... | ... | ... | ... |

FIG.21

CONTROL OBJECT APPLIANCE INFORMATION

| COMMAND (EXPRESSED IN SYMBOL) | COMMAND (EXPRESSED IN CODE) | CONTENT OF COMMAND | APPLIANCE | MANUFACTURER |
|---|---|---|---|---|
| A1 | 398A 3A00 0001 | ch1 | TV | COMPANY X |
| A2 | 398A 3A00 0002 | ch2 | TV | COMPANY X |
| B2 | 458C 5416 | UNKNOWN | UNKNOWN | UNKNOWN |
| C1 | 458C 99AB | ON | AV AMPLIFIER | COMPANY Y |
| C2 | 458C 99CD | OFF | AV AMPLIFIER | COMPANY Y |
| . | . | . | . | . |
| . | . | . | . | . |

UPDATE ↓

CONTROL OBJECT APPLIANCE INFORMATION

| COMMAND (EXPRESSED IN SYMBOL) | COMMAND (EXPRESSED IN CODE) | CONTENT OF COMMAND | APPLIANCE | MANUFACTURER |
|---|---|---|---|---|
| A1 | 398A 3A00 0001 | ch1 | TV | COMPANY X |
| A2 | 398A 3A00 0002 | ch2 | TV | COMPANY X |
| B1 (☆) | 458C 5405 | SW-ON | VIDEO | COMPANY FJ |
| B2 (☆) | 458C 5416 | SW-OFF | VIDEO | COMPANY FJ |
| B3 (☆) | 458C 5427 | Play | VIDEO | COMPANY FJ |
| B4 (☆) | 458C 5438 | Stop | VIDEO | COMPANY FJ |
| C1 | 458C 99AB | ON | AV AMPLIFIER | COMPANY Y |
| C2 | 458C 99CD | OFF | AV AMPLIFIER | COMPANY Y |
| . | . | . | . | . |
| . | . | . | . | . |

FIG.23

| COMMAND | PROBABILITY BEFORE CORRECTION | PROBABILITY AFTER CORRECTION |
|---|---|---|
| A1B2B5 | 1/10 (10%) | 1/2 (50%) |
| A1A3A4 | 1/10 (10%) | |
| A1A3A4A6 | 4/10 (40%) | |
| A1A3A4A6A8 | 2/10 (20%) | |
| A1B2B4 | 1/10 (10%) | 1/2 (50%) |
| A1Z1 | 1/10 (10%) | |

FIG.29A

| COMMAND FOR TOGGLE OPERATION (EXPRESSED IN SYMBOL) | EXAMPLE OF TOGGLE OPERATION | COMMAND FOR TOGGLE OPERATION DETERMINATION (EXPRESSED IN SYMBOL) |
|---|---|---|
| B0↔B0 | CASE WHERE TV-ON AND OFF ARE A SAME COMMAND | B0 (1), B0 (2) |
| C0↔C0 | CASE WHERE VIDEO-ON AND OFF ARE A SAME COMMAND | C0 (1), C0 (2) |
| B1→B1→B1→ | CASE WHERE TV VIDEO INPUT IS CHANGED IN COMMAND, LIKE VIDEO1→VIDEO2→VIDEO3→VIDEO1 | B1 (1), B1 (2), B1 (3) |

FIG.29A

| BEFORE REPLACEMENT | AFTER REPLACEMENT |
|---|---|
| A1B0B1A2 | A1B0 (1)B1(1)A2 |
| B0B0 | B0 (1) B0 (2) |
| B0A1 | B0 (1) A1 |
| · · | · · |

FIG.37A

| COMMAND |
|---|
| A1A2 |
| A1A2D1 |
| B2A2 |
| A1A2A3 |
| A2A4 |
| A2B5 |
| A1A2A3 |
| A2A5 |
| A1A2A3 |
| B2E5 |
| A1A2A3 |
| A1A2D1 |
| A1A2D1 |
| A1B3 |
| A1A2A3 |
| B1D1 |

FIG.37B

| COMMAND | TOTAL DATA | HEAD COMMAND AGREEMENT UPON D1 INPUT (FREQUENCY/ PROBABILITY) | LAST COMMAND AGREEMENT UPON D1 INPUT(FREQUENCY/ PROBABILITY) |
|---|---|---|---|
| A1A2 | 1 | 0 | 0 |
| A1A2A3 | 5 | 0 | 0 |
| A1A2D1 | 3 | 0 | 3 (75%) |
| A1B3 | 1 | 0 | 0 |
| A2A4 | 1 | 0 | 0 |
| A2B5 | 1 | 0 | 0 |
| A2A5 | 1 | 0 | 0 |
| B2A2 | 1 | 0 | 0 |
| B2E5 | 1 | 0 | 0 |
| B1D1 | 1 | 0 | 1 (25%) |

REMOTE CONTROL DEVICE AND COMPUTER READABLE RECORDING MEDIUM FOR RECORDING A REMOTE CONTROL PROGRAM

FIELD OF THE INVENTION

The present invention relates to a remote control device for remote-controlling a plurality of appliances such as TV sets, video sets and the like and a computer readable recording medium for recording the remote control program. More particularly, this invention relates to a remote control device that is easy to use and a computer readable recording medium for recording the remote control program.

BACKGROUND OF THE INVENTION

Recently, with an increase in the performance, decrease in the size and price of a microprocessor, remote controllers have been provided with household electrical appliances (hereinafter referred to as control object appliance) such as TV sets, video sets, audio visual (AV) devices and the like for controlling the operation of these control object appliance remotely. The control object appliance can be controlled from a remote place without being touched by the user so that the operability thereof is improved. However, the number of remote controllers increase with an increase in the number of household electrical appliances and the remote controllers must be used selectively depending upon the control object appliance. Therefore, there occurs a problem that the operability drops. A means for solving this problem effectively has been demanded.

As described above, conventionally, one remote controller is provided with each of the control object appliances and the remote control is performed with the help of infrared rays or the like. As a result, when a number of control object appliances are to be controlled then the corresponding remote controllers are required to be operated successively. For example, when a user wants to operate both a TV set and video set, then the user presses the 'power key' of the remote controller corresponding to the TV set and successively presses the 'power key' of the remote controller corresponding to the video set. Consequently, after the power of the TV set is turned ON, the power of the video set is turned ON.

The user then presses a desired 'channel' key of the is remote controller corresponding to the TV set and further presses a 'record' key of the remote controller corresponding to the video set. Consequently, after the desired channel is displayed on the TV set the video set starts the recording of the program on that channel. Accordingly, a complicated operation involving a plurality of remote controllers is required to be performed when remote controlling a plurality of appliances.

In order to solve the above problem, there is disclosed in Japanese Patent Application Laid-Open No. 3-241555 a multi-remote controller capable of remote-controlling a plurality of control object appliances with a single remote controller. This kind of the multi-remote controller is provided with an individual registration function and a learning function. The individual registration function is a function in which each of the functions of the plurality of the remote controllers are individually registered in correspondence to different keys. The learning function is a function in which a plurality of functions are registered in correspondence to a single key.

When functions of the plurality of the remote controllers are to be registered individually with the respective keys of the multi-remote controller then the remote controller and multi-remote controller are positioned in such a way that they face each other and the user presses the remote controller key. The multi-remote controller thus receives a command from the remote controller and registers a function of the remote controller in correspondence to a key selected beforehand. By repeating such a registration procedure the user registers each function of the plurality of the remote controllers in the multi-remote controller.

On the other hand, when a plurality of functions of the remote controller are to be registered with a key of the multi-remote controller then the user carries out a series of operations (for example, pressing the 'power' key—pressing the 'channel' key—pressing the 'volume' key etc.). After the multi-remote controller receives commands transmitted in succession corresponding to a series of operations as a command string, it makes the received command string correspond to a the selected key so as to register the plurality of functions with this key. When such a key is pressed then a signal corresponding to the command string is transmitted to the control object appliance and a series of operations is performed just by a one-touch operation.

Further, conventionally, a remote control device constituted of a computer having the above described multi-remote controller function has been proposed. In this remote control device a personal computer is combined with an infrared (IR) commander for transmitting a command signal to a control object appliance. A plurality of commands in a plurality of remote controllers are stored beforehand in a storage device and a sending order of the plural commands is programmed for a series of operations. Then, like the multi-remote controller, a command string signal is transmitted from the IR commander to the control object appliance.

As described above, with the emergence of the multi-remote controller or the remote control device constituted of a computer, the problem that a plurality of remote controllers are required to be operated separately in a troublesome way is solved.

However, because the conventional multi-remote controller or the remote control device constituted of a computer require a very complicated registration procedure this system is also not easy to use. Therefore, an ordinary user, particularly a user who is not accustomed to the electronic appliances will not possibly use such a multi-remote controller because the above registration procedure is complicated, or will preferably use the separate remote controllers even if they are unconvertible to use.

SUMMARY OF THE INVENTION

The present invention has been made in light of the above problem. It is an object of this invention to provide a remote control device capable that is easy to use because it does not require a complicated registration procedure to be performed by the user, and to provide a computer readable recording medium for recording a remote control program.

According to the first aspect of the invention, if the user carries out a serial operation of remote control, a plurality of commands are issued continuously from the plurality of the command issuing unit so that a control object appliance corresponding to a command is remote-controlled. At this time, the above plural commands are monitored by the monitoring unit and registered in a database as a command string by the database registering unit. This operation is repeated, so that a plurality of commands relating to the serial operation of the user are registered in the database.

If at least a command is issued from a plurality of command issuing units by the user operation, the estimating unit retrieves a command string containing the issued command from the database and estimates a command having the highest probability of occurrence as a command which will be issued by a plurality of command issuing units according to this retrieval result, for example. Then, if the above estimated command is issued by the command issuing unit instead of the plurality of the command issuing units, the given control object appliance is remote-controlled.

According to the first aspect, as described above, a monitoring result of commands issued from the plurality of the command issuing units is held as a command string in the database and a command to be issued from the plurality of the command issuing units based on this database is automatically issued by the estimated command issuing unit. Thus, ease of use by the user can be improved without a necessity of troublesome registering operation on the user side.

According to the second aspect of the invention, a monitoring result on commands issued from the plurality of command issuing units is held in the database with time information (for example, time, day, date) and based on this database, commands to be issued from the plurality of the command issuing unit are estimated with time information as one of determining criteria. Thus, the accuracy of an estimated command can be improved and further ease of use by the user can be improved.

According to the third aspect, the estimating unit deletes unnecessary command strings (for example, a command string composed of a plurality of commands for channel selection) from a retrieved command string with a content of the command (for example, channel selection of the TV set) as one of determining criteria so as to narrow down the retrieval result. Further, the content of a command is estimated by the estimating unit based on the narrowed retrieval result. That is, according to the third aspect of the invention, by referring to the content of a command as one of determining criteria, a command can be estimated based on an effective command string, so that the accuracy of the estimated command can be improved.

According to the fourth aspect of the invention, if a command is issued from the plurality of the command issuing units, the estimating unit retrieves a command string that command in the database and then according to this retrieval result, estimates a command to be issued by the plurality of the command issuing units. That is, according to the fourth embodiment, by carrying out a procedure which is usually performed last at first of a serial operation, the serial remote control operation is automatically carried out by a single operation. Therefore, ease of use by the user can be improved remarkably.

According to the fifth embodiment of the invention, if a command is estimated by the estimating unit, the approval unit inquires of the user whether or not the command estimation is right. Then, if the user's approval is obtained via the approval unit, the estimated command issuing unit issues an estimated command. On the other hand, if the user's approval is not obtained, in other words, there is a mistake in command estimation, the estimated command issuing unit does not issue the estimated command. Thus, according to the fifth aspect of the invention, the estimated command is not issued until the user's approval is obtained. Therefore, the accuracy of the estimated command can be improved remarkably and a waste remote control can be avoided.

According to the sixth aspect of the invention, if the user operating a plurality of command issuing units is specified by the user specifying unit, the database registering unit registers a command string in a database-dedicated for the user. That is, according to the sixth aspect, an individual database is provided for each user. Further, the estimating unit estimates a command by using the database dedicated for the user. That is, according to the sixth aspect of the invention, a dedicated database is provided for each user. Therefore, as compared to a case in which a single database is shared by a plurality of users, the command estimation can be done with the user's own interest and active pattern reflected, thereby the accuracy of the estimated command being improved.

According to the seventh aspect of the invention, state information (for example, power ON, OFF) is obtained from the control object appliance by the state information obtaining unit. Then, the estimating unit estimates a command with the state information as one of determining criteria. For example, if it is determined that an issue of an initially estimated command is waste based on state information, it is possible to estimate a command again. That is, according to the seventh aspect of the invention, the command estimation is carried out considering the state of the control object appliance. Therefore, the command estimation can be carried out accurately, thereby the reliability being improved.

According to the eighth aspect of the invention, in the schedule estimating unit, an issue schedule (for example, every day or a particular day of every week) for commands to be issued by the plurality of the command issuing units is estimated with time information (for example, time, day, date) as one of determining criteria. Then, an estimated command is automatically issued by the estimated command issuing unit according to the issue schedule, so that the control object appliances are remote-controlled. That is, according to the eighth aspect of the invention, a command is automatically issued according to the issue schedule based on the database, so that a troublesome schedule setting does not have to be carried out on the user side, thereby ease of use by the user being further improved.

According to the ninth aspect of the invention, when a serial operation about remote control is carried out by the user, a plurality of commands are issued continuously by a plurality of command issuing units, so that respective control object appliances corresponding to the command are remote-controlled. At this time, those plural commands are monitored in the monitoring step and registered in the database as a command string in the database registering step. By repeating this operation, a plurality of command strings about a serial operation by the user are registered in the database.

Here, when at least a command is issued from a plurality of the command issuing units by the user's operation, a command string containing the issued command is retrieved in the estimating step. Based on this retrieval result, for example, a command string having the highest probability of occurrence is estimated as a command string to be issued by the plurality of the command issuing units. Then, in the estimated command issuing step, the above estimated command string is issued instead of the plurality of the command issuing units so as to achieve remote control on the control object appliance.

According to the ninth aspect of the invention, a command monitoring result issued from the plurality of the command issuing units is held in the database as a command string and based on this database, a command string to be issued from the plurality of the command issuing units is automatically issued in the estimated command issuing step. Therefore, ease of use by the user can be improved without a necessity of complicated registering operation on the user side.

According to the tenth aspect of the invention, in the schedule estimating step, an issue schedule (for example, every day or a particular time of every week) for commands to be issued from the plurality of the command issuing units is estimated with time information (for example, time, day, date) as one of criteria. Then, in the estimated command issuing step, the estimated command is automatically issued according to the above issue schedule, so that the control object appliance is remote-controlled. That is, according to the tenth aspect of the invention, a command is automatically issued according to the issue schedule based on the database. Therefore, a troublesome schedule setting does not have to be carried out on the user side, thereby ease of use by the user being further improved.

Other objects and features of this invention will become understood from the following description with reference to the accompanying drawings.

BRIEF DESCRIPTION OF THE DRAWINGS

FIG. 10 is a diagram showing a user registration table in the first operating example of the first embodiment;

FIG. 12A and FIG. 12B are diagrams for explaining the command estimation processing in the second operating example of the first embodiment;

FIG. 14A to FIG. 14D are diagrams for explaining the command estimation processing in the third operating example of the first embodiment;

FIG. 15A and FIG. 15B are diagrams showing an example of a database according to the first embodiment;

FIG. 16 is a diagram showing an another example of the database according to the first embodiment;

FIG. 17 is a diagram for explaining the command estimation processing in the third operating example of the first embodiment;

FIG. 19 is a diagram showing an example of a database including information on control object appliance according to the second embodiment;

FIG. 21 is a diagram for explaining an update operation of the database according to the second embodiment;

FIG. 23 is a diagram for explaining the first operating example of the second embodiment;

FIG. 29A and FIG. 29B are diagrams showing a database according to the fourth embodiment;

FIG. 37A and FIG. 37B are diagrams for explaining the command estimation processing according to the seventh embodiment;

DESCRIPTION OF THE PREFERRED EMBODIMENTS

Hereinafter, first to eighth embodiments of a remote control device and a computer readable recording medium for recording a remote control program according to the present invention will be described in detail with reference to the accompanying drawings.

Figure 1:
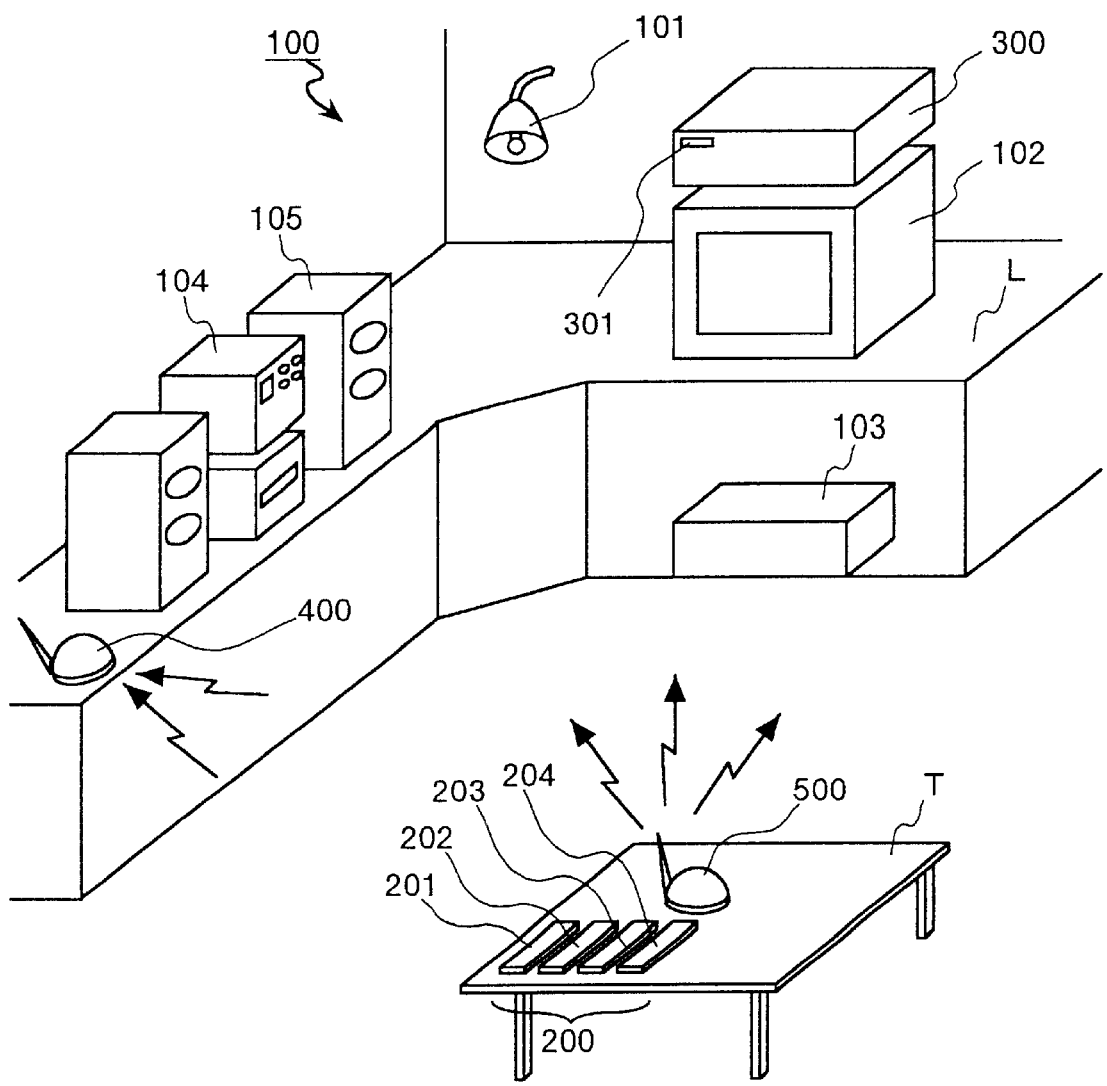
FIG. 1 is a perspective view showing the outer appearance of a first embodiment of the present invention.

FIG. 1 is a perspective view showing an outer appearance of the first embodiment of the present invention. A remote control system to which a remote control device 300 described below is applied is shown. A control object appliance group 100 includes household electrical appliances remote-controlled by a remote control device 300 or remote controller group 200 via radio like infrared ray. As the examples of the control object appliance group 100, a lamp 101, a TV set 102, a video set 103 and an audio-visual (AV) amplifier 104 are shown. These control object appliances are accommodated in the rack L.

The TV set 102, the video set 103 and the AV amplifier 104 are connected to each other via signal cable. Speakers 105 are connected to the AV amplifier 104. Thus, an AV system constituted of the TV set 102, the video set 103, the AV amplifier 104 and the speakers 105 is formed.

ON/OFF of the power, light intensity and the like of the lamp 101 can be remote-controlled. ON/OFF of the power, changing of the channel, volume control and the like of the TV set 102 can also remote-controlled. Likewise, ON/OFF of the power, playback, recording, rapid feed, rewind and of the video set 103 can be remote-controlled. Further, ON/OFF of the power, volume control and the like of the AV amplifier 104 can be remote-controlled.

A remote controller group 200 comprises a lamp remote controller 201, a TV set remote controller 202, a video set remote controller 203 and an AV amplifier remote controller 204. These remote controller group 200 are placed on the table T. The lamp remote controller 201, the TV set remote controller 202, the video set remote controller 203, and the AV amplifier remote controller 204 are used respectively for remote-controlling the aforementioned lamp 101, TV set 102, video set 103 and AV amplifier 104 through infrared ray. A user operates the lamp remote controller 201, the TV set remote controller 202, the video set remote controller 203, and the AV amplifier remote controller 204.

When the user presses a key corresponding to a remote control command of the many keys provided with these lamp remote controller 201, TV set remote controller 202 and the like then an infrared ray command signal corresponding to the remote control command is transmitted to an appropriate control object appliance.

The remote control device 300 always monitors a command signal sent from the remote controller group 200, analyzes from this monitoring result how the user has operated the remote controller group 200 and then controls the control object appliance group 100 instead of the user according to this analysis. The operation of this remote control device 300 will be described in detail later.

Further, the remote control device 300 incorporates a receiving section 301 for receiving a command signal from the remote controller group 200. The receiving section 301, a receiver 400, and a transmitter 500 are connected to each other via a not-illustrated cable. The receiver 400 is a portable device which can receive a command signal from the remote controller group 200 in the same way as the receiving section 301 and it can be carried to any place. This receiver 400 is placed at a place in the room shown in FIG. 1 at which it can receive a command signal which are difficult to be received by the receiving section 301.

The transmitter 500 transmits a command signal to the control object appliance group 100 through a control of the remote control device 300 using infrared ray in the same way as the remote controller group 200. This transmitter 500 is also a portable device like the receiver 400 and transmits a command signal to the control object appliance group 100 by multi-beam system. Incidentally, the transmitter 500 may be incorporated in the remote control device 300 as the receiving section 301 has been.

Figure 2:
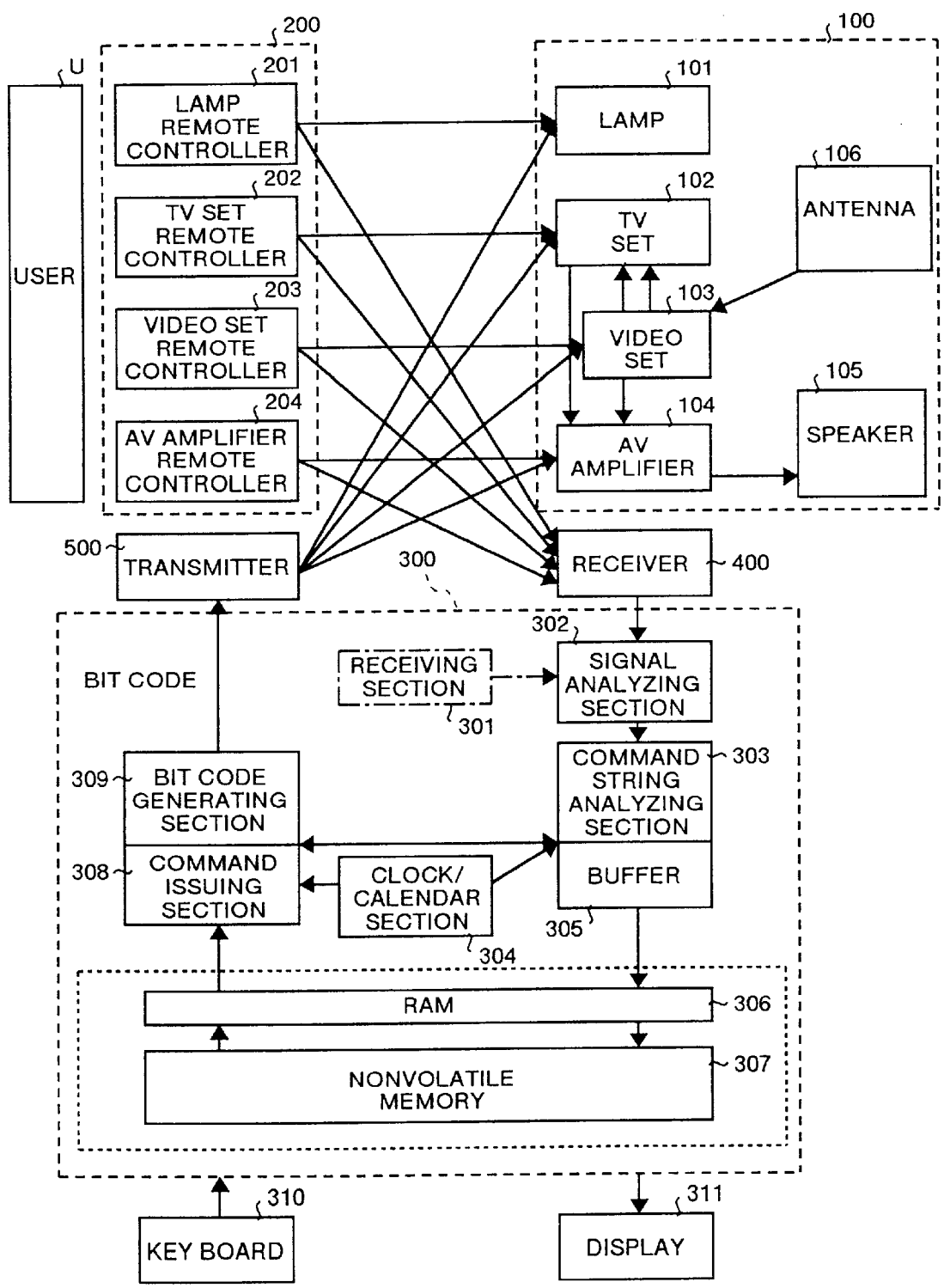
FIG. 2 is a block diagram showing a configuration of the first embodiment.

A concrete configuration of the aforementioned first embodiment will be described with reference to FIG. 2. In FIG. 2, the like reference numerals are attached to the sections corresponding to those of FIG. 1. When the user U wants to remote-control the control object appliance group 100 he or she operates the remote controller group 200. That is, when the user U presses a desired key of the lamp remote controller 201 then the lamp remote controller 201 transmits a command signal for remote-controlling (for example, ON/OFF of the power) the lamp 101. Likewise, the TV set remote controller 202 transmits a command signal for remote-controlling (for example, channel selection) the TV set 102 when the user U presses a desired key.

Further, the video set remote controller 203 transmits a command signal for remote-controlling (for example, playback control) the video set 103 when the user U presses a desired key. The AV amplifier remote controller 204 transmits a command signal for remote-controlling (for example, volume control) when the user U presses a desired key.

Figure 3:
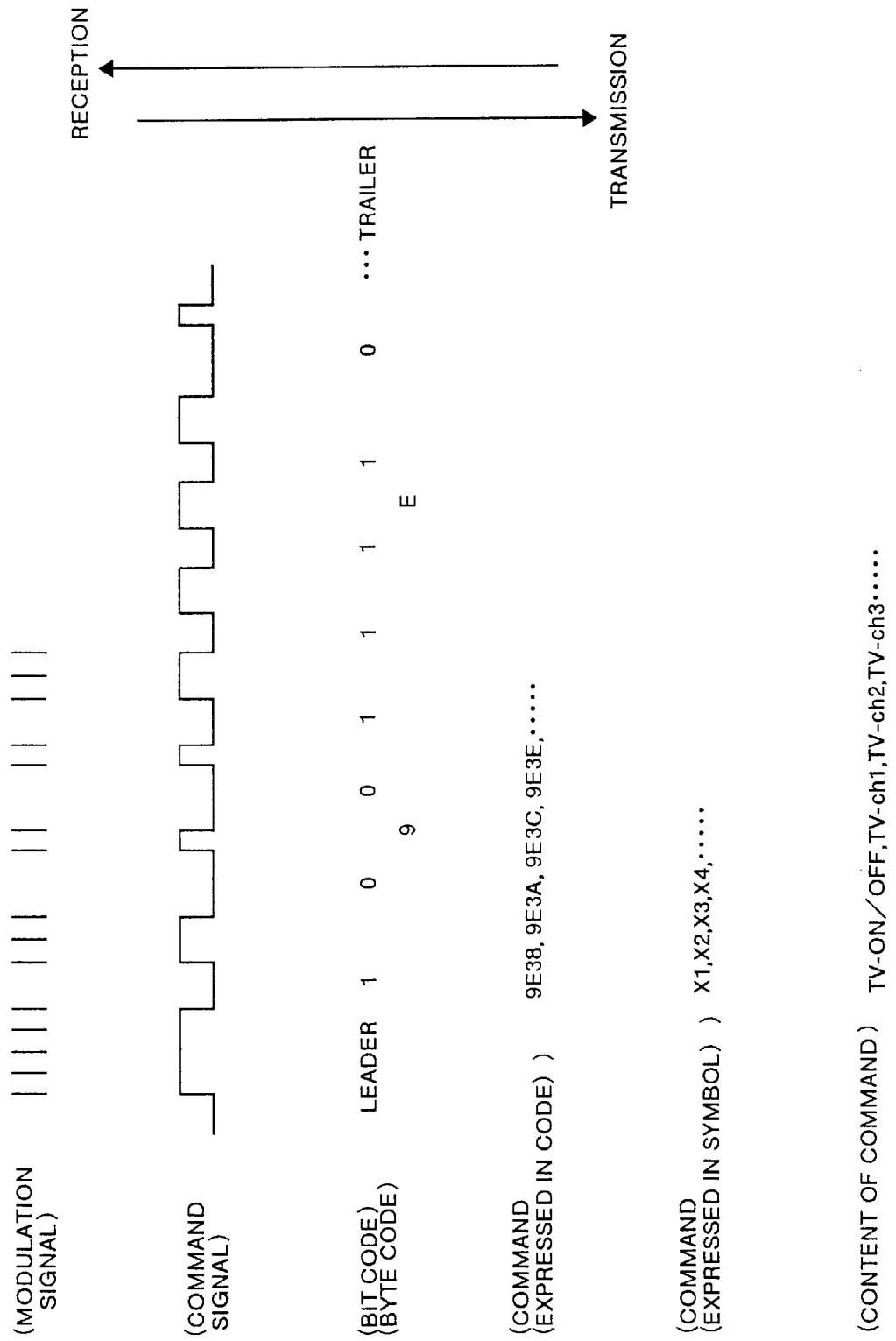
FIG. 3 explains how a modulation signal and a command according to the first embodiment are generated.

Here, the command signals to be, transmitted from the remote controller group 200 will be described with reference to FIG. 3. Hereinafter, the TV set remote controller 202 of the remote controller group 200 will be considered in order to explain a concrete example. A command (expressed in code) shown in the forth line from top in FIG. 3 is a remote control instruction to the TV set 102 and it is stored in an internal memory of the TV set remote controller 202. This command may be something like "9E38", "9E3A", or "9E3C".

For example, the command "9E38" is a command for instructing to turn ON or OFF the power of the TV set 102 as shown in the last line in FIG. 3. The command "9E3A" is for example a command for instructing to select a channel in the TV set 102. Upon transmission, this command is converted to bit code comprising "0" bit and "1" bit interposed between a leader and a trailer. The aforementioned leader and trailer indicate a command paragraph. Thus, a bit string sandwiched between the leader and trailer corresponds to a single command. Bit strings ("1001" and "1110") corresponding to "9" and "E" of the command "9E38" are shown in the third line from top in FIG. 3.

The TV set remote controller 202 converts this bit code into pulse-like command signal shown in the second line from top in FIG. 3. Further, the TV set remote controller 202 modulates this command signal with the help of a subcarrier of 33 kHz-40 kHz. A light emission diode is driven based on this modulation result so that a modulation signal (topmost line in FIG. 3) corresponding to the command is transmitted from the TV set remote controller 202. In the lamp remote controller 201, the video set remote controller 203 and the AV amplifier remote controller 204 included in the remote controller group 200, a command signal is generated according to the same principle as in the aforementioned TV set remote controller 202.

As has been explained above, the modulation signal is transmitted from the remote controller group 200. However, this modulation signal can be considered to be equivalent to the command signal. Therefore, in the following description it is assumed that the command signal is transmitted from the remote controller group 200 although in reality the modulation signal is transmitted. Further, the command (expressed in symbol) shown in the second line from bottom in FIG. 3 corresponds to the command (expressed in code).

That is, the command "9E38" corresponds to the command "X1", and likewise the commands "9E3A", "9E3C" and "9E3E" correspond to commands "X2", "X3" and "X4" respectively. In the commands (expressed in symbol), alphabets indicate the kind of the control object appliance and numerals indicate the kind of the command.

That is, the command (expressed in code) is the that is expressed in code and the command (expressed in symbol) is the that is expressed in symbol. However, the content of both the commands is the same. Therefore, a command constituted of a pair of an alphabetic letter and a number like "X1" means a command expressed in symbol. On the contrary, the commands other than this command (for example, "9E38") mean commands expressed in code.

In the control object appliance group 100 shown in FIG. 2, the lamp 101 can be remote-controlled by transmitting a command signal from the lamp remote controller 201 (or the transmitter 500), and the TV set 102 can be remote-controlled by transmitting a command signal from the TV set remote controller 202 (or the transmitter 500).

Similarly, the video set 103 can be remote-controlled by transmitting a command signal from the video set remote controller 203 (or the transmitter 500), and the AV amplifier 104 can be remote-controlled by transmitting a command signal from the AV amplifier remote controller 204 (or the transmitter 500). An antenna 106 is connected to the video set 103 for receiving a TV signal. It is the distinguishing feature of the first embodiment that the control object appliance group 100 can be remote-controlled by a command signal from the transmitter 500.

The receiver 400 receives command signals from the remote controller group 200. That is, the command signals from the remote controller group 200 are received by both the receiver 400 and the control object appliance group 100. The receiving section 301 in the remote control device 300 receives a command signal from the remote controller group 200 like the aforementioned receiver 400. Although the receiving section 301 also receives the aforementioned command signal, a case is described in the following in which the receiver 400 receives the aforementioned command signal.

A signal analyzing section 302 generates a command (see FIG. 3) indicating a concrete content of remote control on a control object appliance group 100 by analyzing (demodulating) a command signal received by the receiver 400. That is, the signal analyzing section 302 generates a command (expressed in code) shown in FIG. 3 from the modulation signal shown in the same figure in an order opposite to that of the modulation operation of the aforementioned remote controller group 200.

A command string analyzing section 303 analyzes a command string input through the signal analyzing section 302 in a manner described later. The command string mentioned here is a lump of many commands. A clock/calendar section 304 outputs information about time, information about day, information about date and the like as external factor information to the command string analyzing section 303 and a command issuing section 308. The command string analyzing section 303 also stores temporally this external factor information and the like in a buffer 305. Detail operations of this command string analyzing section 303 will be described later.

A random access memory (RAM) 306 transfers the command, the external factor information and the like stored in the aforementioned buffer 305 to a nonvolatile memory 307. The RAM 306 also transfers the content of the nonvolatile memory 307 to the command issuing section 308. Incidentally, the buffer 305 may be a part of the memory region of the RAM 306. The nonvolatile memory 307 is a magnetic disk, optical disk or the like. This nonvolatile memory 307 stores, for example, a database shown in FIG. 9 and a user registration table shown in FIG. 10A.

Figure 9:
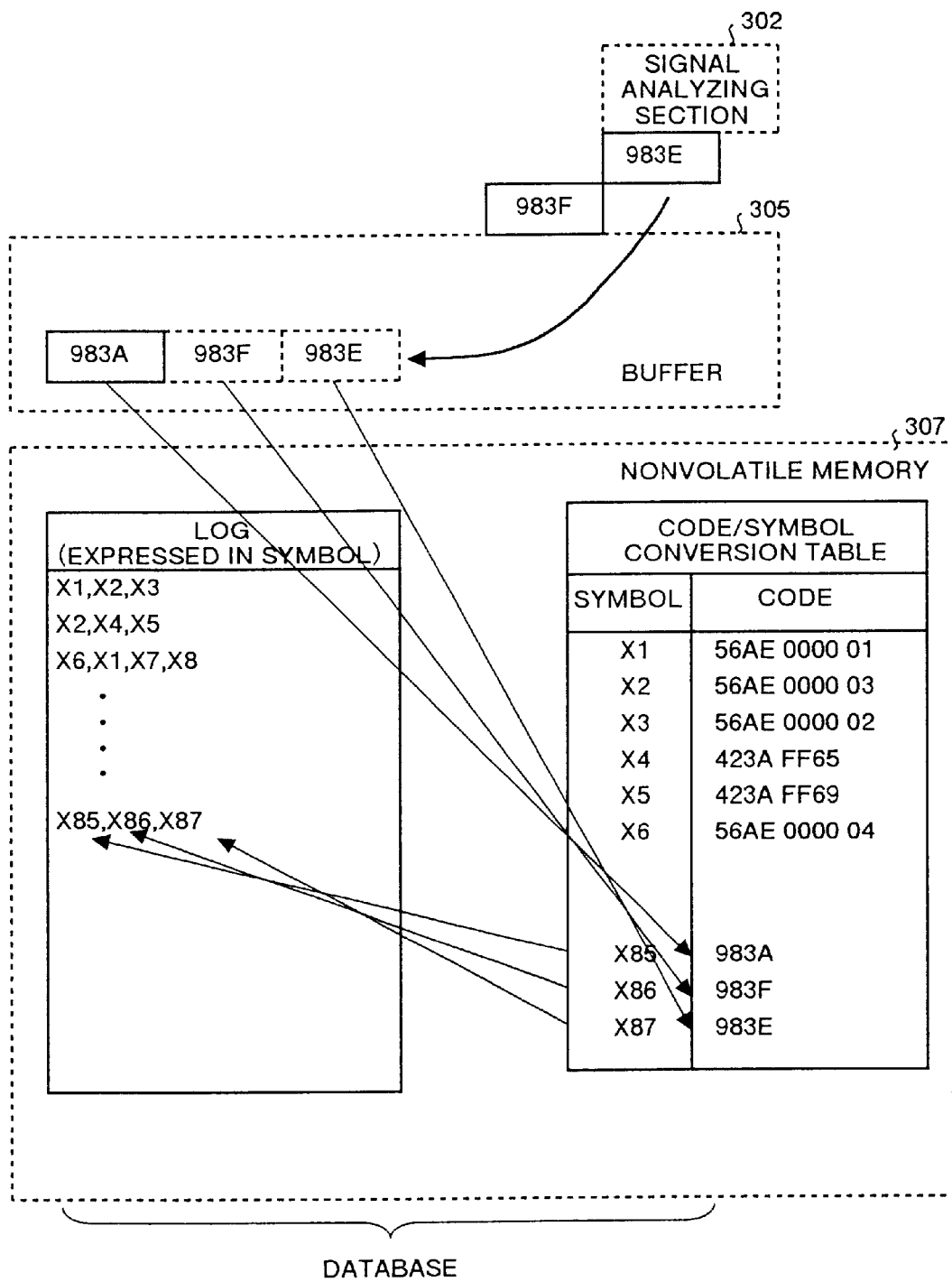
FIG. 9 is a diagram for explaining the storage processing shown in FIG.

The database shown in FIG. 9 is divided into "log" and "code/symbol conversion table". This database is accessed when a command is issued by the command issuing section 308 which will be described later. The "log" in this database comprises command strings expressed in symbol (for example, "X85", "X86" and "87") corresponding to each of the command strings expressed in code (for example, "983A", "983F" and "983E") continuously input into the command string analyzing section 303. The "log" is determined by a correspondence between the command string (expressed in symbol) and the external factor information such as time, day, date and the like used in inputting that command string (expressed in symbol). On the other hand, the "code/symbol conversion table" is a table that indicates a correspondence between the command expressed in symbol and the command expressed in code.

The user registration table shown in FIG. 10A is a table which is registered by the user U and indicates a relation between an input command (expressed in symbol) and an issued command (expressed in symbol). This user registration table is also a table for achieving a learning function in the remote control device 300. Further, the user registration table is used for issuing a command by the command issuing section 308 which will be described later. The issued command is a command string comprising a plurality of commands to be issued by the remote controller group 200 in a series of operations of the remote controller group 200 by the user U. The series of operations mentioned here is a combination of many key operations carried out for remote-controlling the control object appliance group 100. For example, the issued command "A1A2B1B5A5" in the first line comprises five commands (expressed in symbol), "A1", "A2", "B1", "B5" and "A5".

On the other hand, the input command is a symbol expression command which is input to the command string analyzing section 303 by the signal analyzing section 302 when the user U actually operates the remote controller group 200 and corresponds to a code expression command. This input command is the same as a header portion in the issued command. For example, the input command "A1A2" in the first line is the same as the header portion "A1A2" of the issued command "A1A2B1B5A5". Thus, the input command is a command obtained by shortening the issued command and it reduces the number of times the user U is required to operate the remote controller group 200.

Registration of the input command and issued command in the aforementioned user registration table is carried out by using a key board 310 and display 311 connected to the remote control device 300 shown in FIG. 2. More specifically, while looking at a registration screen (see FIG. 10B) displayed on the display 311 the user U inputs an input command (e.g. "A4B3") and issued command (e.g. "A4B3C538 ) as a pair by using the key board 310. The input command and the issued command thus-inputted are newly registered in the user registration table.

Referring to FIG. 2, the command issuing section 308 estimates a command that the user may issue through the operation of the remote controller group 200. This estimation is made by referring to the database (see FIG. 9) in the nonvolatile memory 307 and the user registration table (see FIG. 10A) based on an actual command (string) received from the command string analyzing section 303. The command issuing section 308 issues this estimated command. Detail operations of the command issuing section 308 will be described later. A bit code generating section 309 generates a bit code from the command issued (see FIG. 3) by the command issuing section 308.

The transmitter 500 generates the command signal from the bit code (see FIG. 3) input by the bit code generating section 309 and transmits the generated command signal to the control object appliance group 100 as a modulation signal. Thus, the command issuing section 308, the bit code generating section 309 and the transmitter 500 have the same function as the remote controller group 200.

Figure 4:
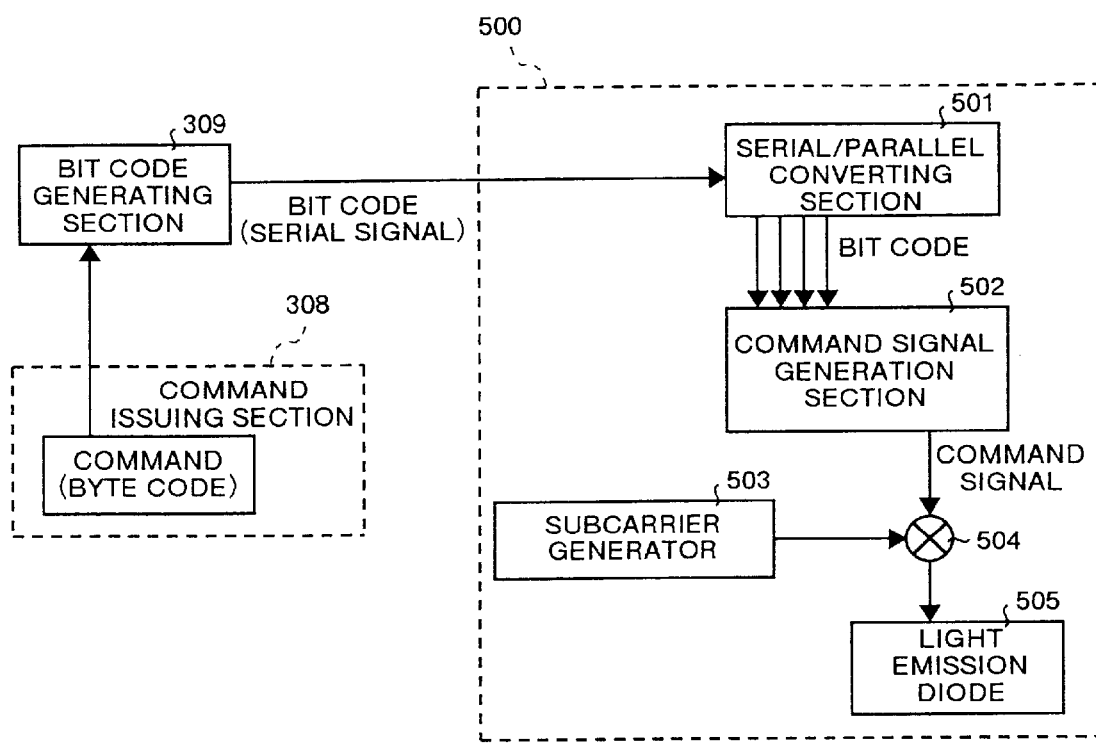
FIG. 4 shows detail configuration of a transmitter 500 shown in FIG. 1.

Configuration of the transmitter 500 will be described here in detail with reference to FIG. 4. A serial/parallel converting section 501 converts the serial bit code received from the bit code generating section 309 to parallel bit code. A command signal generating section 502 generates a command signal from this bit code. The bit code is appended with a leader and a trailer as required. A subcarrier generator 503 generates a subcarrier of 33 kHz to 40 kHz. A modulator 504 modulates the subcarrier based on the command signal.

A light emission diode 505 is driven by the signal outputted from the modulator 504. The light emission diode 505 transmits a modulation signal shown in FIG. 3 to the control object appliance group 100. Actually, the transmitter 500 is provided with many light emission diodes 505 and a multi-beam modulation signal (command signal) is transmitted from the light emission diode 505 to the control object appliance group 100.

1. First Operating Example of the First Embodiment

A first operating example of the aforementioned first embodiment will be described with reference to flowcharts shown in FIG. 5 to FIG. 8. This first operating example is a basic operation according to the first embodiment and divided largely to three operations of a database registering operation, a command estimating operation and a command issuing operation. The database registering operation is the operation in which a command signal from the remote controller group 200 is monitored and a monitoring result is registered in the database stored in the nonvolatile memory 307 based on the monitoring result.

The command estimating operation is the operation in which a command that the user may issue through the operation of the remote controller group 200 is estimated based on the aforementioned monitoring result and the database. The command issuing operation is the operation in which the command estimated in command estimating operation is issued and a command signal corresponding to the command is transmitted from the transmitter 500 to the control object appliance group 100.

A case in which commands "983A", "983F" and "983E" (all expressed in code) are issued continuously by the remote controller group 200 to the database shown in FIG. 9 will be described as an example. The command string ("983A", "983F" and "983E") is the one that is issued due to a series of operations performed by the user U using the remote controller group 200. Following three items (1) to (3) may be considered as an example of the series of operations.

(1) Operation of pressing a 'power' key of the TV set remote controller 202 in order to turn ON the power of the TV set 102;

(2) Operation of pressing a 'power' key of the video set remote controller 203 in order to turn ON the power of the video set 103; and (3) Operation of pressing the 'power' key of the AV amplifier remote controller 204 in order to turn ON the power of the AV amplifier 104.

It is assumed herein that, a command "983A" is issued from the TV set remote controller 202 upon the operation in item (1). Further, a command "983F" is issued from the video set remote controller 203 upon the operation in item (2). Similarly, a command "983E" is issued from the AV amplifier remote controller 204 upon the operation in item (3).

Figure 5:
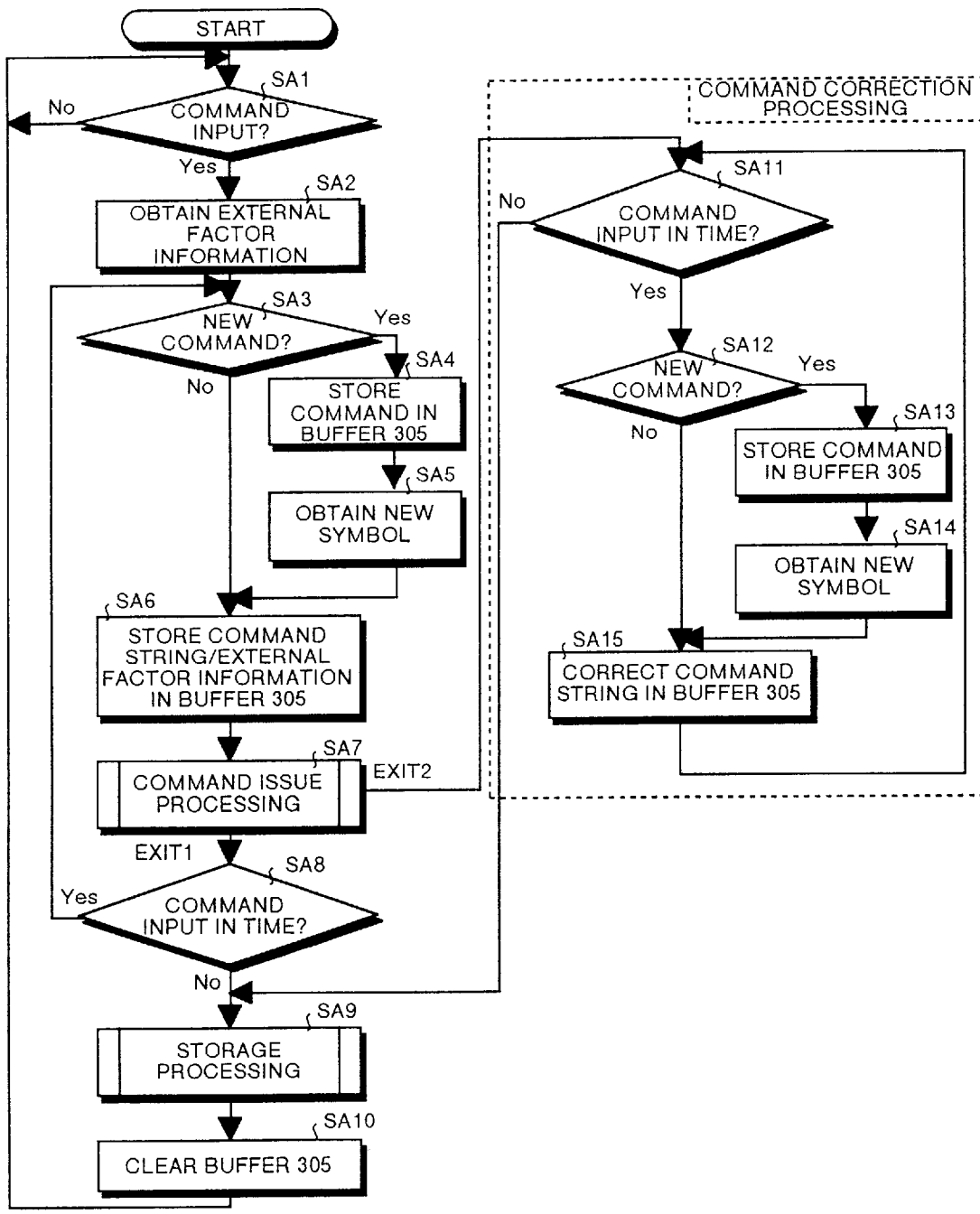
FIG. 5 is a flowchart for explaining a first operating example of the first embodiment.

Under such assumptions, in step SA1 shown in FIG. 5, the command string analyzing section 303 determines whether or not a command issued by the remote controller group 200 is received from the signal analyzing section 302. More specifically, when a command signal from the remote controller 200 is received by the receiver 400, the command string analyzing section 303 determines that a command corresponding to the aforementioned command signal is input through the signal analyzing section 302. If the result of determination in this step No then the same determination is repeated.

When the aforementioned series of operations from items (1) to (3) is carried out by the user U, the commands (expressed in code) shown in FIG. 9 are successively issued in the order of "983A", "983F" and "983E" by the remote controller group 200 (TV set remote controller 202, video set remote controller 203, AV amplifier remote controller 204). When the first issued command "983A" is input then the command string analyzing section 303 recognizes the result of determination in step SA1 as Yes.

In step SA2, the command string analyzing section 303 obtains external factor information such as time, day, date and the like from the time/calendar section 304. In step SA3, by referring to the "code/symbol conversion table" in the nonvolatile memory 307 shown in FIG. 9, the command string analyzing section 303 determines whether or not the command "983A" is a new command. When the input command "983A" is not registered in the "code/symbol conversion table" then the command string analyzing section 303 determines that the command is a new command.

When the input command "983A" is a new command, the command string analyzing section 303 recognizes the result of determination in step SA3 as Yes. In step SA4, the command string analyzing section 303 stores the input command "983A" (see FIG. 9) in the buffer 305 as a new command. In step SA5, the command string analyzing section 303 obtains a command ("X85") expressed in symbol corresponding to the new command ("983A") expressed in code and then the system control proceeds to step SA6. After that, the command string analyzing section 303 carries out processing using the command "X85" expressed in symbol. On the other hand, if the result of determination in step SA3 is No then the command string analyzing section 303 directly carries out the processing in step SA6.

In step SA6, the command string analyzing section 303 stores the aforementioned command "X85" in the buffer 305 as information of the command string in correspondence to the external factor information obtained in step SA2. It should be noted that the information of the command string is information about the aforementioned command "X85". In the next step SA7, the command issuing section 308 carries out command issuing processing constituted of steps SB1 to SB5 shown in FIG. 6.

Figure 6:
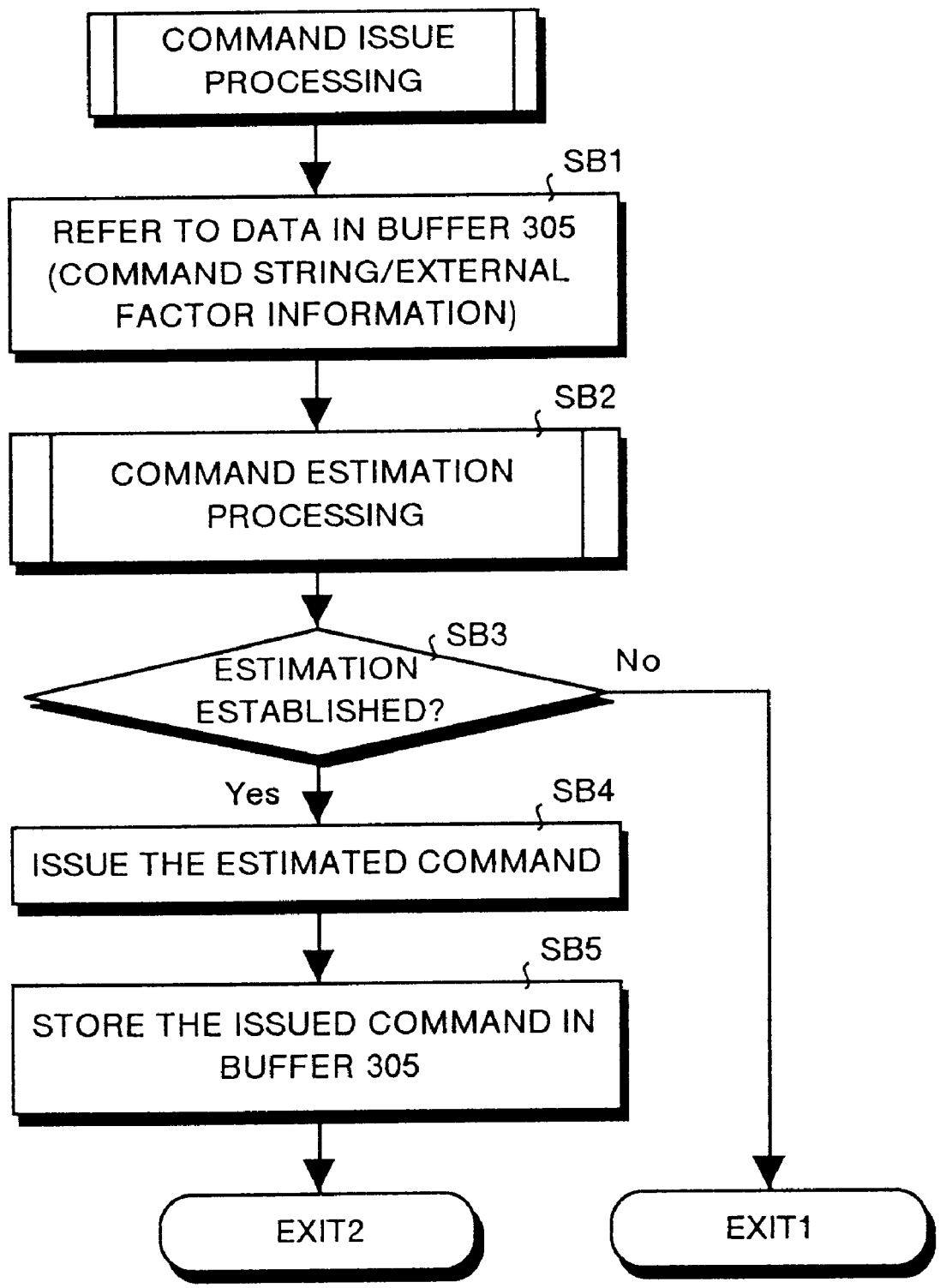
FIG. 6 is a flowchart for explaining a command issue processing shown in FIG. 5.

In step SB1 shown in FIG. 6, the command issuing section 308 refers to data (command string and external factor information) stored in the buffer 305. Here, the command issuing section 308 recognizes the command string to be "X85". In step SB2, the command issuing section 308 carries out command estimation processing constituted of steps SC1 to SC9 shown in FIG. 7. In step SC1 shown in FIG. 7, the command issuing section 308 refers to command string (i.e. "X85") and external factor information stored in the buffer 305.

In step SC2, the command issuing section 308 accesses the nonvolatile memory 307 and using the command string (i.e. "X85") referred to in step SC1 as a key retrieves an input command from the user registration table shown in FIG. 10A. In step SC3, the command issuing section 308 determines whether or not the input command retrieved from the user registration table agrees with the command string (i.e. "X85") referred to in step SC1.

When a command string (i.e. "X85") does not exist as a retrieval key in an input command of the user registration table shown in FIG. 10A, then the command issuing section 308 recognizes the result of determination in step SC3 as No and the processing in step SC4 is performed. When the result of determination in step SC3 is Yes, then in step SC8 the command issuing section 308 adopts an issued command corresponding to the input command agreeing with a command string (i.e. "X85") in the user registration table as an estimated command. Then the system control proceeds to step SC9.

In the next step SC4, using a command string (i.e. "X85") referred to in step SC1 as a key, like step SC3, the command issuing section 308 retrieves a command string having a part agreeing with the aforementioned key from a log of the database shown in FIG. 9. A retrieval range in the log is selected by the user from all command strings, command strings issued in the same time interval, command strings issued on the same day, command strings issued in the same time interval of the same day and the like. An example of application of the retrieval range will be described in detail in the second operating example and after.

In step SC5, the command issuing section 308 adopts a retrieval result (command string) in step SC4 as a candidate for a command string to be estimated and after that, obtains a number of occurrence (frequency of occurrence) of the same command string in this candidate. Then, the command issuing section 308 obtains a probability of occurrence of that command string in the candidate for each command string. The probability of occurrence can be obtained according to (frequency of occurrence of the given command string)/(total of the frequencies of all command strings). An example of calculation in step SC5 will be described in the second operating example and after.

In step SC6, the command issuing section 308 determines whether or not a probability obtained in step SC5 exceeds a predetermined probability. When result of this determination is No, the command issuing section 308 regards that any issued command cannot be estimated and the system control proceeds to step SB3 shown in FIG. 6. The predetermined probability mentioned here is a value which is set up by the user U through the key board 310 (see FIG. 2) and is a variable value.

On the other hand, if the result of determination in step SC6 is Yes then the system control proceeds to step SC7. In step SC7, the command issuing section 308 adopts a command string having the highest probability as an estimated command in command strings exceeding the predetermined probability. In step SC9, the command issuing section 308 establishes the estimated command in step SC7 (or step SC8) and then the system control proceeds to step SB3 shown in FIG. 6.

In step SB3, the command issuing section 308 determines whether or not an estimated command is established in the aforementioned step SB2. In this case, assuming that the result of determination is No, in step SA8 shown in FIG. 5, the command string analyzing section 303 determines whether or not after a preceding command is input, a next command is input within a predetermined time interval. When after a preceding command "983A" shown in FIG. 9 is input, a next command "983F" is input within a predetermined time interval, the command string analyzing section 303 adopts the result of determination in step SA8 as Yes and the system control is returned to step SA3.

In step SA3, the command string analyzing section 303 determines whether or not the input command "983F" is a new command in the same manner as described above. Assuming that the determination result is Yes, then the system control proceeds to step SA4. In step SA4, the command string analyzing section 303 stores the command "983F" (see FIG. 9) in the buffer 305 as a new command and then the system control proceeds to step SA5. In step SA5, the command string analyzing section 303 obtains a command (i.e. "X86") expressed in symbol corresponding to a new command (i.e. "983F") expressed in code.

In step SA6, the command string analyzing section 303 stores the aforementioned commands "X85" and "X86" in the buffer 305 as information of the command string. In the next step SA7, the command issuing section 308 executes command issuing processing as described above. In this command issuing processing, the command issuing section 308 executes command estimation processing shown in FIG. 7 with respect to the commands "X85" and "X86" as a command string. In this case, assuming that command estimation is disabled, the determination result in step SB3 shown in FIG. 6 will be No. Therefore, in step SA8 shown in FIG. 5, the command string analyzing section 303 carries out the same determination as described above.

In this case, when after a preceding command "983F" shown in FIG. 9 is input, a next command "983E" is input within a predetermined time interval, the command string analyzing section 303 adopts Yes as a determination result in step SA8 and carries out each process of the steps SA3 to SA7. That is, when the aforementioned command "983E" is a new command, in step SA4, this command "983E" is stored in the buffer 305. In step SA5, a command "X87" expressed in symbol corresponding to the command "983E" is obtained and in step SA6, the commands "X85", "X86" and "X87" are stored in the buffer 305 as a command string.

Next, in step SA7, as described above, command issuing processing is carried out based on a command string ("X85", "X86" and "87") expressed in symbol. In this case, assuming that the command estimation is disabled in the command estimation processing shown in FIG. 7, the system control proceeds to step SA8 shown in FIG. 5.

Figure 8:
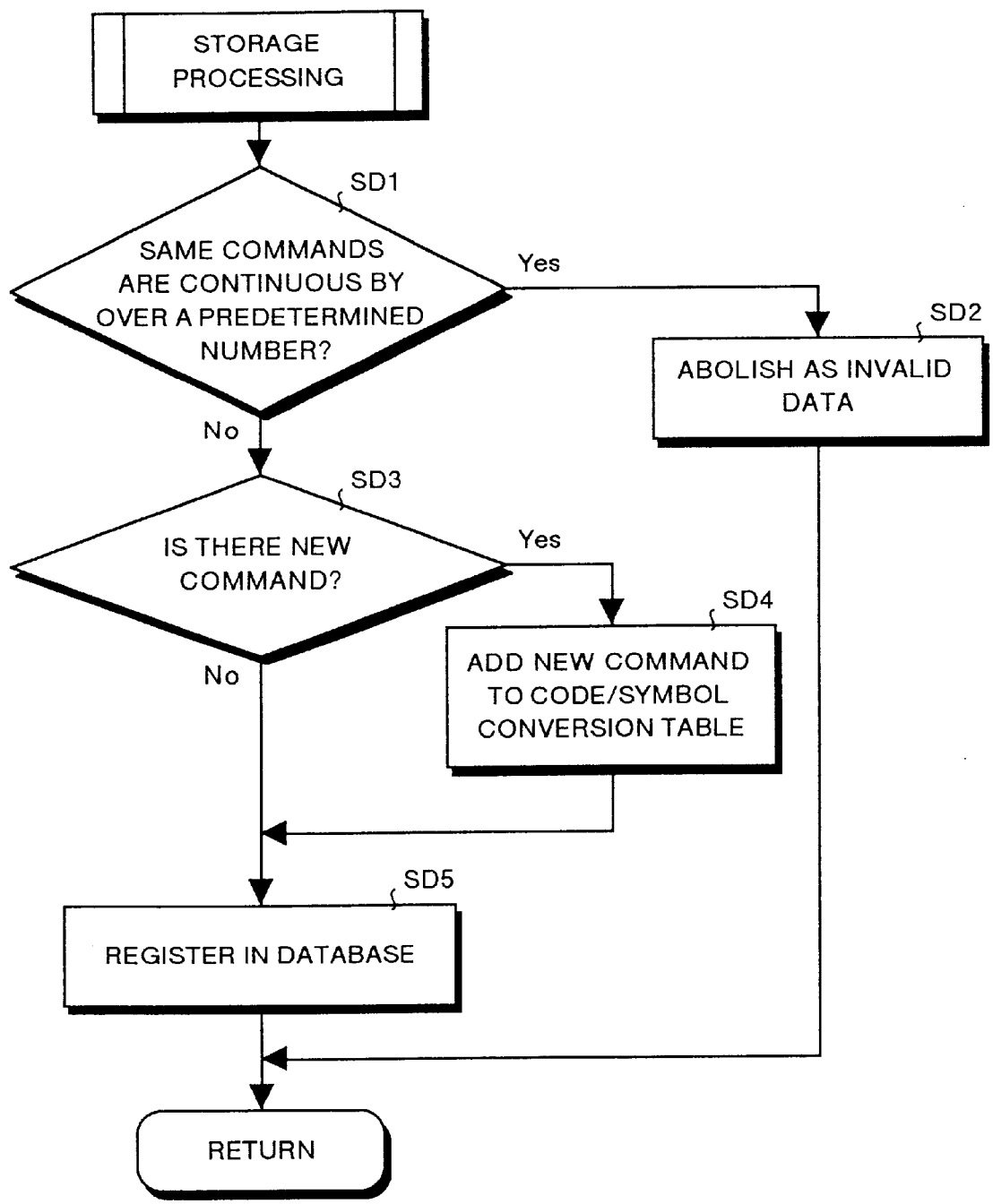
FIG. 8 is a flowchart for explaining a storage processing shown in FIG. 5.

In this case, assuming that the determination result in step SA8 is No, then in step SA9 the command string analyzing section 303 carries out a storage processing constituted of steps SD1 to SD5 shown in FIG. 8. In step SD1 shown in FIG. 8, the command string analyzing section 303 refers to the buffer 305 and determines whether or not a predetermined number (for example 10) or more of the same commands exist continuously in a command string. The same commands do not exist continuously in a command string ("X85", "86" and "87") in the example shown in FIG. 9. Therefore, the command string analyzing section 303 adopts No as the determination result in step SD1.

In step SD3, the command string analyzing section 303 determines whether or not a new command exists in a command string expressed in code stored in the buffer 305. Because the commands "983A", "983F" and "983E" shown in FIG. 9 are all new commands, the command string analyzing section 303 adopts Yes as the determination result in step SD3.

In step SD4, the command string analyzing section 303 additionally registers new commands "983A", "983F" and "983E" expressed in code and corresponding commands expressed in symbol, "X85", "X86" and "87" in "code/symbol conversion table" in the database as shown in FIG. 9. In step SD5, the command string analyzing section 303 links commands expressed in symbol ("X85", "X86" and "X87") with external factor information (not shown) such as time and additionally registers them in "log" in the database. The system control then proceeds to step SA10 shown in FIG. 5. Consequently, the aforementioned database registration operation is terminated. In step SA10, the buffer 305 is cleared by the command string analyzing section 303 and the system control is returned to step SA1. All the aforementioned steps are repeated.

On the other hand, if the determination result in step SD1 shown in FIG. 8 is Yes, then the command string analyzing section 303 abolishes the data (command string, new command, external factor information) stored in the buffer 305 as invalid data. The system control then proceeds to step SA10 shown in FIG. 5 and the aforementioned operation is carried out. Step SD1 is a step for excluding meaningless command issued continuously by erroneous operation (continuous pressing of a particular key) of the remote controller group 200.

Figure 7:
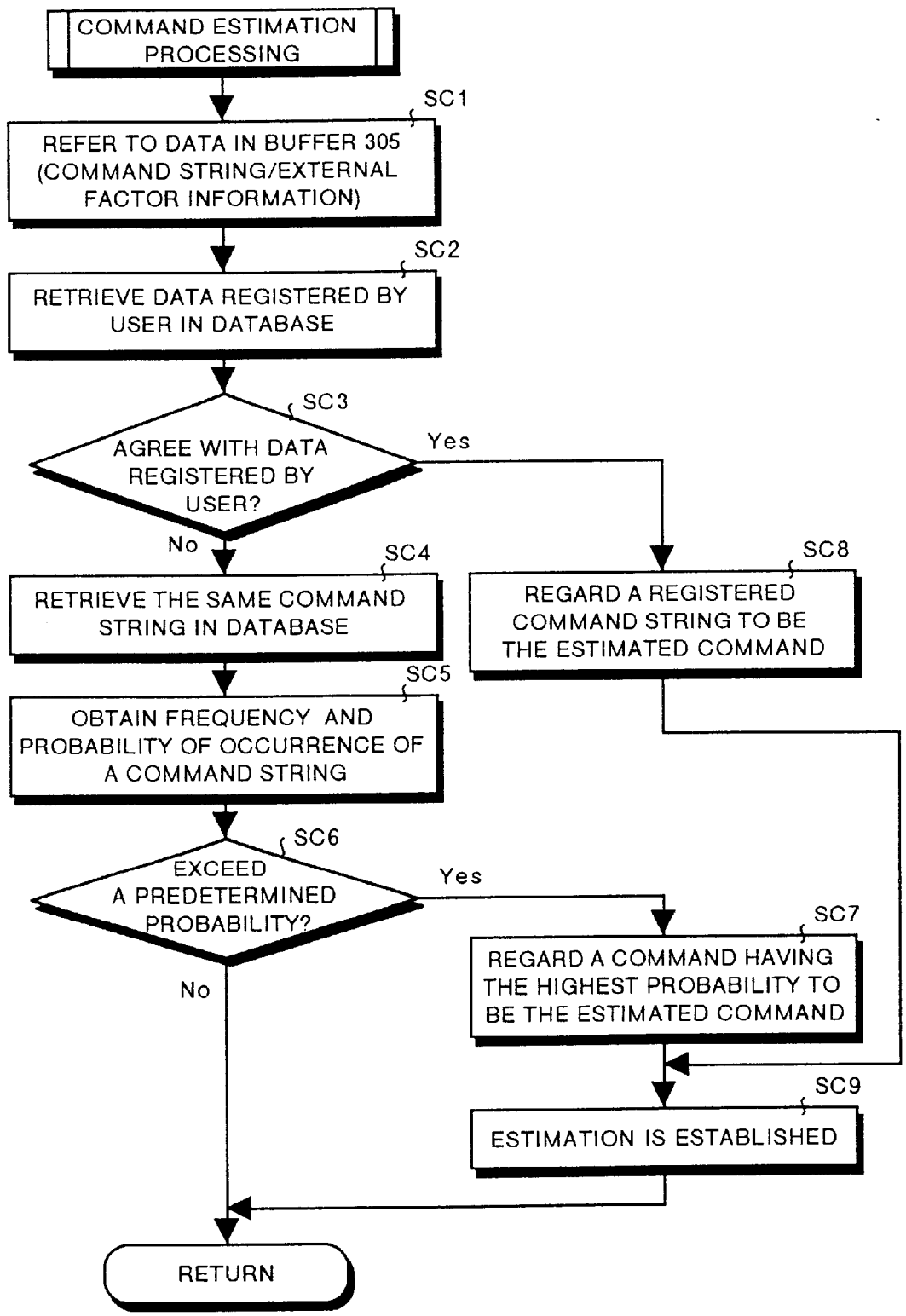
FIG. 7 is a flowchart for explaining a command estimation processing shown in FIG. 6.

Assuming that a command (an estimated command based on the database (see FIG. 9) or estimated command based on the user registration table (see FIG. 10A)) is established in step SC9 shown in FIG. 7, the command issuing section 308 adopts Yes as a determination result in step SB3. In, step SB4, the command issuing section 308 issues the estimated command (command string) and transfers it to the bit code generating section 309.

The estimated command is converted to bit code by the bit code generating section 309 and it is transmitted to the control object appliance group 100 from the transmitter 500 as a command signal. This estimated command is a command that may be issued through an operation of the remote controller group 200 by the user U and it is also the command for achieving the learning function of the multi-remote controller. Therefore, the control object appliance group 100 is remote-controlled by the remote controller 300 when the above estimated command is issued.

In step SB5, when the above issued estimated command is transferred to the command string analyzing section 303, the estimated command is stored in the buffer 305 by the command string analyzing section 303. The command string analyzing section 303 then carries out the command correction processing constituted of steps SA11 to SA15 shown in FIG. 5. This command correction processing is performed when the user U inputs a command additionally after the estimated command is issued in command issuing processing (step SA7). A command string stored in the buffer 305 is corrected considering the additional command in this command correction processing.

That is, in step SA11, the command string analyzing section 303 determines whether or not an additional command is input within a predetermined time interval after the estimated command is issued in step SA7. If the determination result is No, then in step SA9 the command string analyzing section 303 carries out a processing for registering a command string (a new command or an external factor information) stored in the buffer 305 in the database in the same manner as the above-described operation.

On the other hand, when an additional command is input, the command string analyzing section 303 adopts Yes as a determination result in step SA11. In step SA12, the command string analyzing section 303 determines whether or not the input command is a new command like in step SA3. If the determination result is Yes, then in step SA13 the command string analyzing section 303 stores the above new command in the buffer 305. In step SA14, the command string analyzing section 303 obtains a command expressed in symbol corresponding to a command expressed in code like in step SA5 and then the system control proceeds to step SA15.

On the other hand, if the determination result in step SA12 is No, then in step SA15 the command string analyzing section 303 corrects a command string stored in the buffer 305. In this case, the command string analyzing section 303 substitutes a command input as an additional command in step SA11 for a command input last of a command string stored in the buffer 305 so as to correct the command string and the system control proceeds to step SA11.

Here, assuming that the determination result in step SA11 is No, then in step SA9 the command string analyzing section 303 registers the corrected command string (the new command or the external factor information) in the database in the same manner as the above operation. Then, the corrected command string is registered in the database by such a command correction processing.

As described above, according to the first operating example of the first embodiment, a monitoring result about a command issued from the remote controller group 200 is held as database, a command that may be issued from the remote controller group 200 is automatically issued by the remote control device 300 based on this database. Therefore, a troublesome registration operation of the user U is not necessary and ease of use of this system is improved.

Further, according to the first operating example of the first embodiment, the key board 310 is provided so that a registration table (see FIG. 10A) can be registered. Thus, by using this user registration table, it is possible to prevent a drop of probability of the estimated command in an initial period in which the quantity of command strings (external factor information) registered in the database is small. Furthermore, because according to the first operating example of the first embodiment, a command string corrected by the command correction processing shown in FIG. 5 is registered in the database, the reliability of the database can be improved.

2. Second Operating Example of First Embodiment

A second operating example of the first embodiment will be described with reference to a flowchart shown in FIG. 11 and FIGS. 10 and 12. This second operating example is a case in which the aforementioned command estimation processing (see step SB2 of FIG. 6) is carried out based on information registered by the user U using the key board 310 shown in FIG. 2. In this second operating example the command estimation processing is carried out according to the flowchart shown in FIG. 11 instead of the flowchart shown in FIG. 6.

According to the second operating example, the aforementioned user registration table (see FIG. 10A) and a weight assigning table shown in FIG. 12A are stored in the nonvolatile memory 307 shown in FIG. 2. The user registration table and weight assigning table are information to be registered by the user U using the key board 310. The weight assigning table shown in FIG. 12A is a table that indicates addition points (probability) for assigning the probability of a command string which is a candidate when a command string is estimated, with a weight. Although a sign of the addition point is plus in FIG. 12A, this sign could be minus.

In the weight assigning table shown in FIG. 12A, the input command is a command (e.g. A1A2) to be issued from the remote controller group 200 by the user U. The issued command is a command linked with the aforementioned input command. The addition point is a probability for assigning with a weight corresponding to the aforementioned issued command. Further, the aforementioned weight assigning table is registered for each input command.

Next, command estimation processing in the second operating example will be described in detail with reference to FIG. 11. In FIG. 11, steps SE1 to SE5 correspond to steps SC1 to SC5 shown in FIG. 7 and steps SE7 to SE10 correspond to steps SC6 to SC9 shown in FIG. 7. Therefore, in FIG. 11, as compared to FIG. 7, a process of step SE6 is a new one.

Figure 11:
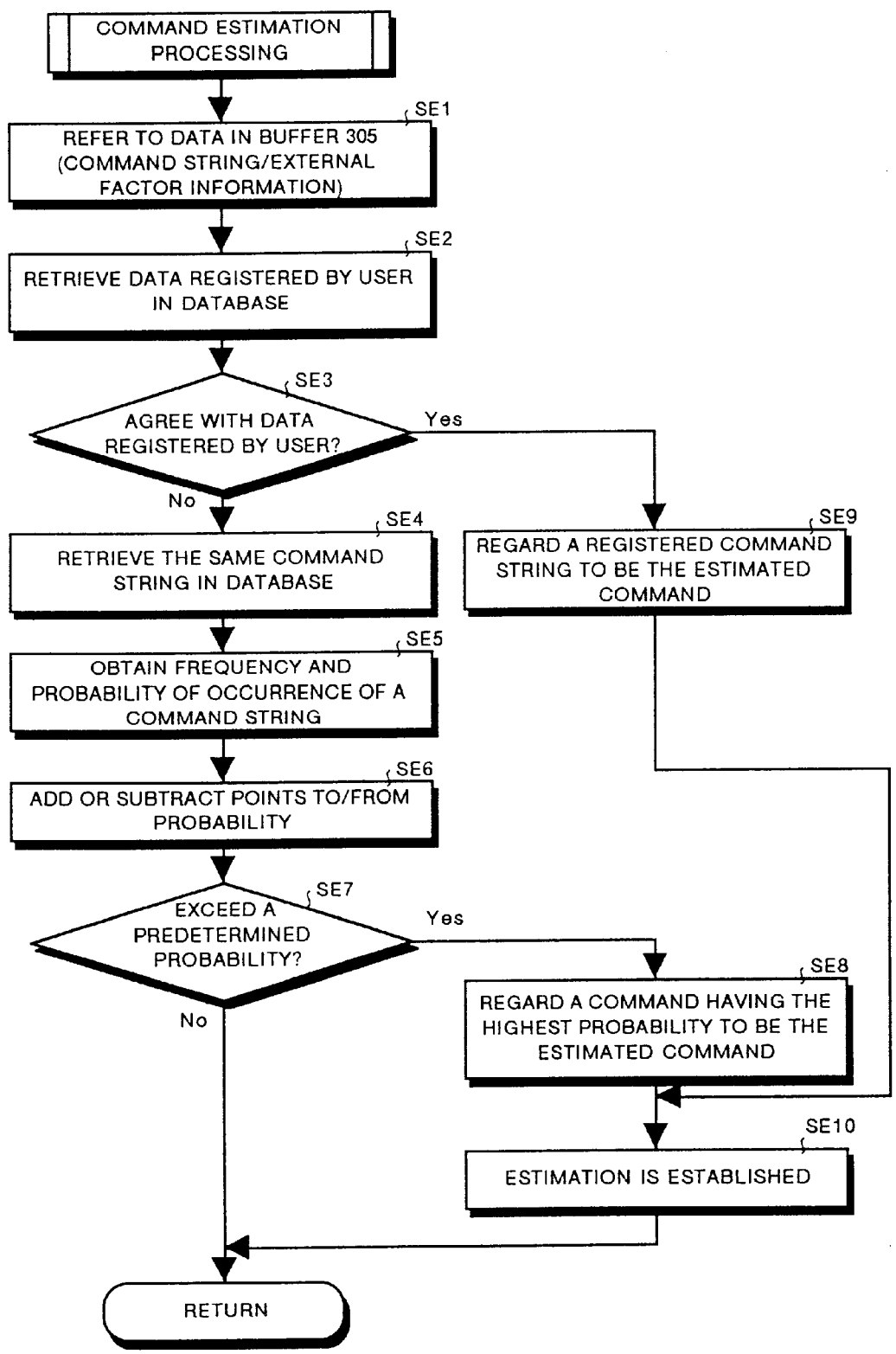
FIG. 11 is a flowchart for explaining a command estimation processing in a second operating example of the first embodiment.

In step SE1 shown in FIG. 11, the command issuing section 308 refers to a command string and external factor information stored in the buffer 305 and then the system control proceeds to step SE2. In step SE2, the command issuing section 308 accesses the nonvolatile memory 307 and with a command string referred to in step SE1 as a key, retrieves an input command in the user registration table shown in FIG. 10A. After that, the system control proceeds to step SE3. In this case, it is a assumed that as the aforementioned command string, the "A1A2" shown in FIG. 10A is stored. In step SE3, because the input command ("A1A2") in the user registration table shown in FIG. 10A agrees with a command string ("A1A2") as a retrieval key, the command issuing section 308 adopts Yes as a determination result and the system control proceeds to step SE9.

In step SE9, the command issuing section 308 adopts an issued command ("A1A2B1B5A5") corresponding to the input command ("A1A2") shown in FIG. 10A as an estimated command and the system control proceeds to step SE10. In step SE10, the command issuing section 308 establishes the aforementioned estimated command. Through the aforementioned operation, the command issuing section 308 shown in FIG. 2 issues the above estimated command ("A1A2B1B5A5"). Consequently, a command signal corresponding to the "A1A2B1B5A5" is transmitted to the control object appliance group 100 from the transmitter 500.

Thus, although the user U does not do anything but only the key operation for issuing the commands "A1" and "A2", the commands "B1", "B5", "A5" are issued from the remote control device 300. Therefore, after the commands "A1" and "A2" are issued on the side of the remote controller group 200 without user U's consciousness, a remote control for a serial operation is automatically carried out.

On the other hand, assuming that the input command "A1A2" is not registered in the user registration table shown in FIG. 10A, the command issuing section 308 adopts No as a determination result in step SE3 and the system control proceeds to step SE4. In step SE4, like the aforementioned step SC4, with a command string (in this case, "A1A2") referred to in step SE1 as a key, the command issuing section 308 retrieves a command string having a part agreeing with the aforementioned key in a log of the database and then the system control proceeds to step SE5.

In step SE5, after a retrieval result (command string) of step SE4 is a candidate for a command string to be estimated, the command issuing section 308 obtains a number of occurrence (frequency of occurrence) of the same commands in this candidate and then obtains a probability of occurrence of each. In this case, FIG. 12B is a diagram indicating candidate command strings and probability of occurrence of each. In the item "command string" of the same diagram, candidate command strings "A1A2", "A1A2A2", A1A2A3", "A1A2A4" and "A1A2A5" are picked up and in the item "probability", probabilities of occurrence corresponding to each command string "5%", "60%", "20%", "10%" and "5%" are indicated. Thus, in FIG. 12B, the probability (60%) of the command string "A1A2A2" is the highest.

In the next step SE6, the command issuing section 308 adds (or subtracts) addition points shown in FIG. 12A to (or from) the probability of occurrence (see the item "probability" of FIG. 12B) obtained in step SE5. When the sign of the addition point is plus, the addition point is added to the probability of occurrence and when the same sign is minus, the addition point is subtracted from the probability of occurrence. More specifically, the command issuing section 308 refers to a weight assigning table corresponding to a command string (in this case, "A1A2") referred to in step SE1 and selects a command string which falls under the "issued command" shown in FIG. 12A from command strings picked up in the item "command string" of FIG. 12B.

In an example shown in FIG. 12B, the command strings "A1A2A3", "A1A2A4" and "A1A2A5" are selected. Then, the command issuing section 308 adds the addition point shown in FIG. 12A to the probability of occurrence of the above selected command strings. Consequently, as shown in FIG. 12B, for example, in case of the command string "A1A2A3", 50 points are added to 20 points (see the item "before change") so as to obtain 70 points (see the item "after change") No point is added to the command strings "A1A2" and "A1A2A2". A result of computation in step SE6 is presented in the item "after change" shown in FIG. 12B. As evident from this result, a command string having the highest probability of occurrence (point) by assigning a weight as described above is "A1A2A3".

In the next step SE7, the command issuing section 308 determines whether or not there is any probability obtained in step SE6 which exceeds a predetermined probability. Assuming that the above predetermined probability is 50%, in the example shown in FIG. 12B, the command strings. "A1A2A2" and "A1A2A3" whose probabilities of occurrence are 60% and 70% respectively are selected as a command string exceeding a predetermined probability. Therefore, the command issuing section 308 adopts Yes as a determination result in step SE7 and the system control proceeds to step SE8.

What should be noticed here is that in the second operating example, by providing with step SE6 in which a weight is assigned to the probability of occurrence, a command string "A1A2A3" which is never selected in the first operating example is selected. That is, in the second operating example, by registering an addition point shown in FIG. 12A according to an intention of the user U, the accuracy of the estimated command in step SE8 is improved.

In the next step SE8, the command issuing section 308 adopts a command string having the highest probability (in this case, "A1A2A3") in command strings exceeding a predetermined probability as an estimated command and then the system control proceeds to step SE10. In step SE10, the command issuing section 308 establishes the above estimated command. Then, through the aforementioned operation, the command issuing section 308 shown in FIG. 2 issues the above estimated command ("A1A2A3"). Then, a command signal corresponding to the "A1A2A3" is transmitted from the transmitter 500 to the control object appliance group 100.

3. Third Operating Example of First Embodiment

A third operating example of the first embodiment will be described with reference to a flowchart shown in FIG. 13 and FIG. 14A to FIG. 17. This third operating example is an example in which command estimation processing (step SB2 of FIG. 6) in the aforementioned first operating example is carried out considering the number of occurrence of the commands and external factor information (time, date, day and the like). Further, in the third operating example, instead of the flowchart shown in FIG. 7, the command estimation processing is carried out according to a flowchart shown in FIG. 13.

Figure 13:
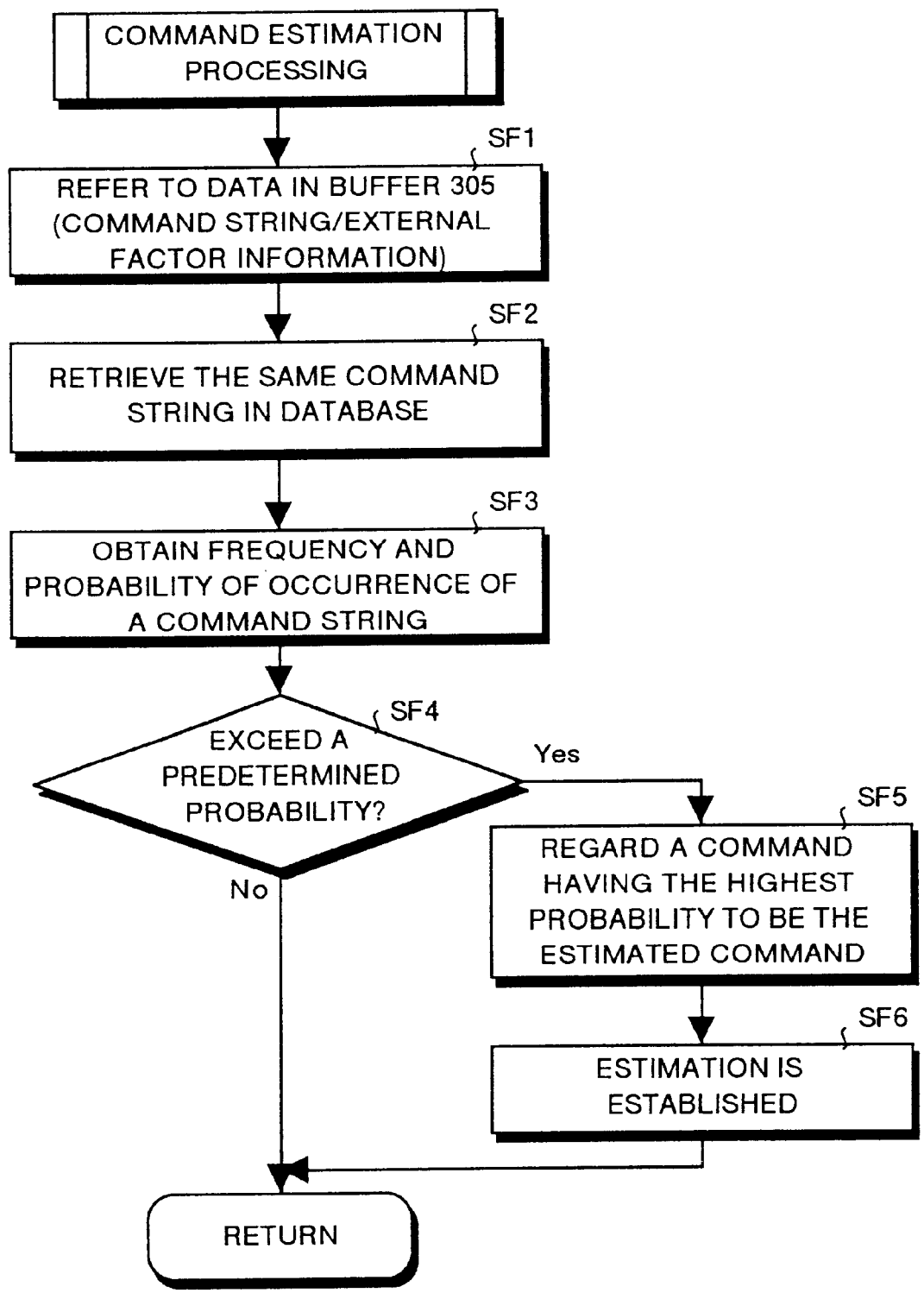
FIG. 13 is a flowchart for explaining a command estimation processing in a third operating example of the first embodiment.

The command estimation processing in the third operating example will be described with reference to FIG. 13. In FIG. 13, steps SF1 and step SF2 correspond to steps SC1 and step SC4 shown in FIG. 7 and steps SF3 to SF6 correspond to steps SC5 to SC7 and step SC9.

Hereinafter, a case in which command estimation is carried out according to a number of occurrence of commands using the database (log) shown in FIG. 14A and a case in which the command estimation is carried out according to a number of occurrence of commands and external factor information (time, date) will be described separately.

First of all, the former case will be described. In this case, it is assumed that the database including a log shown in FIG. 14A is stored in the nonvolatile memory 307 shown in FIG. 2. Under such a presumption, the command string analyzing section 303 shown in FIG. 2 picks up a command which is generated twice or more in the database (log) shown in FIG. 14A and creates the database about high probability command list shown in FIG. 14B. Then, this database is stored in the nonvolatile memory 307.

When with the table shown in FIG. 14B stored in the nonvolatile memory 307, a command "A1" is input to the command string analyzing section 303, the command estimation processing shown in FIG. 13 is carried out through the aforementioned operation. In step SF1 shown in FIG. 13, the command issuing section 308 refers to the command string (in this case, "A1") and the external factor information stored in the buffer 305 and the system control proceeds to step SF2. In step SF2, the command issuing section 308 accesses the nonvolatile memory 307 so as to refer to the database shown in FIG. 14B and retrieves a command containing the above command string "A1". A retrieval result of this case is commands "A1A2", "A1A2A3", "A1A2A4", "A1A3A2" and "A1B2" shown in FIG. 14C.

In the next step SF3, the command issuing section 308 obtains a number of occurrence of commands indicated in the item "command" of FIG. 14C and a probability of occurrence of the command indicated in the item "A1" of FIG. 14D. A table indicated in this FIG. 14C is stored in the nonvolatile memory 307 as a database. The aforementioned probability of occurrence is obtained with a sum of numbers of occurrences of respective commands shown in FIG. 14C as a denominator and a number of occurrence of a given command as a numerator.

In the next step SF4, the command issuing section 308 determines whether or not the probability of each occurrence about the command "A1" obtained in step SF3 exceeds a predetermined probability (for example, 55%). In this case, because all the probabilities of occurrence are less than 55%, any estimated command is not established. Therefore, the command issuing section 308 adopts No as a determination result in step SF4 and the system control proceeds to step SB3 shown in FIG. 6, in which the above described steps are repeated.

Here, when in step SA8 shown in FIG. 5, the command "A2" is input to the command string analyzing section 303 after the aforementioned command "A1", a command string "A1A2" is stored in the buffer 305 through the above described operation. Consequently, in step SF1 shown in FIG. 13, the command issuing section 308 refers to a command string (in this case, "A1A2") and external factor information stored in the buffer 305 and then the system control proceeds to step SF2. In step SF2, the command issuing section 308 accesses the nonvolatile memory 307 and by referring to the database shown in FIG. 14C, retrieves a command including the aforementioned command string "A1A2". In this case, the retrieval result is the command "A1A2", "A1A2A3" and "A1A2A4" shown in FIG. 14C.

In the next step SF3, the command issuing section 308 obtains a probability of occurrence of a command as shown in the item "A1A2" of FIG. 14D. Here, the probability of occurrence can be obtained with a sum (=9) of the numbers of occurrences of the commands "A1A2", "A1A2A3" and "A1A2A4" shown in FIG. 14C as a denominator and a number of occurrence of a given command as a numerator. In the next step SF4, the command issuing section 308 determines whether or not a probability of occurrence obtained in step SF3 exceeds a predetermined probability (for example, 55%). In this case, because the probability of occurrence of the command "A1A2A3" is 56%, the command issuing section 308 adopts Yes as a determination result in step SF4 and then the system control proceeds to step SF5.

In step SF5, the command issuing section 308 adopts the command ("A1A2A3") shown in FIG. 14D as an estimated command and then the system control proceeds to step SF6. In step SF6, the command issuing section 308 establishes the above estimated command. Then, the command issuing section 308 shown in FIG. 2 issues the above estimated command ("A1A2A3") through the above described operation. Consequently, a command signal corresponding to the "A1A2A3" is transmitted from the transmitter 500 to the control object appliance group 100.

That is, at this time, although the user U does not do anything but only the key operation for issuing the commands "A1" and "A2", the command "A3" is issued from the remote control device 300. Therefore, after the commands "A1" and "A2" are issued on the side of the remote controller group 200 without any consciousness of the user U, remote control relating to a serial operation is automatically carried out.

Next, a case in which command estimation is carried out according to the number of occurrence of commands and external factor information (time, day) using the database (log) shown in FIG. 15A will be described. In this case, it is assumed that the database including the log shown in FIG. 15A is stored in the nonvolatile memory 307 shown in FIG. 2. That is, external factor information (time or day) as well as the command exists in the log of the database.

With such a presumption, the command string analyzing section 303 shown in FIG. 2 picks up a command string constituted of two or more commands in the database (log) shown in FIG. 15A, creates a database shown in FIG. 15B and then stores it in the nonvolatile memory 307.

Further, the command string analyzing section 303 creates a database shown in FIG. 16 from the database shown in FIG. 15B and stores it in the nonvolatile memory 307. The database shown in FIG. 16 indicates the number of occurrence of a command in every predetermined time interval according to time and day shown in FIG. 15B and is created for every predetermined time interval. The predetermined time interval mentioned here is a time interval of, for example, 10 minutes before and after a time (current time) in which the command estimation is carried out.

In the item "command" of FIG. 16, commands indicated in FIG. 15B are presented. In the item "total data", the number of occurrence about all commands shown in FIG. 15B is presented. In the item "data limited to current time", the number of occurrence about commands input in a predetermined time interval (for example, 20:00±10 minutes) is presented. Further, in the time "current time and data limited to current day", the number of occurrence about commands input in the aforementioned predetermined time interval and at the current day is presented about every day.

When with the database shown in FIG. 16 stored in the nonvolatile memory 307, the command "A1" is input to the command string analyzing section 303, the command issuing section 308 refers to a command string (in this case, "A1") and external factor information stored in the buffer 305 through the aforementioned operation. Here, it is assumed that time is 20:00 and the day is Monday as the external factor information.

The command issuing section 308 then accesses the nonvolatile memory 307 and by referring to the database (see FIG. 16) corresponding to the aforementioned external factor (20:00, Monday), retrieves a command including the aforementioned command string "A1". In this case, a result of retrieval is the commands "A1A2", "A1A2A2", "A1A2A3", "A1A2A 4" and "A1B3" shown in FIG. 17.

The command issuing section 308 then obtains a probability of occurrence respectively indicated in the item "total data", item "data limited to current time" and "current time and data limited to current day" shown in FIG. 17. Next, for example, when the item "data limited to current time" is specified by the user of these three items, the command issuing section 308 establishes an estimated command by comparing each probability of occurrence in the item "data limited to current time" with a predetermined probability (for example, 65%). In this case, the command issuing section 308 establishes the command "A1A2A3" whose probability of occurrence is 67% as an estimated command. Then, the command issuing section 308 shown in FIG. 2 issues the aforementioned estimated command ("A1A2A3") through the operation described above. Consequently, a command signal corresponding to the "A1A2A3" is transmitted from the transmitter 500 to the control object appliance group 100.

That is, at this time, although the user U does not do anything but only the key operation for issuing the command "A1", the commands "A2" and "A3" are issued from the remote control device 300. Therefore, after the command "A1" is issued on the side of the remote controller group 200 without any consciousness of the user U, a serial operation for the remote control is automatically carried out.

Further, for example, when the item "current time and data limited to current day" is specified by the user of the aforementioned three items, the command issuing section 308 compares each probability of occurrence in the item "current time and data limited to current day" with a predetermined probability (for example, 65%) and then establishes a command whose probability of occurrence is 100% as an estimated command. The command issuing section 308 shown in FIG. 2 issues the estimated command ("A1A2A3") through the above described operation. Consequently, a command signal corresponding to the "A1A2A2" is transmitted from the transmitter 500 to the control object appliance group 100.

That is, at this time, although the user U does not do anything but only the key operation for issuing the command "A1", the commands "A2" and "A2" are issued from the remote control device 300. Therefore, after the command "A1" is issued on the side of the remote controller group 200 without any consciousness of the user U, a serial operation for remote control is automatically carried out.

As described above, according to the third operating example of the first embodiment, results of monitor on command issued from the remote controller group 200 are held in a database with external factor information (time, day, or date) and based on this database, a command to be issued from the remote controller group 200 is automatically issued on the side of the remote control device 300 considering time factor. Therefore, the accuracy of the estimated command can be improved, so that ease of use of this system can be further improved.

Figure 18:
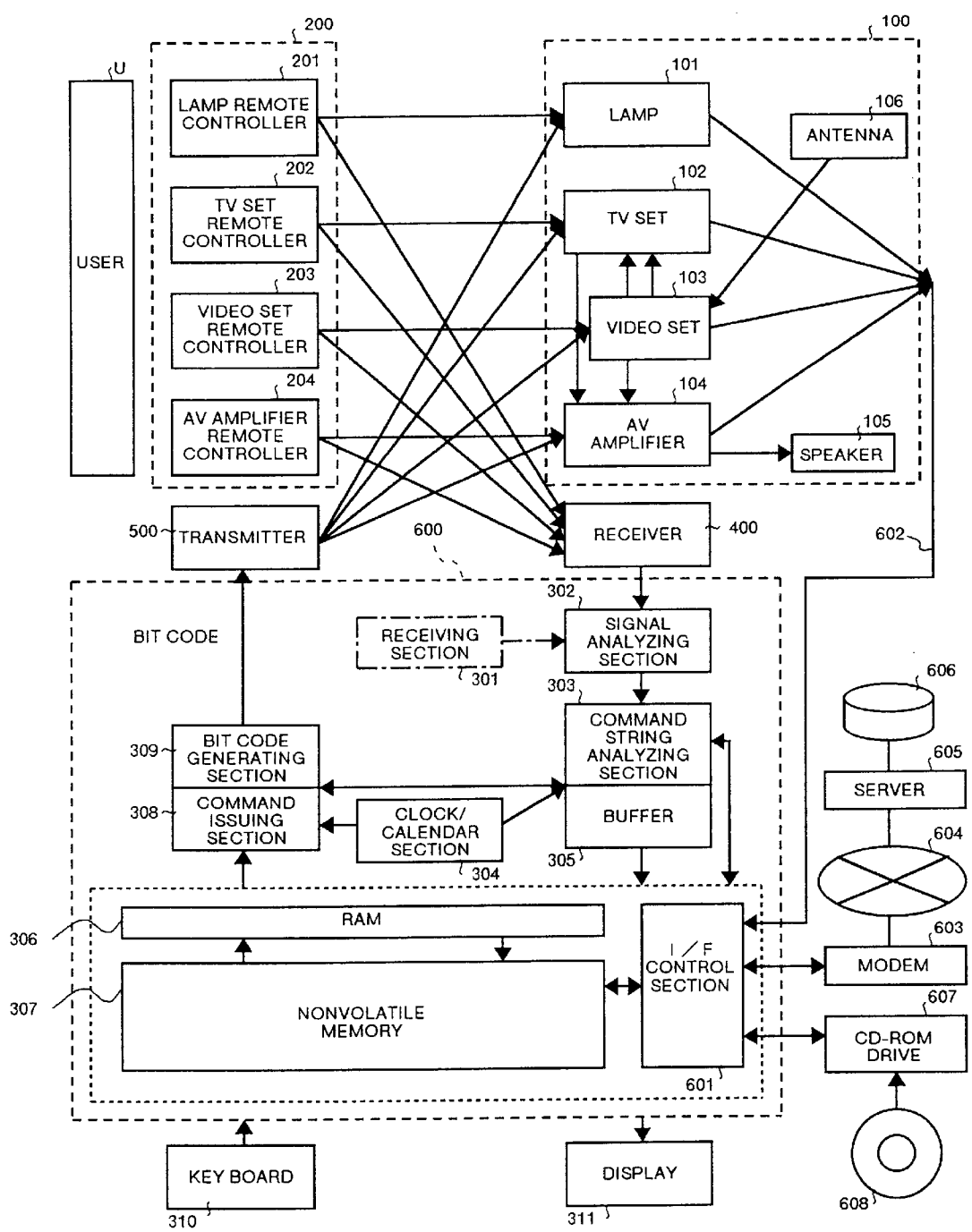
FIG. 18 is a block diagram showing a structure of a second embodiment of the present invention.

FIG. 18 is a block diagram showing a configuration of the second embodiment of the present invention. In this Figure, the same reference numerals are attached to the sections corresponding to those of FIG. 2 and a description thereof is omitted. In FIG. 18, a remote control device 600 is provided instead of the remote control device 300 shown in FIG. 2. Further, in FIG. 18, an I/F control device 601, an interface 602, a modem 603, a network 604, a server 605, a storage device 606, a compact disk read only memory (CD-ROM) drive 607 and a CD-ROM 608 are newly provided.

In this second embodiment, information (see FIG. 19) about the control object appliance (for example, TV set 102) corresponding to a command input to the command string analyzing section 303 is obtained from outside and the command estimation is carried out considering this control object appliance information. This control object appliance information is used to improve the accuracy of the estimated command in the command estimation processing (FIG. 22) which will be described later.

The control object appliance information mentioned here 10 includes "command content", "appliance name" and "manufacturer" shown in FIG. 19. For example, as the control object appliance information about the command "A1" expressed in symbol, "ch1" (command) indicating selection of channel 1 in the TV set 102, "TV" (appliance name) indicating a name of 1S that control object appliance (in FIG. 19, TV set 102) and "X company" (manufacturer) indicating a manufacturer of that control object appliance are mentioned. In FIG. 19, "UNKNOWN" and "UNKNOWN-A" mean that the data is not available.

Further, the remote control device 600 shown in FIG. 18 is so structured as to be capable of obtaining the aforementioned control object appliance information from the control object appliance group 100 outside, storage device 606 or CD-ROM 608. Here, each control object appliance group 100 contains its control object appliance information and the control object appliance information about the control object appliance group 100 is stored in the storage device 606 and CD-ROM 608 in the form of a file.

The I/F (interface) control section 601 shown in FIG. 18 controls input/output between the remote control device 600 and an outside device. The interface 602, modem 603 or CD-ROM drive 607 are connected to this I/F control section 601. The aforementioned interface 602 connects the I/F control section 601 to the control object appliance group 100. The modem 603 is a communication device for accessing the server 605 via the network 604. The storage device 606 in which the control object appliance information is stored in the form of a file is connected to this server 605. The CD-ROM drive 607 is a device for reading the control object appliance information stored in the CD-ROM 608. This CD-ROM 608 is supplied by manufacturer of the control object appliance group 100 and the like.

Figure 20:
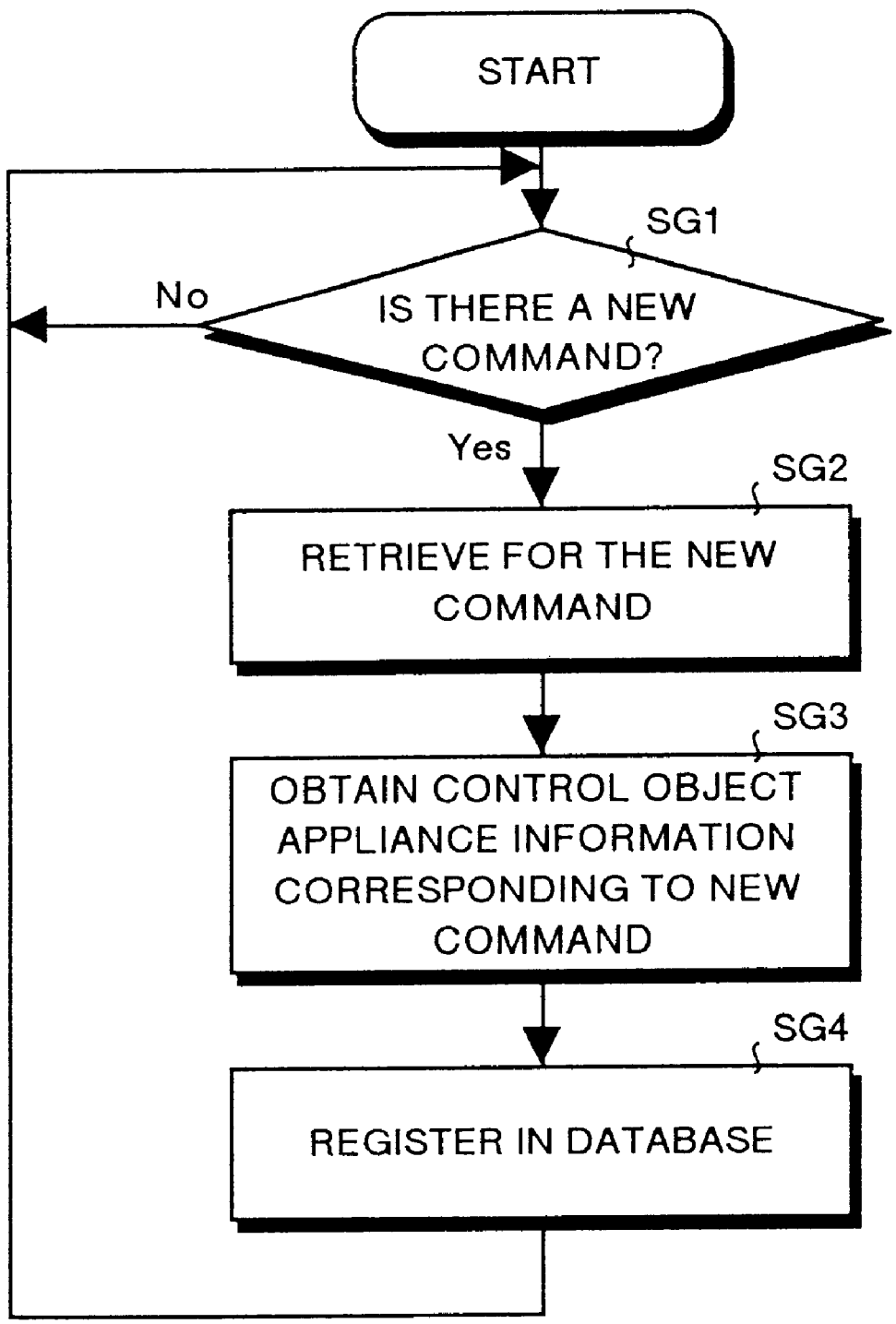
FIG. 20 is a flowchart for explaining operations for acquisition and registration of information of the control object appliance according to the second embodiment.

Next, an example of obtaining the aforementioned control object appliance information and registering it in the database shown in FIG. 19 will be described with reference to a flowchart shown in FIG. 20. This database is stored in the nonvolatile memory 307 shown in FIG. 18 and corresponds to the "code/symbol conversion table" portion for new command registration shown in FIG. 9. In step SG1 shown in FIG. 20, the command string analyzing section 303 (see FIG. 18) determines whether or not a command (for example, "A1" shown in FIG. 19) input via the signal analyzing section 302 is a new command like the previously described first embodiment, and if the determination result is No the same determination is repeated.

In this case, assuming the input command ("A1") is a new command, the system control proceeds to step SG2, the command string analyzing section 303 carries out retrieval on the new command ("A1"). More specifically, the command string analyzing section 303 accesses the control object appliance group 100 via the I/F control section 601 and the interface 602 so as to retrieve for any control object appliance information of a new command ("A1") Further, the command string analyzing section 303 accesses the storage device 606 through the I/F control section 601, the modem 603, the network 604 and the server 605 so as to make the above retrieval. Likewise, the command string analyzing section 303 accesses the CD-ROM 608 through the I/F control section 601 and CD-ROM drive 607 so as to make the above retrieval. As the retrieval method, the above three methods are available.

In the next step SG3, after the command string analyzing section 303 obtains the control object appliance information (ch1, TV and X company) about the new command "A1" shown in FIG. 19 through the aforementioned retrieval, the system control proceeds to step SG4. In step SG4, the command string analyzing section 303 registers the control object appliance information with a relation to the aforementioned new command in the database shown in FIG. 19, and then the system control is returned to step SG1 in which the above process is repeated. Unless the control object appliance information is obtained in step SG4, "UNKNOWN" and "UNKNOWN-A" are registered in the database as shown in FIG. 19.

Further, it is permissible to update the database by retrieving for other command similar to a command serving as a retrieval key and then obtaining the control object appliance information about the other command. As an example, with the database being in a certain condition shown in the left column of FIG. 21, the command string analyzing section 303 executes the retrieval about the command "B2" in the above method and also carries out retrieval about commands "B1", "B3" and "B4" similar to the command "B2". Then, when the control object appliance information about the commands "B1" to "B4" is obtained, the command string analyzing section 303 updates the database as shown in the right column of FIG. 21.

1. First Operating Example of the Second Embodiment

Figure 22:
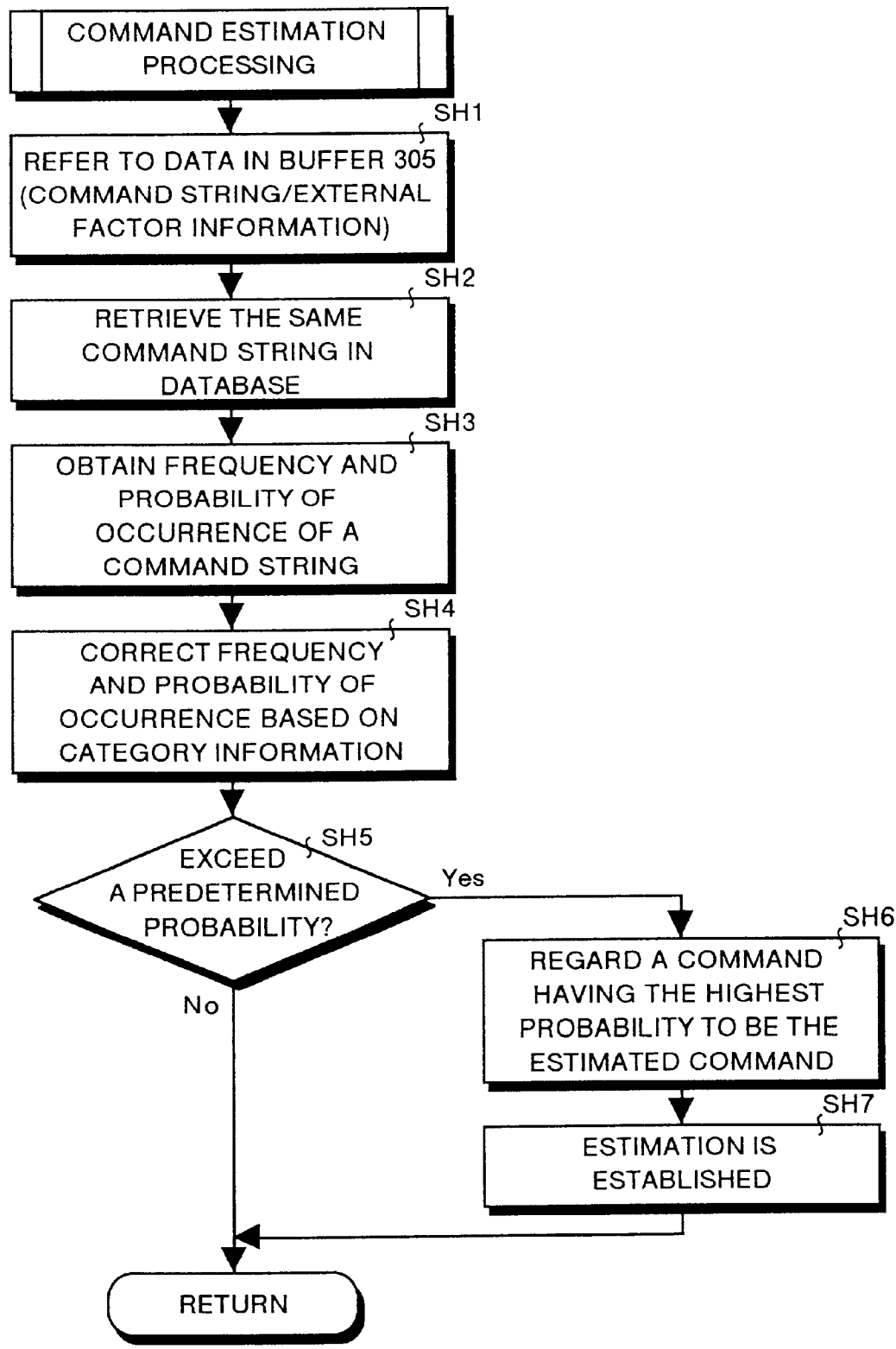
FIG. 22 is a flowchart for explaining the command estimation processing in a first operating example of the second embodiment.

A first operating example of the second embodiment will be described with reference to a flowchart shown in FIG. 22. This first operating example is an example in which the command estimation processing (step SB2 of FIG. 6) according to the first operating example of the first embodiment is carried out considering the control object appliance information. In the first operating example, the command estimation processing is carried out according to a flowchart shown in FIG. 22 instead of the flowchart shown in FIG. 7.

Hereinafter, the command estimation processing according to the first operating example will be described with reference to FIG. 22. In FIG. 22, steps SH1 and SH2 correspond to steps SC1 and SC4 of FIG. 7, step SH3 corresponds to step SC5 of FIG. 7 and steps SH5 to SH7 correspond to steps SC6–SC9 shown in FIG. 7. That is, in FIG. 22, the step SH4 is a new step.

It is assumed that the database containing the commands and control object appliance information shown in FIG. 19 is stored in the nonvolatile memory 307 shown in FIG. 18. When for example, the command "A1" is input to the command string analyzing section 303 with such a presumption, the command estimation processing shown in FIG. 22 is carried out through the above described operation. That is, in step SH1 shown in FIG. 22, the command issuing section 308 refers to a command string (in this case, "A1") and external factor information stored in the buffer 305 and then the system control proceeds to step SH2. In step SH2, the command issuing section 308 accesses the nonvolatile memory 307 and by referring to the log of the database like the previously described operation, retrieves a command containing the above command string "A1". In this case, a result of this retrieval is "A1B2B5, "A1A3A4", "A1A3A4A6" "A1A3A4A6A8", "A1B2B4" and "A1Z1" shown in FIG. 23.

In the next step SH3, the command issuing section 308 obtains a number of occurrence (numerator) of a command shown in item "probability prior to correction" of FIG. 23 and a probability of occurrence (number in the parentheses) of the command and then the system control proceeds to step SH4. In step SH4, the command issuing section 308 corrects the number of occurrence and probability of occurrence obtained in step SH3 based on category information. The category information mentioned here refers to "command content", "appliance name", "manufacturer" and the like obtained from the control object appliance information (see FIG. 19).

In this case, the command issuing section 308 obtains the control object appliance information corresponding to each command shown in FIG. 23 from the database shown in FIG. 19. Then, the command issuing section 308 excludes commands inappropriate as a candidate for the estimated command from plural commands of FIG. 23 based on the category information such as "command content", "appliance name" and the like contained in the above control object appliance information. The criterion for this exclusion is, for example, a case in which TV channels are selected in succession or a case in which a command considered to be less related to a TV channel selection command follows.

More specifically, because the commands "A1", "A2", "A3", "A4" . . . shown in FIG. 19 are TV channel selection commands, and of plural commands shown in FIG. 23 the commands "A1A3A4", "A1A3A4A6" and "A1A3A4A6A8" are commands obtained when the TV channels are selected in succession, these commands are excluded. Likewise, assuming the command "Z1" is a command considered to be less related to the channel selection command, the command "A1Z1" shown in FIG. 23 is excluded.

Next, as indicated in item "probability after correction" shown in FIG. 23, the command issuing section 308 obtains the number of occurrence and probability of occurrence about the remainder commands "A1B2B5" and "A1B2B4" and then the system control proceeds to step SH5. After that, processes in steps SH6 and SH7 are carried out.

As described above, according to the first operating example of the second embodiment, commands inappropriate as a candidate for the estimated command are excluded from plural commands of FIG. 23 based on category information. Thus, the accuracy of the estimated command is improved.

2. Second Operating Example of Second Embodiment

A second operating example of the second embodiment will be described with reference to a flowchart shown in FIG. 24. This second operating example is an example in which the storage processing (see FIG. 8) of the first embodiment is carried out considering the control object appliance information.

Hereinafter, the storage processing of the second operating example will be described with reference to FIG. 24. In FIG. 24, steps SI1 to SI5 correspond to steps SD1 to SD5 shown in FIG. 8. That is, in FIG. 24, step SI6 to SI10 are new steps. Here, it is assumed that a command string ("A1A2X1D1") shown in FIG. 25A is registered in the log of the database stored in the nonvolatile memory 307 shown in FIG. 18 and that a command string ("A1A2X99D1") shown in FIG. 25B is stored in the buffer 305. Here, in the above command string ("A1A2X99D1"), the command "X99" is a new command.

Figure 24:
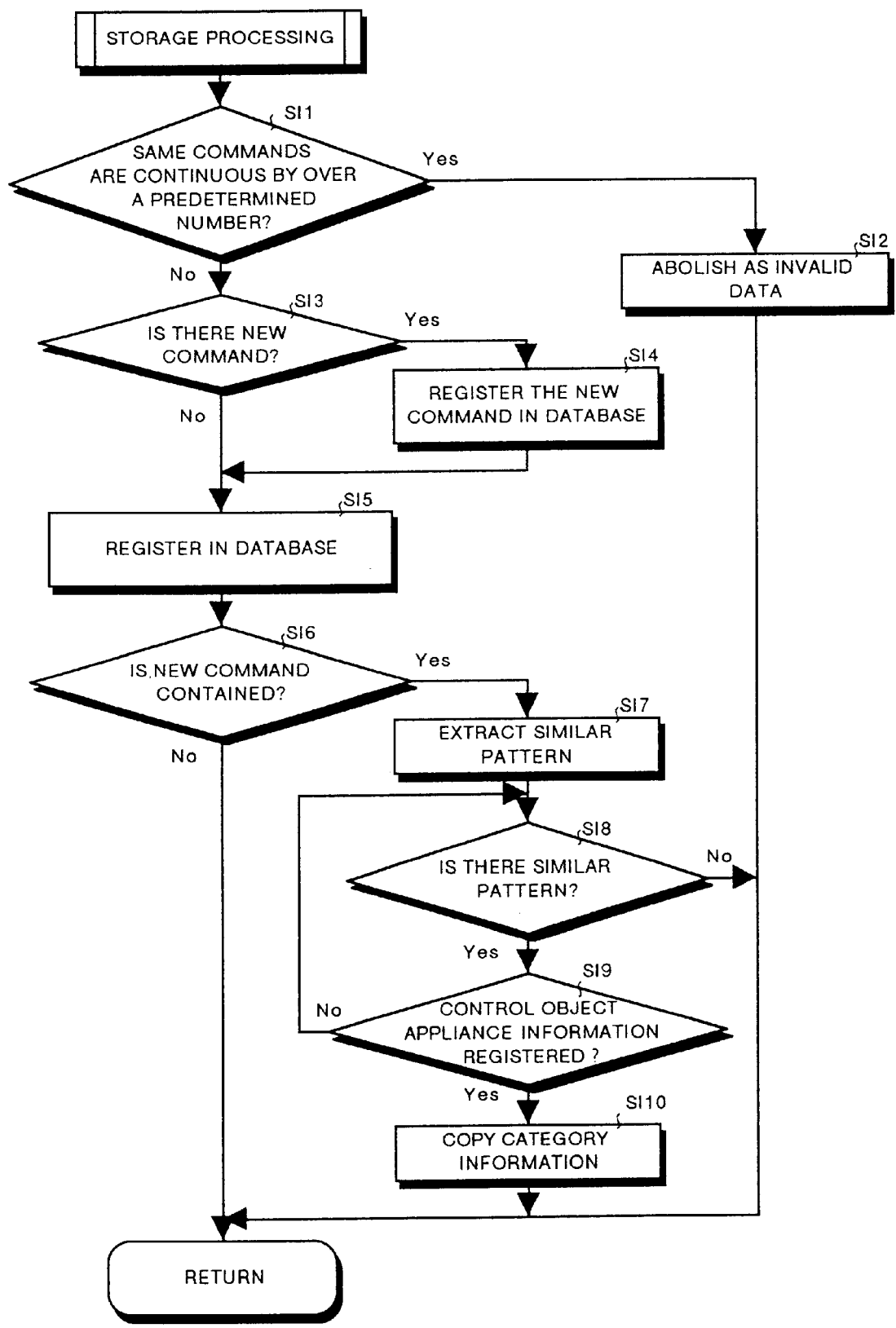
FIG. 24 is a flowchart for explaining the storage processing in the second operating example of the second embodiment.
Figure 25A:
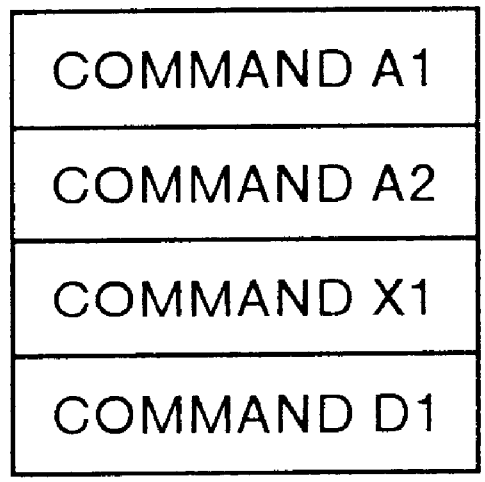
FIG. 25A and FIG. 25B are diagrams for explaining the second operating example of the second embodiment.
Figure 25B:
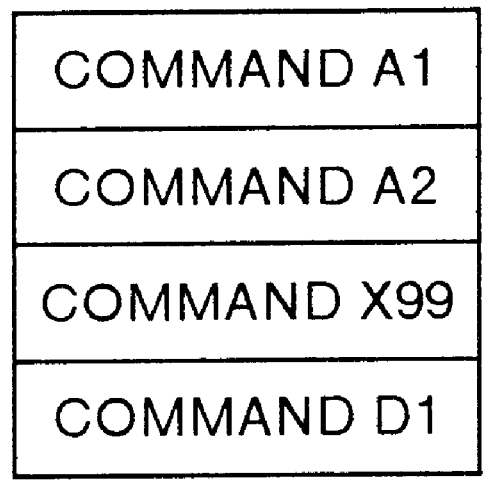

With such a presumption, in step SI1 shown in FIG. 24, the command string analyzing section 303 refers to the buffer 305 so as to determine whether or not the same commands are continuous with more than a predetermined number (for example, 10) in the command string ("A1A2X99D1"). In this case, the command string analyzing section 303 adopts No as the determination result so that the system control proceeds to step SI3.

In step SI3, the command string analyzing section 303 determines whether or not there is a new command in the above command string. In this case, because the command "X99" is a new command, the command string analyzing section 303 adopts Yes as the determination result in step SI3 and then the system control proceeds to step SI4. In step SI4, the command string analyzing section 303 additionally registers the above command "X99" (expressed in symbol) in the "code/symbol conversion table" of the database with a correspondence to the command expressed in code as a new command and then the system control proceeds to step SI5. In step SI5, the command string analyzing section 303 additionally registers a command string ("A1A2X99D1") stored in the buffer 305 with a relation to the external factor information (not shown) in the "log" of the database and then the system control proceeds to step SI6.

In step SI6, the command string analyzing section 303 determines whether or not a new command is contained in the command string ("A1A2X99D1") like in the aforementioned step SI3. If this determination result is No, the system control proceeds to step SA10 (see FIG. 5). In this case, because the command "X99" is a new command, the command string analyzing section 303 adopts Yes as the determination result in step SI6 and then the system control proceeds to step SI7.

In step SI7, the command string analyzing section 303 retrieves the "code/symbol conversion table" in the database of the nonvolatile memory 307 so as to extract a command string having a pattern similar to the command string ("A1A2X99D1") registered in step SI5. In this case, it is assumed that a command string ("A1A2X1D1") shown in FIG. 25A is extracted as a command string having a similar pattern. That is, because the command string ("A1A2X1D1") has commands "A1", "A2" and "D1" which are common to the command string ("A1A2X99D1") shown in FIG. 25B, it is considered that the command string ("A1A2X1D1") has a similar pattern. In step SI7, plural command strings having a similar pattern may be extracted.

In the next step SI8, the command string analyzing section 303 determines whether or not a command string having a similar pattern exists in step SI7. In this case, the command string analyzing section 303 adopts Yes as the determination result and then the system control proceeds to step SI9. In step SI9, the command string analyzing section 303 determines whether or not control object appliance information about the command "X1" corresponding to a new command "X99" (see FIG. 25B) in command string shown in FIG. 25A is registered in the database shown in FIG. 19.

If this determination result is Yes, the command string analyzing section 303 proceeds to step SI10, in which category information (for example, "appliance name" shown in FIG. 19) of the command "X1" and category information ("appliance name") of the command "X99" are considered to be the same. Next, the command string analyzing section 303 copies the category information of the command "X1" as category information of the command "X99" in a storage area for the control object appliance information in the database (see FIG. 19) in which the command "X99" is registered. As described above, because in the second operating example, the category information of a new command is automatically registered based on the above similar pattern, the control object appliance information can be obtained only within the remote control device 300 without searching for the control object appliance information from outside.

On the other hand, if the determination result in step SI9 is No, the command string analyzing section 303 proceeds to step SI8, in which it is determined whether or not a next command string having a similar pattern exists. If this determination result is No, the system control proceeds to step SA10 shown in FIG. 5, in which the previously described step is repeated.

Figure 26:
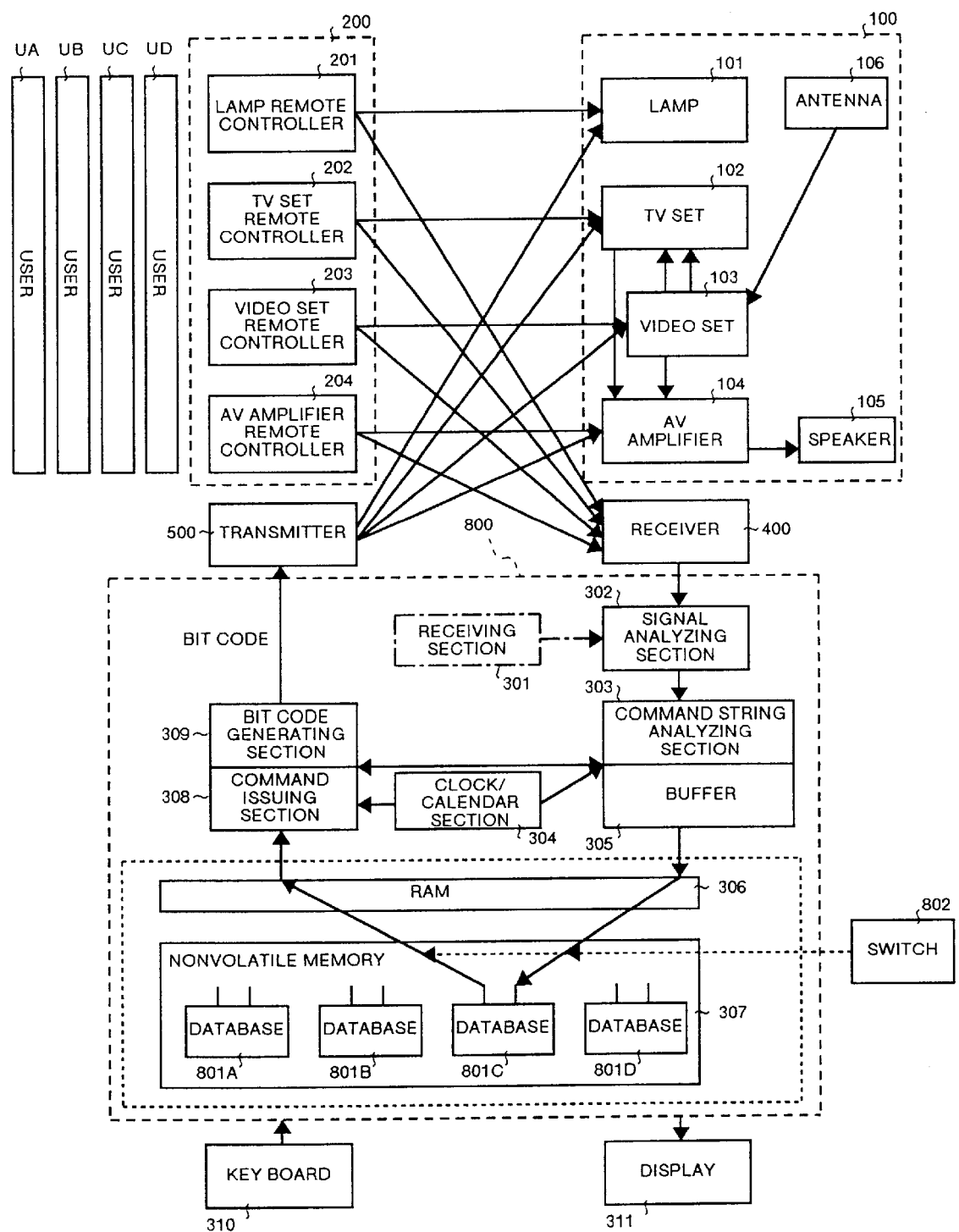
FIG. 26 is a block diagram showing a configuration of a third embodiment of the present invention.

FIG. 26 is a block diagram showing a configuration of the third embodiment of the present invention. In this Figure, the same reference numerals are attached to the sections corresponding to those of FIG. 2 and a description thereof is omitted. In FIG. 26, instead of the remote control device 300 shown in FIG. 2, a remote control device 800 is provided and additionally, a switch 802 is newly provided. Further, in FIG. 26, databases 801A to 801D corresponding to plural users UA to UD are stored in the nonvolatile memory 307.

According to the third embodiment, the databases 801A to 801D are provided for each user paying an attention to the fact that there is a deflection in the key operation between users operating the remote control group 200, in order to improve the accuracy of the estimated command.

In FIG. 26, the databases 801A to 801D are stored in the nonvolatile memory 307 so as to correspond to each of users UA to UD and the basic data structure is equal to the aforementioned database (see FIG. 19). The switch 802 is operated by users UA to UD so as to change over database for use in the remote control device 800. As this switch, a manual switch 802, a switch for changing over by voice recognition, an electronic switch in which a touch panel is bonded to a display indicating the content for the change over, a switch for changing over by inserting a magnetic card and the like are available.

With the above described structure, for example when the user U operates the remote controller group 200, the user UC operates the switch 802 so as to change the database for use in the remote control device 800 to the database 801C. Here, the aforementioned command string, external factor information, control object appliance information and the like about the operation of the remote controller group 200 are registered in the database 801C. In the remote control device 800, when the remote controller group 200 is operated by the user UC like the previously described operation, the estimated command is issued based on the aforementioned database 801C so as to execute remote control on the control object appliance group 100.

As described above, according to the third embodiment, the database is provided for each user. Thus, as compared to a case in which a database is shared by plural users, the command estimation can be carried out with the user's own desire and operating pattern reflected. Thus, the accuracy of the estimated command is improved.

Meanwhile, the third embodiment may be so constructed that by using the key board 310, the content of the database 801A can be copied to the database 801B. Here, it is assumed that the user UA corresponding to the database 801A is accustomed to the operation of the remote controller group 200 and frequently operates this. Therefore, because data amount of the database 801A is very large, the accuracy of the estimated command issued based on the database 801A is very high. On the other hand, it is assumed that the user UB corresponding to the database 801B is not accustomed to the operation of the remote controller group 200 and hardly operates this. Therefore, because the data amount of the database 801B is very small, the accuracy of the estimated command issued based on the database 801B is also very low.

Figure 27:
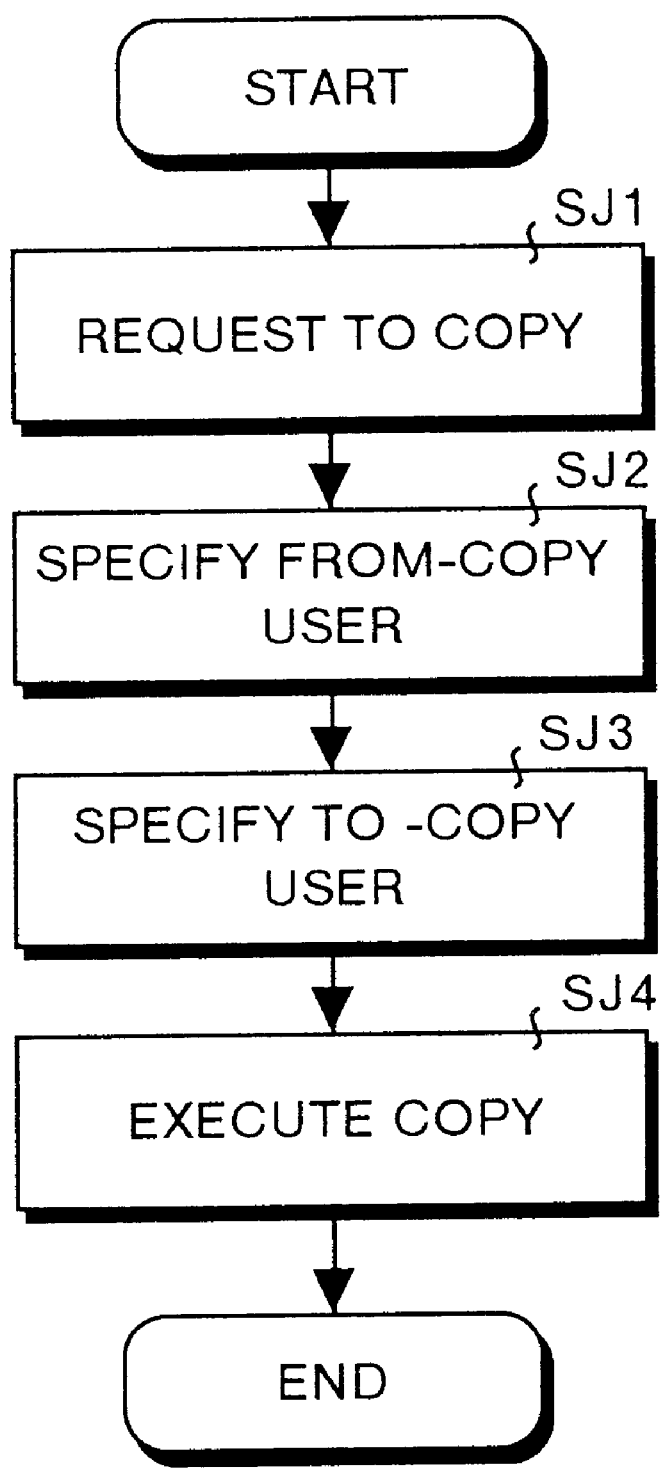
FIG. 27 is a flowchart for explaining an operation of the third embodiment.

The method of copying the content of the database is effective for improving the accuracy of the estimated command even for user not accustomed to the operation of the remote controller group 200. When, for example, the user UA actually copies, he inputs a command for requesting to copy in step SJ1 shown in FIG. 27 and then specifies a copy-from the user (in this case, user UA) in step SJ2. In the next step SJ3, the user UA specifies a copy-to the user (in this case, user UB). Consequently, in step SJ4, the content of the database 801A is copied to the database 801B. The user UB can then use the database 801A.

Figure 28:
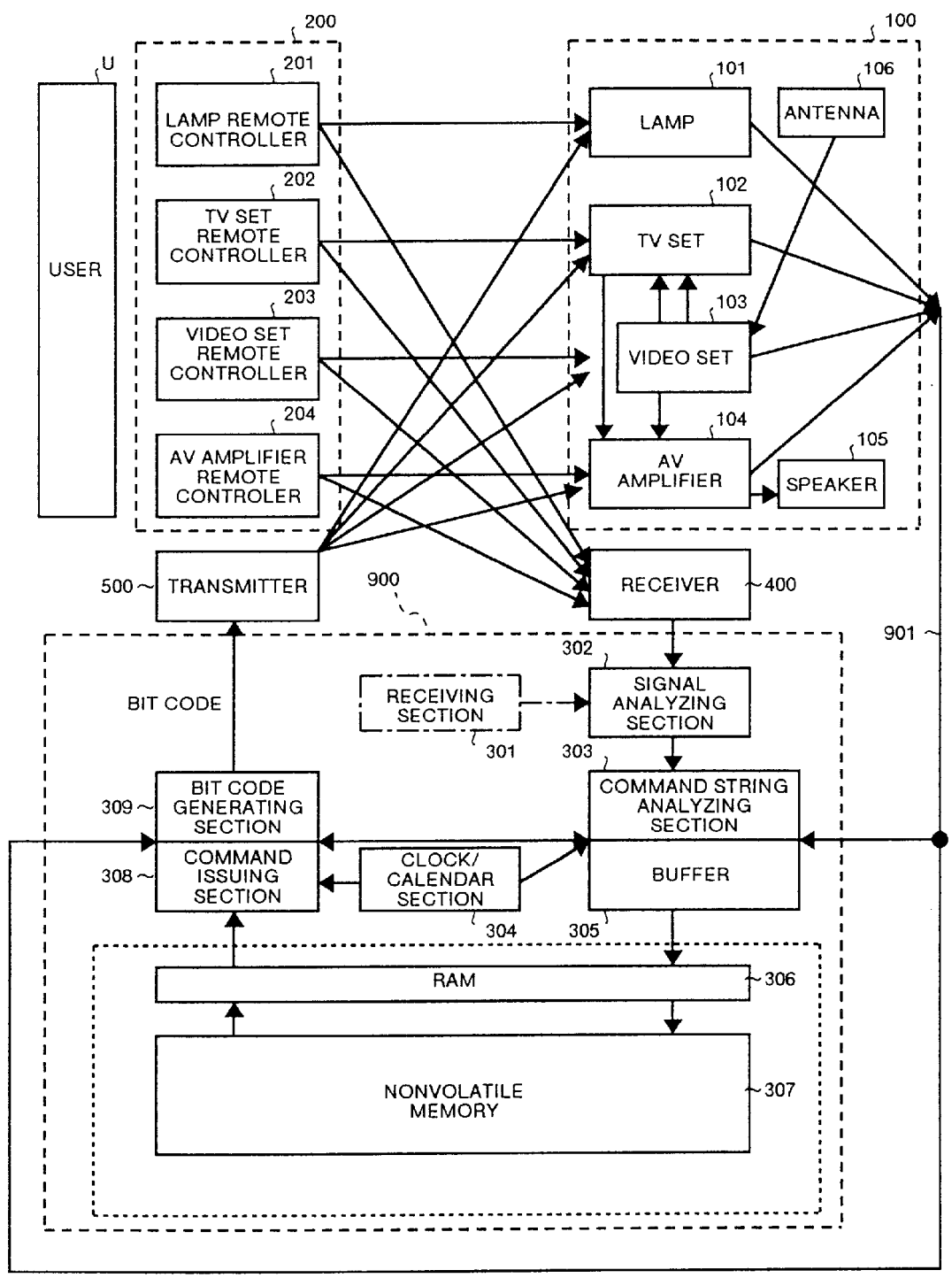
FIG. 28 is a block diagram showing a configuration of a fourth embodiment of the present invention.

FIG. 28 is a block diagram showing a configuration of the fourth embodiment of the present invention. In this Figure, the same reference numerals are attached to the sections corresponding to those of FIG. 2 and a description thereof is omitted. In FIG. 28, a remote control device 900 is provided instead of the remote control device 300 shown in FIG. 2 and an interface 901 is newly provided. This interface 901 connects the command string analyzing section 303 and the command issuing section 308 of the remote control device 900 to the control object appliance group 100.

Here, the remarkable feature of the fourth embodiment is that a state of the control object appliance group 100 is recognized on the side of the remote control device 900, a command is registered in the database considering this recognition result and the estimated command is issued. The state of the control object appliance group 100 mentioned here refers to an operating condition of the control object appliance group 100, and for example, as a state of the video set 103, power ON, on playback, playback end, power OFF and the like.

The command string analyzing section 303 and command issuing section 308 of the remote control device 900 obtain a state of the control object appliance group 100 as state information via the interface 901, and based on this state information, registration of a command to the database and issuance of the estimated command are carried out.

Further, according to the fourth embodiment, the database shown in FIG. 29A is stored in the nonvolatile memory 307. This database comprises toggle operation commands and corresponding toggle operation determining commands. The toggle operation command mentioned here refers to a command for controlling an operation (toggle operation) for changing the state of the control object appliance group 100 by the same command of plural commands to be issued from the remote controller group 200. As an example, "B0", "C0" and "B1" are presented as the toggle operation command in FIG. 29A. The toggle operation command "B0" is a command which is issued successively for changing the state of power supply to the TV set 102 to power ON, power OFF, power ON, power OFF, . . . alternately.

Therefore, the above-mentioned toggle operation command "B0" is divided to toggle operation command for changing the state of power supply from ON to OFF and toggle operation command for changing the state of power supply from OFF to ON. Thus, in the database shown in FIG. 29A, the toggle operation command "B0" is divided to toggle operation determining command "B0 (1)" and toggle operation determining command "B0 (2)" so as to discriminate the former toggle operation from the latter toggle operation.

Likewise, the toggle operation command "C0" is a command which is issued successively for changing the state of power supply to the video set 103 to power ON, power OFF, power ON, power OFF, . . . alternately. The toggle operation command" C0" can be divided to toggle operation command for changing the state of the power supply from ON to OFF and toggle operation command for changing the state of the power supply from OFF to ON. Thus, in the database shown in FIG. 29A, the toggle operation command "C0" is divided into toggle operation determining command "C0 (1)" and toggle operation determining command "C0 (2)" so as to discriminate the former toggle operation from the latter toggle operation.

Further, the toggle operation command "B1" is a command which is issued successively for changing the state of video input in the TV set 102 to video 1, video 2, video 3, video 1, . . . . Here, in the database shown in FIG. 29A, the toggle operation command "B1" is divided to toggle operation determining command "B1 (1)" for changing the state of video input from video 1 to video 2, toggle operation determining command "B1 (2)" for changing the state of video input from video 2 to video 3 and toggle operation determining command "B1 (3)" for changing the state of video input from video 3 to video 1.

Operation of the fourth embodiment will be described here. A basic operation of the fourth embodiment is similar to the first operating example of the first embodiment described with reference to FIG. 5. However, according to the fourth embodiment, the command issue operation of step SA7 shown in FIG. 5 is carried out according to a flowchart shown in FIG. 30 and the storage processing of step SA9 shown in FIG. 5 is carried out according to a flowchart shown in FIG. 31.

Here, in the command string in the database for use in command estimation according to the fourth embodiment, the toggle operation command (see FIG. 29A) is replaced by the toggle operation determining command. Hereinafter, storage processing for registration operation of the above database will be described with reference to FIG. 31. When, for example, a command string "B0A1" (see FIG. 29B) is input to the command string analyzing section 303 shown in FIG. 28, this command string "B0A1" is stored in the buffer 305 through the aforementioned operation. The toggle operation command "B0" (see FIG. 29A) is contained in the above command string "B0A1".

Figure 31:
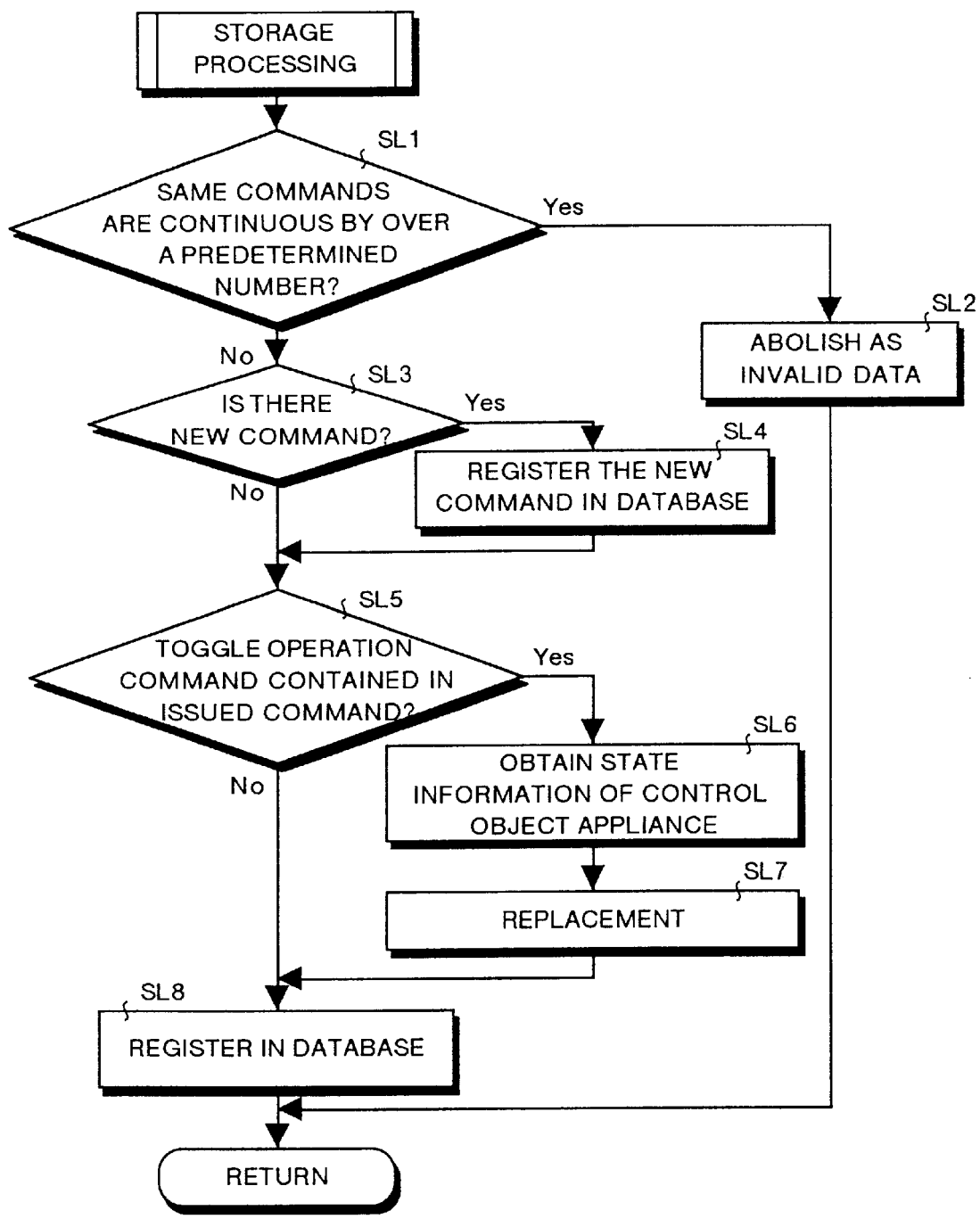
FIG. 31 is a flowchart for explaining a storage processing according to the fourth embodiment.

The storage processing for the above command string "B0A1" is carried out according to a flowchart shown in FIG. 31 through the previously described operation. In step SL1 shown in FIG. 31, the command string analyzing section 303 determines whether or not a predetermined number or more of the same commands continue in a command string stored in the buffer 305 and if this determination result is Yes, the system control proceeds to step SL2. In step SL2, the command string analyzing section 303 abolishes the command string as invalid data and then the system control proceeds to step SA10 (see FIG. 5) in which the above operation is repeated.

In this case, because the same command string is not continuous with a predetermined number or more in the command string "B0A1", the command string analyzing section 303 adopts No as a determination result in step SL1 and then the system control proceeds to step SL3. In step SL3, the command string analyzing section 303 determines whether or not there is a new command. If this determination result is Yes, the system control proceeds to step SL4. In step SL4, the command string analyzing section 303 registers a new command in the database and then the system control proceeds to step SL5.

In this case, assuming that the determination result in step SL3 is No, the command string analyzing section 303 proceeds to step SL5. In step SL5, the command string analyzing section 303 determines whether or not a toggle operation command is contained in the above command string "B0A1". In this case, because a toggle operation command "B0" is contained in the command string "B0A1", the command string analyzing section 303 adopts Yes as the determination result and the system control proceeds to step SL6. If the determination result in step SL5 is No, the command string analyzing section 303 proceeds to step SL8.

In step SL6, the command string analyzing section 303 obtains the state information of the TV set 102 in the control object appliance group 100 via the interface 901 and after that, the system control proceeds to step SL7. In this case, it is assumed that the TV set 102 is in the power ON state. Therefore, the above state information is information indicating the above state (power ON) . In step SL7, the command string analyzing section 303 replaces the toggle operation command "B0" with the toggle operation determining command "B0 (1)" in the command string "B0A1" based on the above state information. Consequently, the command string "B0A1" is replaced with the command string "B0 (1)A1" as shown in FIG. 29B.

In the next step SLB, the command string analyzing section 303 registers a command string "B0 (1)A1" after replacement in the data base for use in command estimation. As described above, in the fourth embodiment, a command string in which a toggle operation command is replaced with a toggle operation determining command is registered in the database.

In a case where a command string prior to replacement is composed of three toggle operation commands like "B1B1B1", the command string analyzing section 303 replaces the above command string "B1B1B1" with a command string constituted of a toggle operation determining command based on the state information (for example, video 3 as video input) obtained from the TV set 102. In this case, the above state information corresponds to a third toggle operation command "B1" in the command string "B1B1B1". Therefore, a toggle operation determining command corresponding to the third toggle operation command "B1" is "B1 (3)". That is, in this case, the command string "B1B1B1" is replaced with the command string "B1 (1) B1 (2) B1 (3)".

Figure 30:
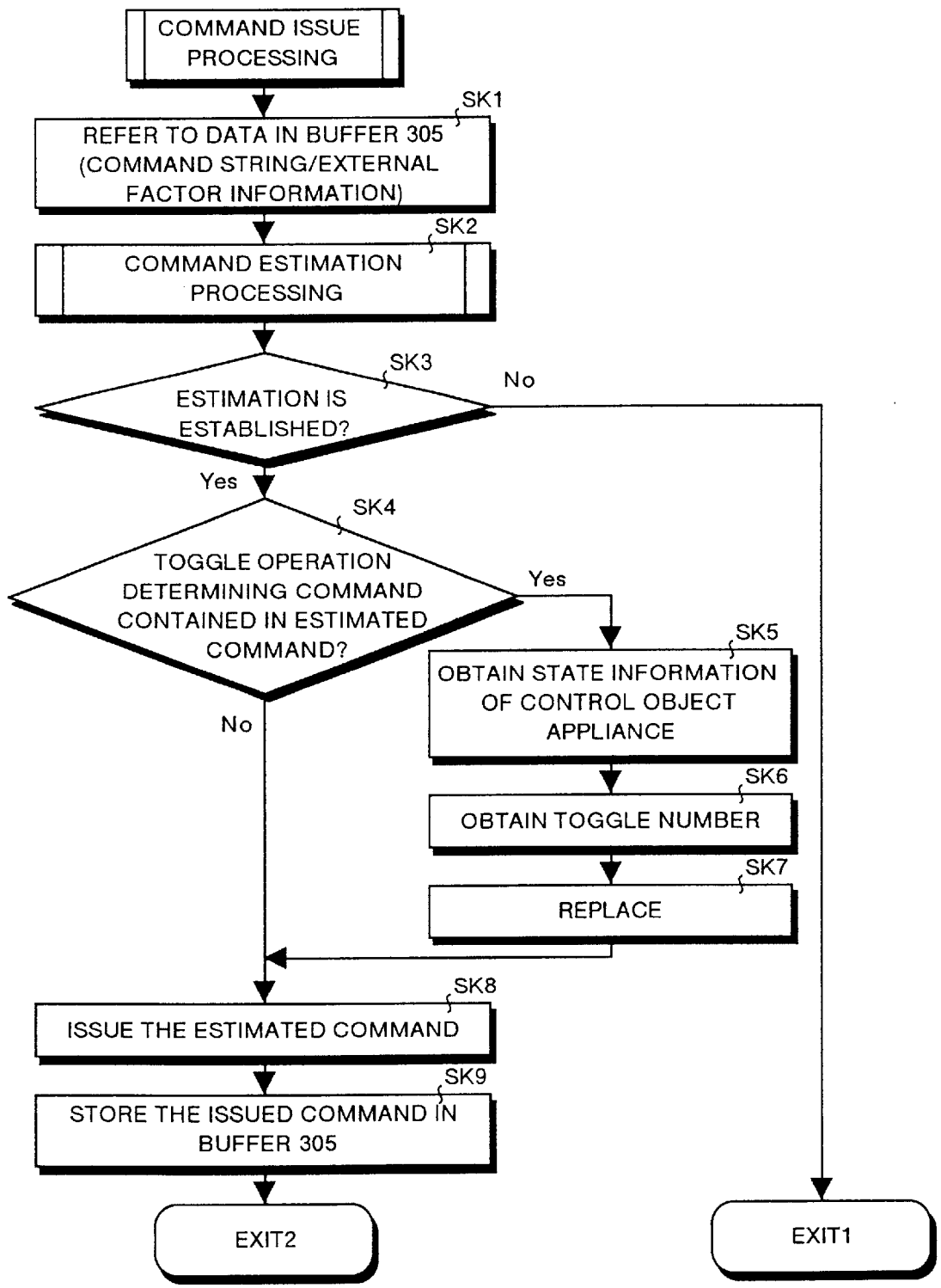
FIG. 30 is a flowchart for explaining a command issue processing of the fourth embodiment.

Next, the aforementioned command issue operation based on the database will be described with reference to FIG. 30. When a command is issued in the remote controller group 200 shown in FIG. 28, the command string and external factor information are stored in the buffer 305 through the previously described operation. Consequently, the command issue processing shown in FIG. 30 is carried out. That is, in step SK1 shown in FIG. 30, the command issuing section 308 refers to data (command string and external factor information) stored in the buffer 305 and then the system control proceeds to step SK2.

Here, it is assumed that for example commands "A1" and "B1" (toggle operation command for the TV set 102) are issued from the remote controller group 200. The aforementioned command "B1" is a toggle operation command for the TV set 102 and issued from the remote controller 202 for the TV set. In this case, it is assumed that the command string "A1B1" is stored in the buffer 305. Further, it is assumed that the state of the TV set 102 is video 1 as video input selected by the above toggle operation command "B1" as shown in FIG. 29A.

In step SK2, the command issuing section 308 executes the command estimation processing (see FIG. 7) and after that, the system control proceeds to step SK3. In step SK3, the command issuing section 308 determines whether or not an estimated command is established in step SK2. If the determination result is No, the system control proceeds to step SAB (see FIG. 5). In this case, assuming that the estimated command containing the toggle operation determining command is established, the command issuing section 308 adopts Yes as the determination result in step SK3 and then the system control proceeds to step SK4. In this case, it is assumed that the above estimated command is "A1B1 (1) B1 (2) B1 (3)".

In step SK4, the command issuing section 308 determines whether or not the toggle operation determining command "B1 (1) B1 (2) B1 (3)" (see FIG. 29A) is contained in the estimated command "A1B1 (1) B1 (2) B1 (3)". If this determination result is No, the system control proceeds to step SK8. In this case, because the toggle operation determining command is contained in the estimated command, the command issuing section 308 adopts Yes as the determination result in step SK4 and then the system control proceeds to step SK5. In step SK5, the command issuing section 308 obtains the state information from a control object appliance corresponding to that toggle operation determining command in the control object appliance group 100 via the interface 901.

In this case, the command issuing section 308 obtains the state information from a TV set 102 corresponding to the toggle operation determining command "B1 (1) B1 (2) B1 (3)". Here, it is assumed that the state (video input) of the TV set 102 is changed from the previously mentioned video 1 to video 2. This is because the same toggle operation command "B1" as a precedingly issued toggle operation command "B1" is issued in the remote controller 202 for TV set during a processing by the command issuing section 308.

Therefore, in this case, the state information obtained from the TV set 102 is information indicating video input= video 2. In the next step SK6, the command issuing section 308 obtains a number of inputs of the toggle operation commands (toggle number) input to the control object appliance group 100 (in this case, TV set 102) from the state information (in this case, video input=video 2) and the system control proceeds to step SK7. In this case, because the state information is video input =video 2, the number of toggles is two.

In step SK7, the command issuing section 308 replaces the estimated command "A1B1 (1) B1 (2) B1 (3)" estimated in step SK2 with an estimated command conforming to the state of the TV set 102 considering the aforementioned number of toggles (=2). More specifically, toggle operation determining commands "B1 (1)" and "B1 (2)" corresponding to two toggle operations are deleted from the estimated command "A1B1 (1) B1 (2) B1 (3)". This is because the video set 103 is already remote-controlled based on the toggle operation determining commands "B1 (1)" and "B1 (2)". The estimated command "A1B1 (1) B1 (2) B1 (3)" is replaced with the estimated command "A1B1 (3)".

In the next step SK8, the command issuing section 308 issues the estimated command "A1B1 (3)" after replacement. Consequently, the estimated command "A1B1 (3)" after the replacement is transmitted from the transmitter 500 as a command signal so that the state (video input) of the TV set 102 is changed from video 2 to video 3.

According to the fourth embodiment, it is permissible to obtain the state information from the control object appliance group 100 via the interface 901 after the estimated command is issued and then determine whether or not the estimated command is received properly by the control object appliance group 100 according to this state information. Here, unless the estimated command is received properly by the control object appliance, the estimated command may be issued again.

According to the fourth embodiment, as described above, the estimated command is issued considering the state of the control object appliance group 100. Therefore, the reliability of the system is improved.

Figure 32:
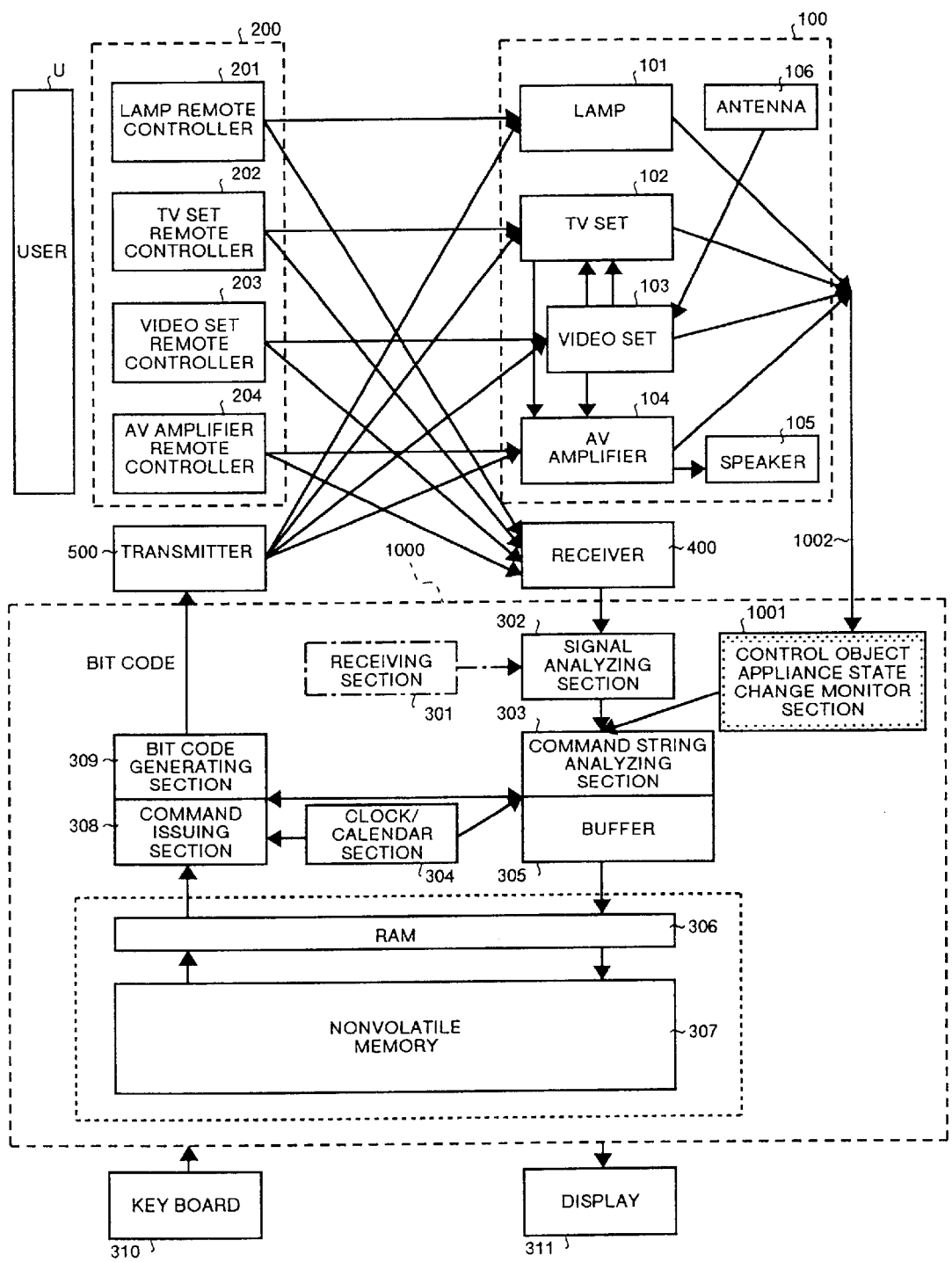
FIG. 32 is a block diagram showing a configuration of a fifth embodiment of the present invention.

FIG. 32 is a block diagram showing a configuration of the fifth embodiment of the present invention. In this Figure, the same reference numerals are attached to the sections corresponding to those of FIG. 2 and a description thereof is omitted. In FIG. 32, a remote control device 1000 is provided instead of the remote control device 300 and further, a control object appliance state change monitor section 1001 is newly provided.

In this fifth embodiment, the state change of the control object appliance group 100 as well as the aforementioned command input can be a trigger for command issue processing. That is, according to the fifth embodiment, the state of the control object appliance group 100 is monitored and if there is a change in this state, a command is automatically issued corresponding to the state change so as to remote-control the control object appliance group 100. The state mentioned here refers to an operating condition of the control object appliance group 100, for example, as the state of the video set 103, power ON, on playback, playback end, power OFF and the like are included therein.

The control object appliance state change monitor section 1001 shown in FIG. 32 is connected to the control object appliance group 100 via an interface 1002 so as to monitor the control object appliance group 100 and output a monitor result to the command string analyzing section 303. Further, a command string corresponding to the state change of the control object appliance group 100 is stored in the nonvolatile memory 307 as a state change database. A command string which should be automatically issued corresponding to state change information is stored in this state change database.

The above state change information is information generated based on a monitoring result of the control object appliance state change monitor section 1001 and it indicates a content of the change when the state of the control object appliance group 100 changes. If the information about the state change of the video set 103 is taken as an example, then this information is the information indicating that the state is changed from on playback to playback end. Further, as an example of a command string corresponding to this state change, a command for taking out a video tape, a command for turning OFF the power of the video set 103 and a command for turning OFF the power of the TV set 102 can be picked up.

Figure 33:
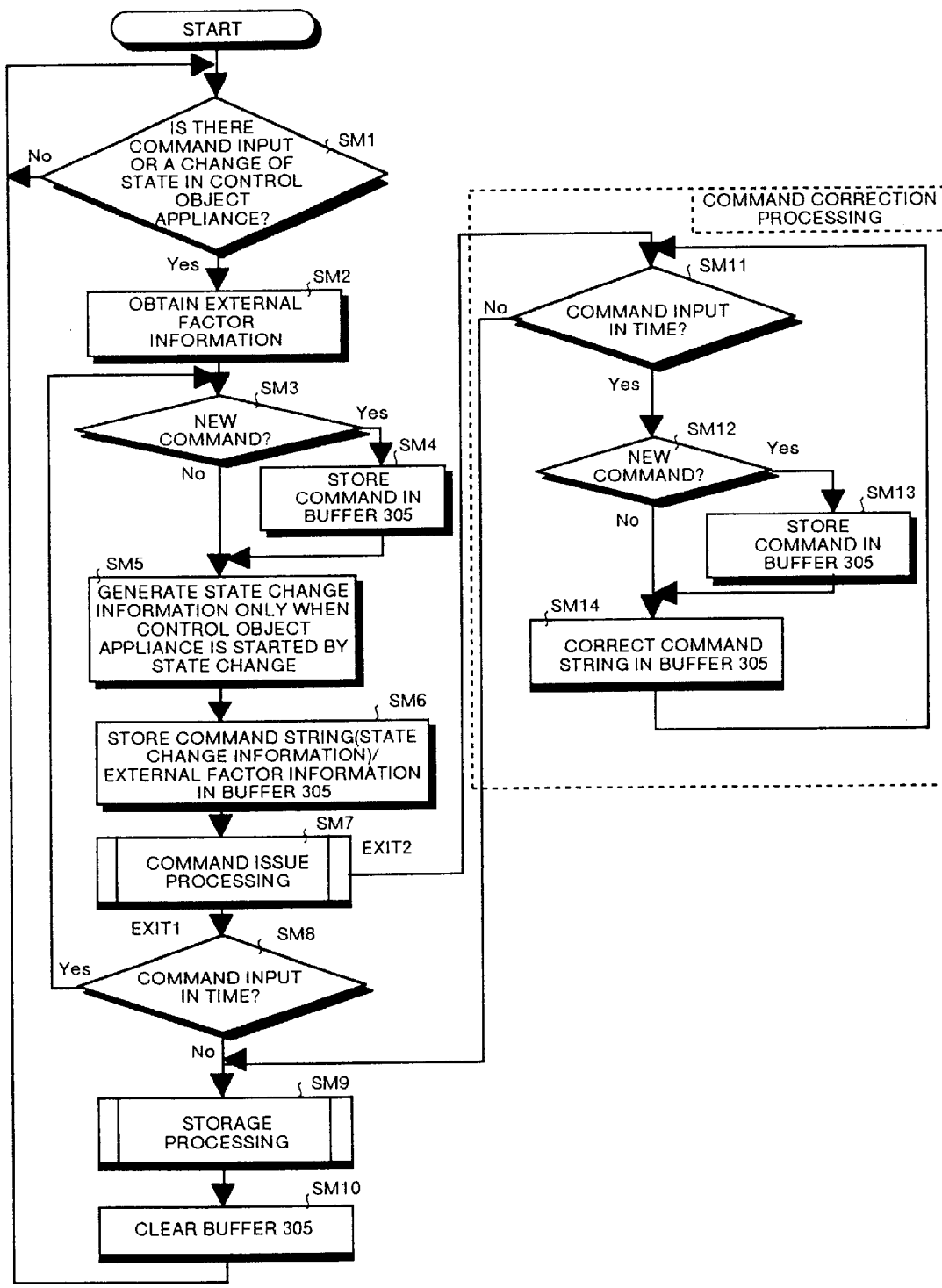
FIG. 33 is a flowchart for explaining an operation of the fifth embodiment.

Hereinafter, an operation of the fifth embodiment will be described with reference to FIG. 33. In FIG. 33, steps SM2 to SM4, steps SM8 to SM14 correspond to the steps SA2 to SA4 and steps SA8 to SA15 shown in FIG. 5. Further, in the fifth embodiment, the operation after a command is input to the command string analyzing section 303 (see FIG. 32) is the same as the first embodiment.

Further, in FIG. 32, it is assumed that the state of the video set 103 is on playback. The state of this video set 103 is monitored by the control object appliance state change monitor section 1001. With such a presumption, in step SM1 shown in FIG. 33, the command string analyzing section 303 determines whether or not a command issued from the remote controller group 200 is input via the signal analyzing section 302 or whether or not there is any state change in the control object appliance group 100 (in this case, video set 103) based on a monitor result of the control object appliance state change monitor section 1001. If the above determination result is No, the command string analyzing section 303 repeats the same determination.

Here, if the state of the video set 103 is changed from on playback to playback end, the command string analyzing section 303 adopts Yes as the determination result in step SM1 and the system control proceeds to step SM2. In step SM2, the command string analyzing section 303 obtains such external factor information as time, date, day and the like from the time/calendar section 304 and after that, the system control proceeds to step SM3. In step SM3, the command string analyzing section 303 determines whether or not a new command is input.

In this case, because no command is input, the determination result in step SM3 is No and the system control proceeds to step SM5.

In step SM5, the command string analyzing section 303 generates state information indicating a change of state of the control object appliance group 100 based on a monitor result of the control object appliance state change monitor section 1001. In this case, the command string analyzing section 303 generates state change information indicating a state change of the video set 103 (on playback to playback end) and after that, the system control proceeds to step SM6. Step SM5 is executed only when the determination result in step SM1 is Yes due to a trigger generated when the state of the control object appliance group 100 changes. Therefore, if the determination result in step SM1 is Yes because of command input then step SM5 is not performed.

In step SM6, the command string analyzing section 303 stores the state change information, with a correspondence to the obtained external factor information in the buffer 305. Consequently, in the next step SM7, the command issuing section executes command issue processing based on the state change information. More specifically, the command issuing section 308 refers to the aforementioned state change database and issues a command string corresponding to a given state change information, and then the system control proceeds to step SM8, after that the previously described operation is repeated.

In this case, the aforementioned command string is a command for taking out a video tape, a command for turning OFF the power of the video set 103 and a command for turning OFF the power of the TV set 102. Like the previously described operation, a command signal corresponding to the command string is transmitted from the transmitter 500 to the control object appliance group 100, so that a serial remote control on the item (A) to the item (C) is carried out.

(A) Taking out a video tape from the video set 103
(B) Turning OFF the power of the video set 103

(C) Turning OFF the power of the TV set 102

Although normally the serial remote controls from the item (A) to the item (C) is carried out based on a serial operation using the remote controller group 200, according to this fifth embodiment, this is carried out by the remote control device 1000. Therefore, according to the fifth embodiment, even if the user U goes to sleep when the video set 103 is in playback condition, a serial remote control after the playback ends is automatically carried out. Therefore, ease of use for the user is further improved.

Figure 34:
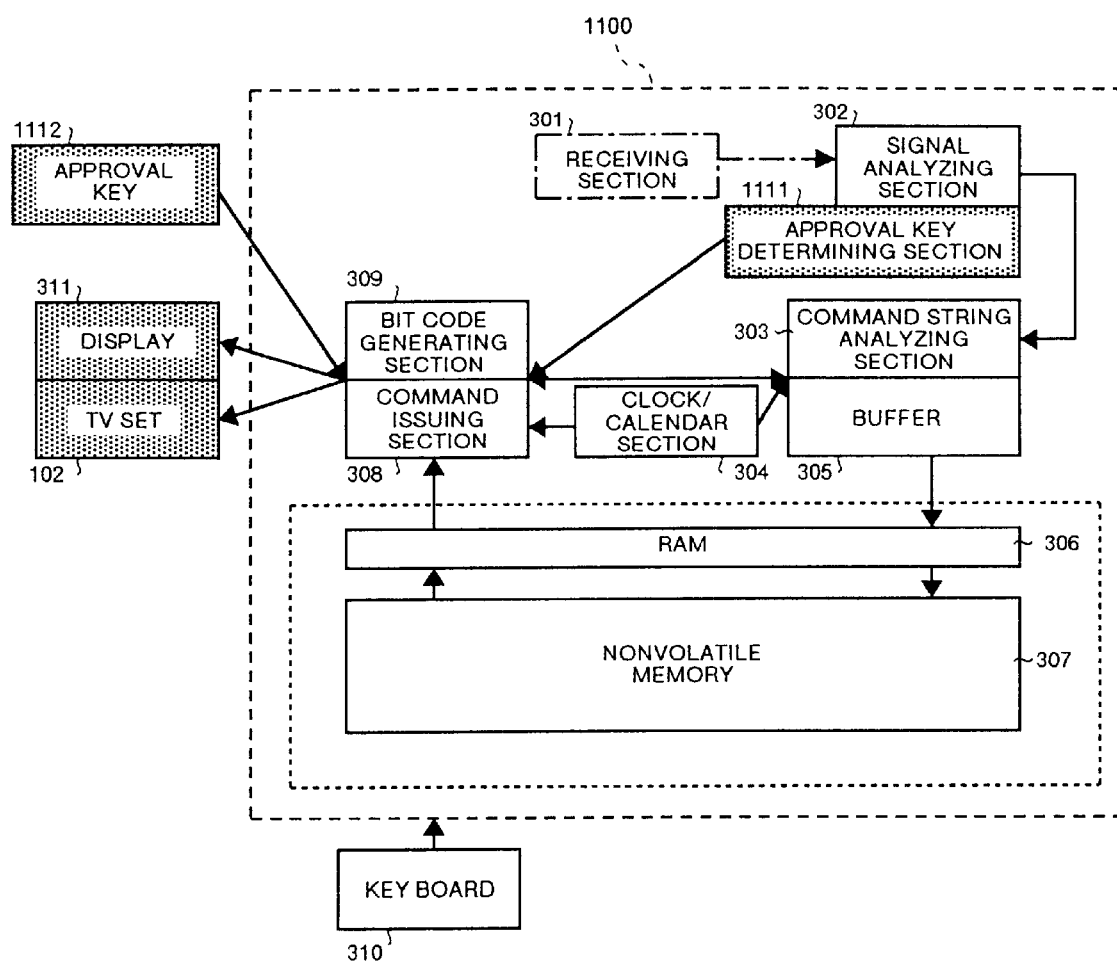
FIG. 34 is a block diagram showing a configuration of a sixth embodiment of the present invention.

FIG. 34 is a block diagram showing a configuration of the sixth embodiment of the present invention. In this Figure, the same reference numerals are attached to the sections corresponding to those of FIG. 2 and a description thereof is omitted. In FIG. 34, a remote control device 1100 is provided instead of the remote control device 300 shown in FIG. 2 and additionally, an approval key determining section 111 and an approval key 1112 are newly provided.

Figure 35:
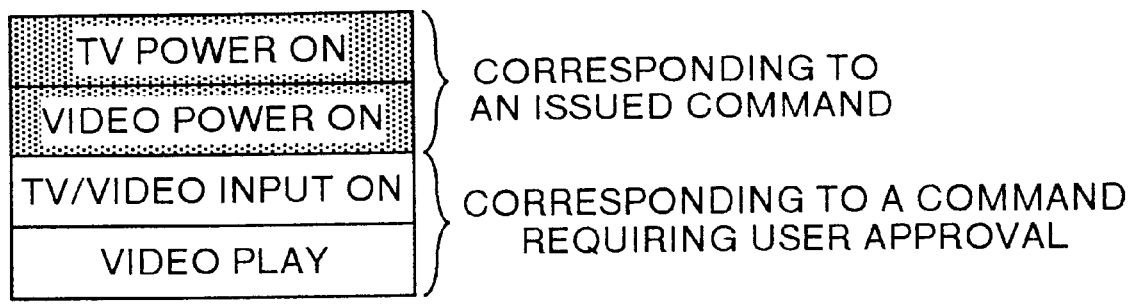
FIG. 35 is a diagram for explaining an operation of the sixth embodiment.

The sixth embodiment is so constructed that the estimated command is issued with an approval for issuance by the user before that estimated command is issued by the command issuing section 308. In FIG. 34, the display 311 (or TV set 102) displays the four character strings shown in FIG. 35 as an example, before the estimated command is issued under a control of the command issuing section 308. These four character strings are "TV power ON", "video power ON", "TV/video input ON" and "video play".

The above four character strings correspond to commands "T1", "V1", "T2" and "V2" for remote-controlling the control object appliance group 100 (in this case, TV set 102 and video set 103) shown in FIG. 2. A correspondence between the character string and command is shown below.

| <character string> | <command> |
|---|---|
| "TV power ON" | "T1" |
| "video power ON" | "V1" |
| "TV/video input ON" | "T2" |
| "video play" | "V2" |

A command string "T1V1T2V2" constituted of the above four commands "T1", "V1", "T2" and "V2" is an estimated command estimated by the command estimation processing. Further, the commands "T1" and "V1" are commands issued by the TV remote controller 202 and video remote controller 203 (see FIG. 2). Therefore, at this time, the powers of the TV set 102 and video set 103 are turned ON by the commands "T1" and "T2" respectively. On the other hand, the commands "T2" and "V2" are commands which are estimated to be issued from the command issuing section 308 and need an approval by the user before issuance.

In the remote control device 1100 shown in FIG. 34, the approval key determining section 1111 determines whether or not the approval key of the remote controller group 200 (see FIG. 2) is pressed based on a command signal input to the signal analyzing section 302. The approval key corresponds to a key operated last in the serial key operation in the remote controller group 200. This approval key is pressed by the user continuously over a predetermined time when an issuance of the above command is approved. Therefore, when there is a command signal input over a predetermined time, the approval key determining section 1111 determines a key corresponding to this command signal in the remote controller group 200 to be an approval key and transfers this determination result to the command issuing section 308.

According to the sixth embodiment, although a key in the remote controller group 200 is used as an approval key, it is permissible to provide with a dedicated approval key 1112. This approval key 1112 is pressed by the user when an issuance of a command is approved.

With the above structure, when each key of the TV remote controller 202 and video remote controller 203 is pressed in succession by the user, the above-mentioned commands "T1" and "V1" are issued in succession in the TV remote controller 202 and video remote controller 203. Consequently, command signals corresponding to the commands "T1" and "V1" are transmitted in succession from the TV remote controller 202 and video remote controller 203.

The command signals corresponding to the commands "T1" and "V1" are received in succession by the TV set 102 and video set 103 shown in FIG. 2. Consequently, after the power of the TV set 102 is turned ON, the power of the video set 103 is turned ON. At the same time, after the command signal is input to the signal analyzing section 302 via the receiving section 301, it is input to the command string analyzing section 303 as a command string "T1V1".

Then, through the above-described operation, "T1V1T2V2" is estimated as an estimated command by the command estimation processing by the command issuing section 308 based on the aforementioned command string "T1V1". Next, the command issuing section 308 displays the character string shown in FIG. 35 on the display 311 (or TV set 102) before the estimated command "T1V1T2V2" is issued. Consequently, the user recognizes such character strings as "TV power ON" and "video power ON" so as to confirm that the powers of the TV set 102 and video set 103 (see FIG. 2) are turned ON. Further, the user recognizes character strings "TV/video input ON" and "video play" and then determines whether or not a remote control corresponding to these character strings is a desired control.

When that remote control is a desired control, the user continues to press the key (approval key) of the video remote controller 203 over a predetermined time to approve an issuance of the aforementioned estimated command "T1V1T2V2". Consequently, the approval key determining section 1111 determines that the approval key is pressed and the command issuing section 308 issues the estimated command "T1V1T2V2". As a result, the TV set 102 and video set 103 are remote-controlled by the remote control device 1100. Meanwhile, as an approval behavior by the user, the approval key 1112 may be pressed.

On the other hand, when the remote control is not a desired control, in other words, when an issuance of the estimated command is not approved, the user does not press the approval key 1112, but presses, for example, a key of the video remote controller 203 corresponding to the desired remote control. As a result, through the above described operation, no estimated command is issued by the command issuing section 308, but a new estimated command is estimated based on a command corresponding to the pressed key. Then, before the above estimated command is issued, the command issuing section 308 displays a character string on the display 311 (or TV set 102) like the above described operation. After that, the user repeats an operation for pressing the approval key when the issuance of the estimated command is approved or pressing a key corresponding to the desired remote control when it is not approved.

As described above, according to the sixth embodiment, the estimated command is not issued only when the user approves it. Therefore, the accuracy of the estimated command is improved remarkably and a waste remote control can be avoided.

Meanwhile, according to the sixth embodiment, it is permissible to add character string data to be displayed on the display 311 (or TV set 102) to the database shown in FIG. 19 so that the character string is displayed using this database. Further, it is also permissible to use the database shown in FIG. 19 so that a content of a command is displayed in the form of a character string.

Next, the seventh embodiment of the present invention will be described with reference to FIG. 36 to FIG. 37B and FIG. 2. A hardware structure of the seventh embodiment is the same as that shown in FIG. 2. Further, according to the seventh embodiment, in a case where a serial operation is carried out by the user U using the remote controller group 200 shown in FIG. 2, plural steps of the key operations can be executed by a single key operation.

Next, an operation of the seventh embodiment will be described. Although the basic operation of the seventh embodiment is the same as the first operating example of the first embodiment described with reference to FIG. 5, according to the seventh embodiment, the command :estimation processing is carried out according to a flowchart shown in FIG. 36 instead of the flowchart shown in FIG. 7.

Figure 36:
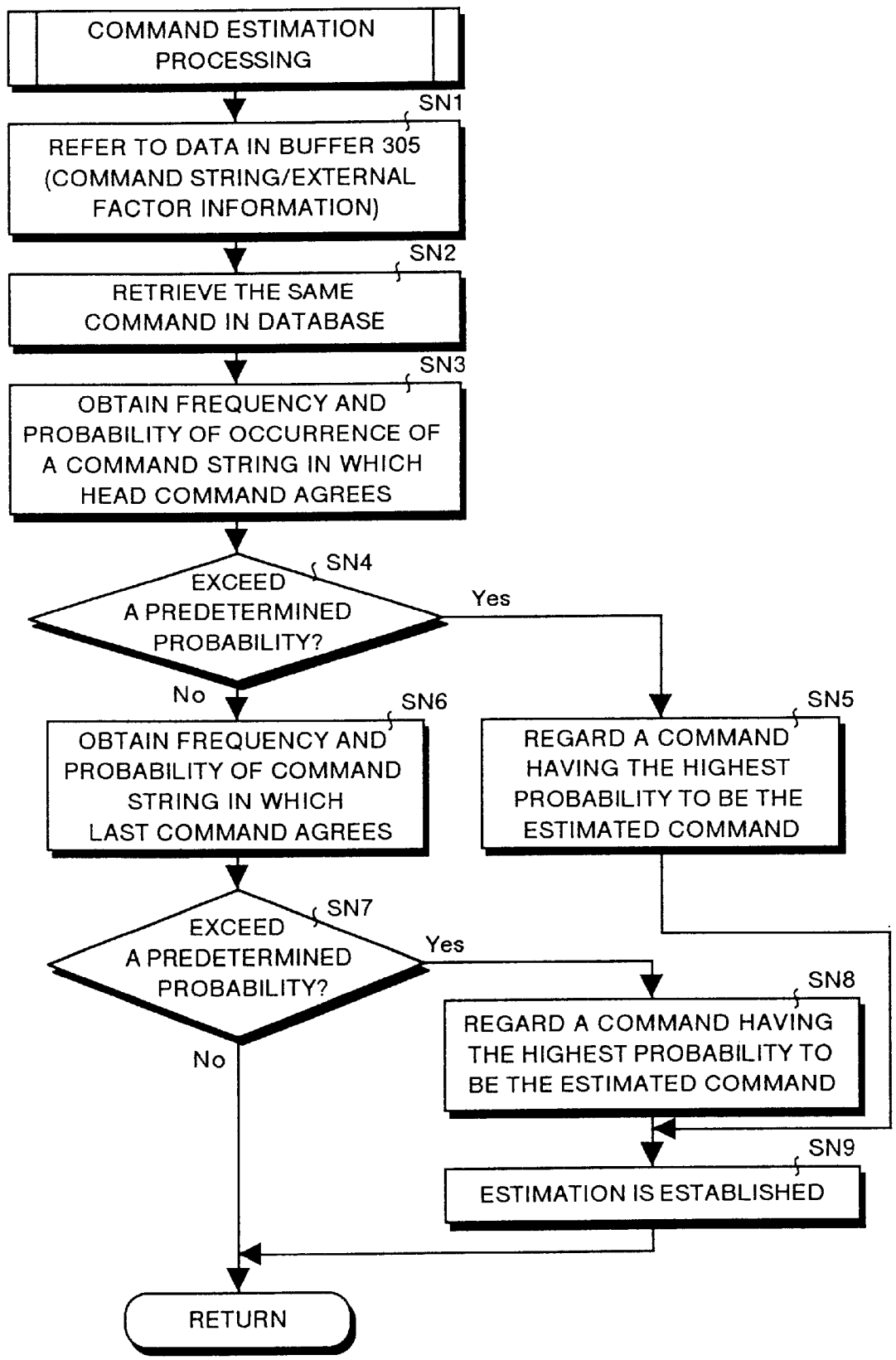
FIG. 36 is a flowchart for explaining a command estimation processing according to a seventh embodiment of the present invention.

Hereinafter, the command estimation processing according to the seventh embodiment will be described with reference to FIG. 36. It is assumed that the data base including the log shown in FIG. 37A is stored in the nonvolatile memory 307 shown in FIG. 2. The command string analyzing section 303 shown in FIG. 2 produces the database about a command string generation frequency list (see FIG. 37B) indicating a relation between a command string in the database (log) shown in FIG. 37A and a generation frequency of the command and then stores this in the nonvolatile memory 307. In this command string generation frequency list, respective command strings exist in the "command" column and data about the generation frequency of each given command string exists in "entire data" column.

Hereinafter, the command estimation processing will be described by taking a case in which the user U shown in FIG. 2 carries out the above serial remote control on the control object appliance group 100 by a single key operation using the remote controller group 200 as an example. In this case, the user U presses a key which is usually operated last of the serial key operation in the remote controller group 200.

An example of the serial key operation is, for example, upon playback using the video set 103, pressing the 'power' key of the TV remote controller 202, pressing the 'power' key of the video remote controller 203 and pressing the 'playback' key of the video remote controller 203, totaling three key operations. Therefore, a key which is usually operated last in the serial key operation is the "PLAYBACK" key of the video remote controller 203.

Here, if the 'playback' key of the above video remote controller 203 is pressed by the user U, a command "D1" corresponding to the above 'playback' key is issued in the video remote controller 203. Next, a command signal corresponding to the above command "D1" is transmitted from the video remote controller 203.

When the above command signal is received by the receiver 400 shown in FIG. 2, a command "D1" is input to the command string analyzing section 303 from the signal analyzing section 302. Then, the command estimation processing shown in FIG. 36 is carried out through the previously described operation. In step SN1 shown in FIG. 36, the command issuing section 308 refers to a command string (in this case, "D1") and external factor information stored in the buffer 305 and then the system control proceeds to step SN2.

In step SN2, the command issuing section 308 accesses the nonvolatile memory 307 and retrieves for a command string satisfying (condition 1) and (condition 2) in the database shown in FIG. 37B.

(Condition 1): A head command in a command string in the database (see FIG. 37B) and a command input to the command string analyzing section 303 must agree with each other.

(Condition 2): A last command in a command string in the database (see FIG. 37B) and a command input to the command string analyzing section 303 must agree with each other.

In the next step SN3, an occurrence frequency and probability of a command string satisfying (condition 1) are obtained based on a retrieval result in step SN2. In this case, because as evident from the item "command" of FIG. 37B, the head commands of all command strings are "A1", "A2", "B1" or "B2", there is no command string agreeing with the (condition 1). Therefore, as shown in item "agreement of head commands upon input of D1, the occurrence frequency and probability of a command string satisfying (condition 1) are all zero.

In the next step SN4, the command issuing section 308 determines whether or not the probability of occurrence of agreement of the head commands obtained in step SN3 exceeds a predetermined probability (for example, 55%). In this case, because all the probabilities of occurrence are 0%, the command issuing section 308 adopts No as a determination result in step SN4 and the system control proceeds to step SN6.

In step SN6, the occurrence frequency and probability of a command string satisfying (condition 2) are obtained based on a retrieval result in step SN2. In this case, as evident from the item "command" of FIG. 37B, because a last command of the command strings "A1A2D1" and "B1D1" is "D1", these command strings "A1A2D1" and "B1D1" satisfy (condition 2). As shown in the item "agreement of a last command upon input of D1" of the same figure, the command issuing section 308 obtains three times as the occurrence frequency of the command string "A1A2D1" and 75% (¾) as the probability of occurrence, and then obtains one time as the occurrence frequency of the command string "B1D1" and 25% (¼) as the probability of occurrence, and after that, the system control proceeds to step SN7.

In the next step SN7, the command issuing section 308 determines whether or not the probability of occurrence of agreement of the last command obtained in step SN6 exceeds a predetermined probability (for example, 55%). In this case, because the probability of occurrence of the command string "A1A2D1" is 75%, the command issuing section 308 adopts Yes as a determination result in step SN7 and the system control proceeds to step SN8. In step SN8, the command issuing section 308 adopts a command string having the highest probability of command strings exceeding the predetermined probability in step SN7 as an estimated command and then the system control proceeds to step SN9. In this case, the estimated command is a command string "A1A2D1".

In step SN9, the command issuing section 308 establishes the above estimated command. Through the above described operation, the command issuing section 308 shown in FIG. 2 issues the above estimated command ("A1A2D1"). Then, a command signal corresponding to the estimated command ("A1A2D1") is transmitted from the transmitter 500 to the control object appliance group 100 so as to automatically achieve the serial remote control. In this case, after initially the TV set 102 is turned ON, the power of the video set 103 is turned ON. Finally, playback on the video set 103 is carried out. As described above, according to the seventh embodiment, one-touch function is achieved in which a serial remote control is automatically carried out by only a single key operation (pressing of the "PLAYBACK" key), thereby ease of use for the user being improved remarkably.

Figure 38:
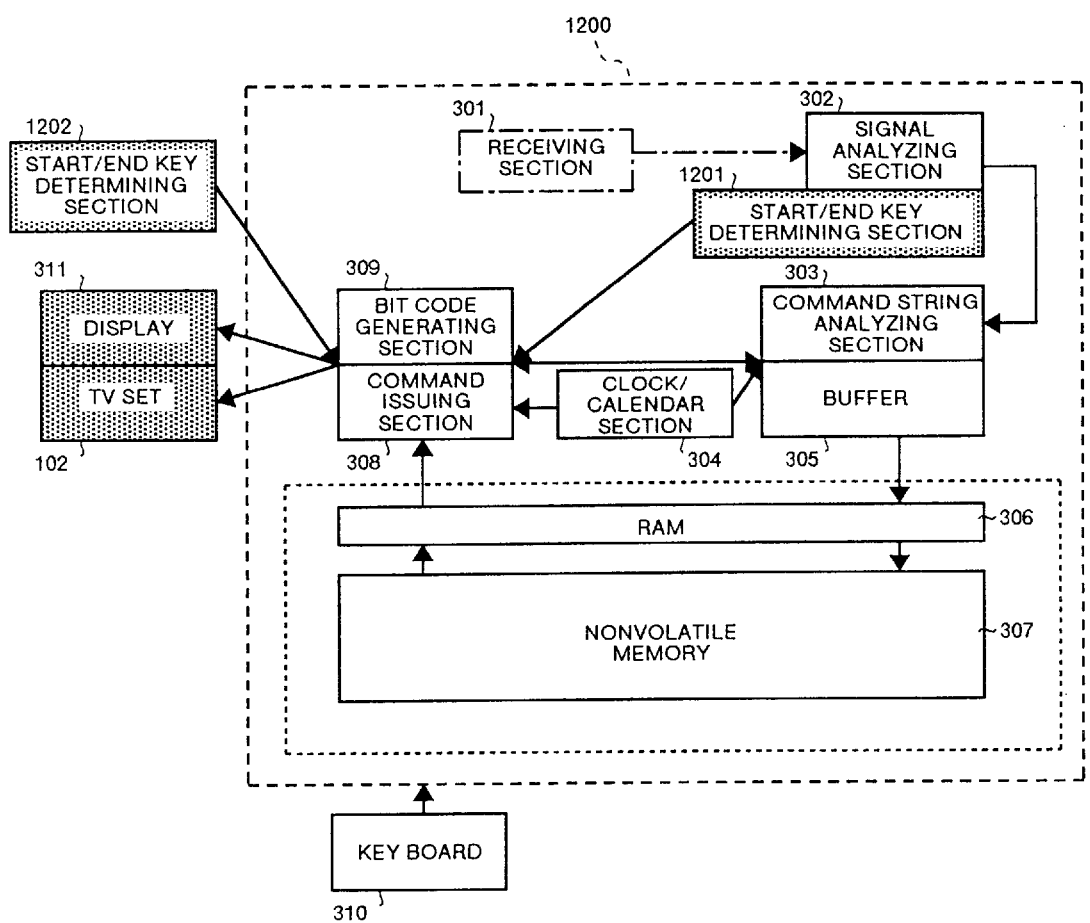
FIG. 38 is a block diagram showing a configuration of an eighth embodiment of the present invention.

FIG. 38 is a block diagram showing a configuration of the eighth embodiment of the present invention. In this Figure, the same reference numerals are attached to the sections corresponding to those of FIG. 2 and a description thereof is omitted. In FIG. 38, a remote control device 1200 is provided instead of the remote control device 300 shown in FIG. 2 and further, a start/end key determining section 1201 and a start/end key 1202 are newly provided.

The eighth embodiment is intended for achieving a schedule operation for automatically issuing a command based on a serial key operation to be carried out as a routine work at a particular time and on a particular day according to the database containing the commands and external factor information (time, date) shown in FIG. 15A at the above particular time and day. As the above routine work, for example, in order to record a TV program to be broadcast at 21:00 every Monday, various keys of the TV set remote controller 202 and video set remote controller 203 are continuously operated.

In FIG. 38, the display 311 (or TV set 102) displays that the above schedule operation is started or ended for the user. The start/end key determining section 1201 of the remote control device 1200 determines whether or not the start/end key of the remote controller group 200 (see FIG. 2) is pressed based on a command signal input to the signal analyzing section 302. The above start/end key corresponds to a predetermined key of the remote controller group 200. This start/end key is pressed by the user when a start or end of the above schedule operation is instructed.

Further, although according to the eighth embodiment, a predetermined key of the remote controller group 200 is used as the start/end key, it is permissible to provide a dedicated start/end key 1202. This start/end key 1202 is pressed by the user when a start or an end of the schedule operation is instructed.

Next, an operation of the eighth embodiment will be described with reference to a flowchart shown in FIG. 39 and FIG. 40. With the schedule operation ended, in step SO1 shown in FIG. 39, the command issuing section 308 determines whether or not the start of the schedule operation is instructed by referring to the start/end key determining section 1201 or start/end key 1202. If the determination result is No, the same determination is repeated. Here, if the user presses the start/end key 1202 to instruct the start of the schedule operation, the command issuing section 308 adopts Yes as the determination result in step SO1 and the system control proceeds to step SO2.

Figure 40:
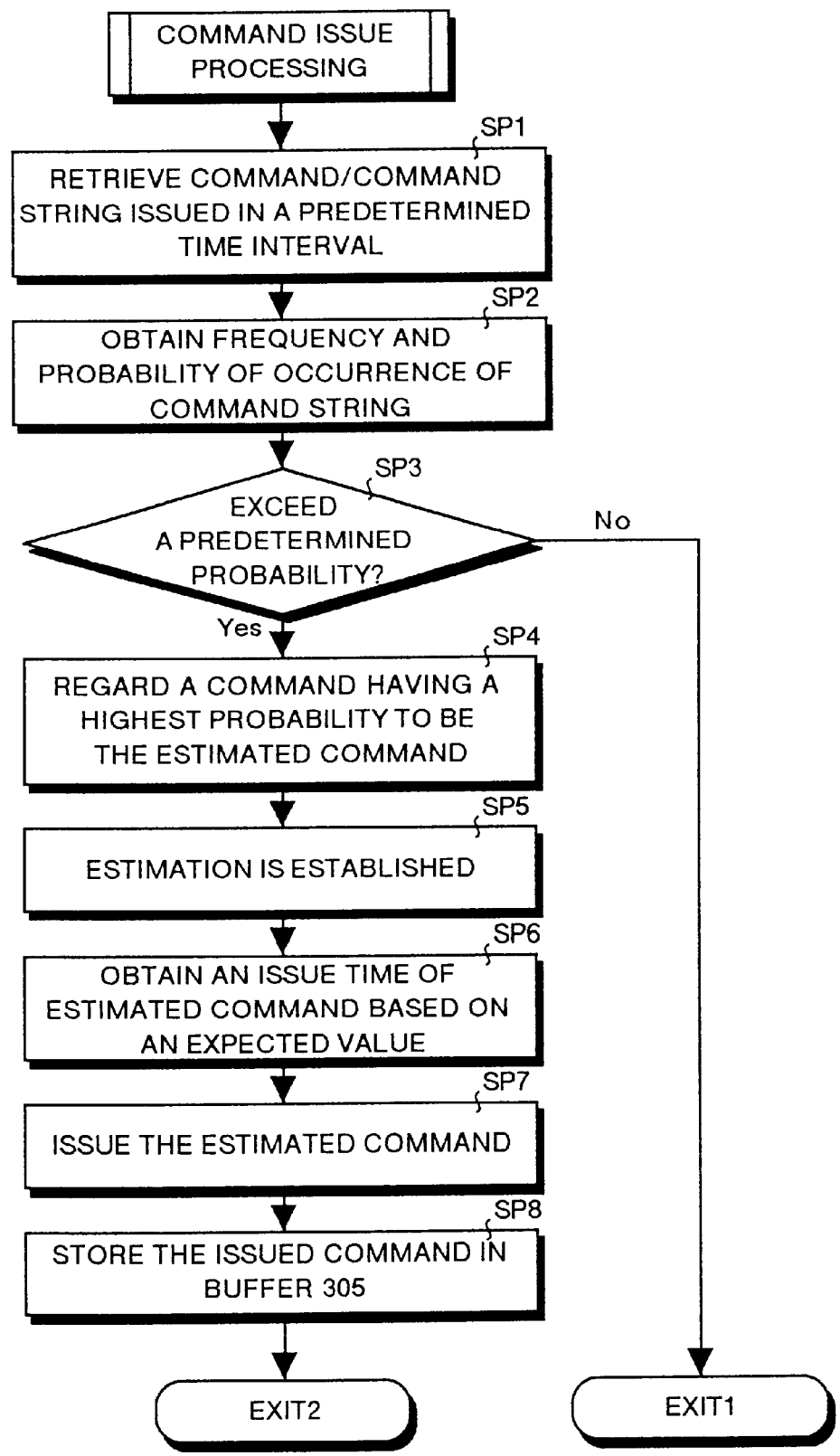
FIG. 40 is a flowchart for explaining the command issue processing shown in FIG. 39.

In step SO2, the command issuing section 308 obtains external factor information such as current time, weekly data and the like from the clock/calendar section 304, stores them in the buffer 305 and the system control proceeds to step SO3, in which the command issue processing shown in FIG. 40 is carried out. In step SP1 shown in FIG. 40, the command issuing section 308 refers to the database shown in FIG. 15A so as to retrieve a command/command string issued in a time interval of five minutes (10 minutes) before and after the current time and the system control proceeds to SP2.

In step SP2, the command issuing section 308 obtains an occurrence frequency and probability of occurrence of the command/command string only within the above time interval for each command/command string. The probability of occurrence obtained here is probability of occurrence of a command/command string corresponding to a routine work to be performed every day. Further, the command issuing section 308 obtains a frequency and probability of occurrence of a command/command string only within the time interval and on current day for each command/command string. The probability of occurrence obtained here is probability of occurrence of a command/command string corresponding to a routine work to be performed on a particular day of the week.

Figure 39:
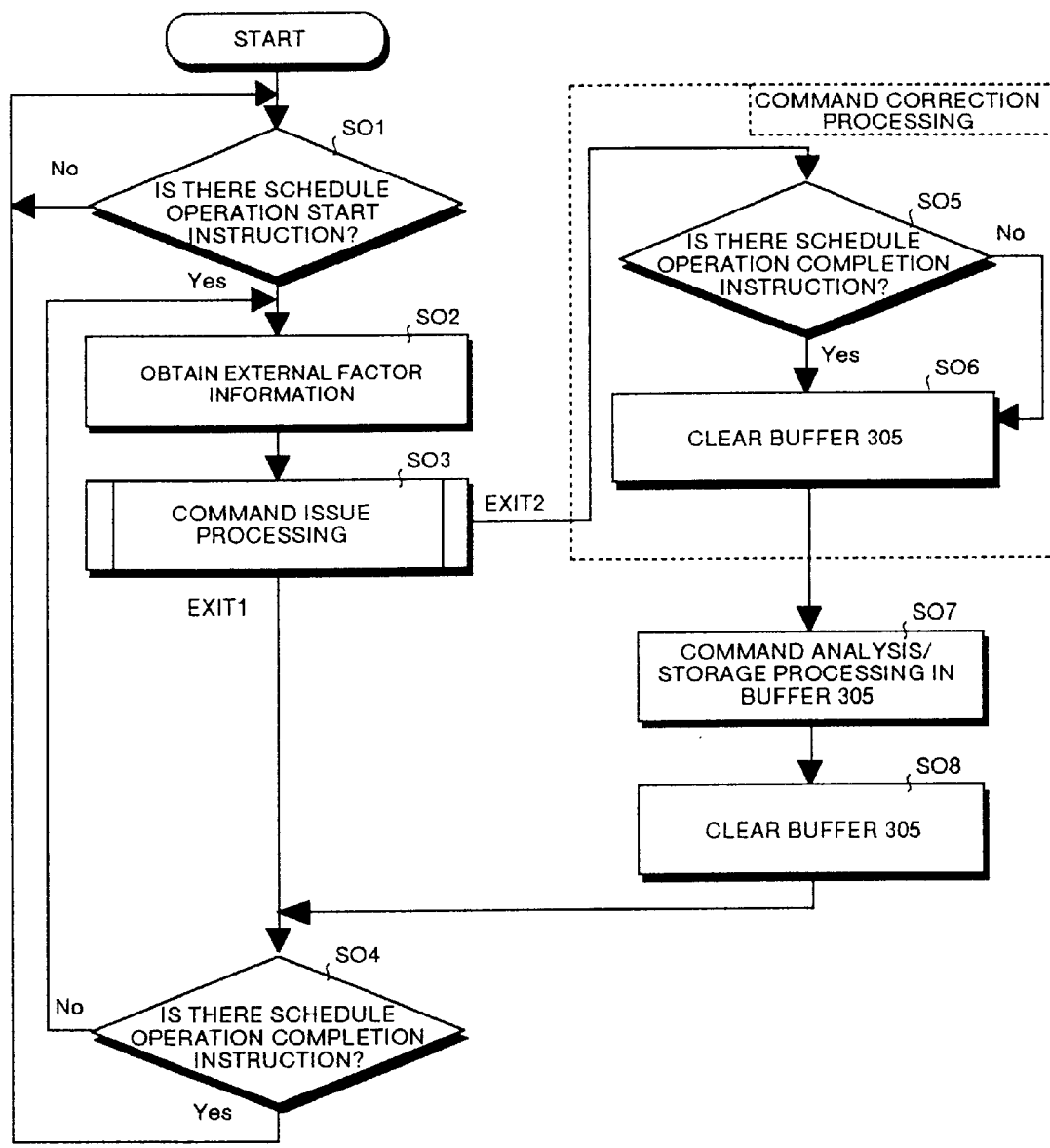
FIG. 39 is a flowchart for explaining an operation of the eighth embodiment.

In the next step SP3, the command issuing section 308 determines whether or not a probability of occurrence obtained in step SP2 exceeds a predetermined probability and if this determination result is No, the system control proceeds to step SO4 shown in FIG. 39. In step SO4, the command issuing section 308 determines whether or not an end of the schedule operation is instructed by referring to the start/end key determining section 1201 or start/end key 1202. If this determination result is Yes, the processing is returned to step SO1. If the determination result is No, the command issuing section 308 returns to step SO2.

On the other hand, when the determination result in step SP3 shown in FIG. 40 is Yes, the command issuing section 308 proceeds to step SP4 and adopts a command/command string having the highest probability of occurrence as an estimated command. Then, the system control proceeds to step SP5. In step SP5, the command issuing section 308 establishes the estimated command and after that, the system control proceeds to step SP6. In step SP6, the command issuing section 308 obtains an estimated command issue time based on an expected value from previous data and then the system control proceeds to step S27.

In step SP7, when an issue time obtained in step SP6 is reached, the command issuing section 308 issues an estimated command. As a result, a command signal is transmitted to the control object appliance group 100 through the previously described operation, so that the control object appliance group 100 is remote-controlled according to a schedule. In the next step SP8, the command issuing section 308 stores the issued estimated command in the buffer 305.

In step SO5 shown in FIG. 39, the command string analyzing section 303 determines whether or not an additional command is input within a predetermined time since the estimated command is issued in step SP7 and if the determination result is No, the system control proceeds to step SO7.

If that given schedule is not a desired schedule, the user inputs an additional command. As a result, the command string analyzing section 303 adopts Yes as the determination result in step SAO5 and the system control proceeds to step SO6. In step SO6, the command analyzing section 303 clears the buffer 305 and then the system control proceeds to step SO7. By carrying out command abolish processing of step SO5 and step SO6, the accuracy of the schedule operation is improved.

In this case, in step SO7, the command string analyzing section 303 analyzes the estimated command stored in the buffer 305 and registers it with external factor information (time, date) in the database (see FIG. 15A) of the nonvolatile memory 307. In the next step SO8, the command string analyzing section 303 clears the buffer 305. In step SO4, the command string analyzing section 303 determines whether or not an end of the schedule operation is instructed by referring to the start/end key determining section 1201 or start/end key 1202. If this determination result is Yes, the processing is returned to step SO1. If the determination result in step SO4 is No, the command issuing section 308 returns to step SO2, in which the above step is repeated. After that, remote control on the control object appliance group 100 is carried out according to a schedule estimated based on the database (see FIG. 15A).

Meanwhile, according to the eighth embodiment, it is permissible to store data about a single command (for example, command "A1") in the database shown in FIG. 16 in the nonvolatile memory 307 and estimate a schedule based on this database so as to carry out the above schedule operation. In this case, the processing time is reduced by the retrieval time of step SP1 (FIG. 40).

As described above, according to the eighth embodiment, a command necessary for the schedule operation is automatically issued according to a predetermined schedule based on a database. Therefore, there is no necessity of achieving troublesome schedule setup on the user's side, so that ease of use for the user is further improved.

Although the first to eighth embodiments of the present invention have been described in detail with reference to the drawings, a concrete structure is not restricted to these first to eighth embodiments and modifications not departing from the gist of the present invention are included in the present invention. For example, although plural examples have been described about each of the first to eighth embodiments, combinations of these concrete examples, are also included in the present invention.

Figure 41:
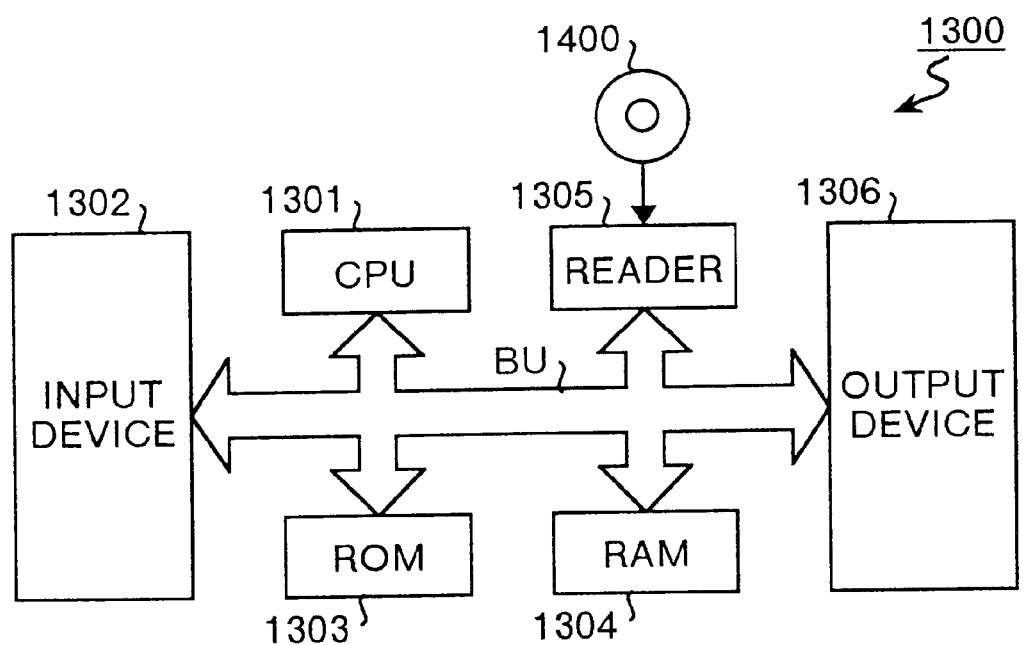
FIG. 41 is a block diagram showing a modification of the first to eighth embodiments of the present invention.

According to the first to eighth embodiments of the present invention, it is permissible to record a remote control program for remote-controlling the control object appliances in a computer readable recording medium 1400 shown in FIG. 41 and have the remote control program recorded in the recording medium 1400 read by the computer 1300 shown in the same Figure and execute that program so as to achieve the remote control. In this case, the transmitter 500 and receiver 400 shown in FIG. 2 are connected to the computer so as to transmit/receive a command signal.

The computer 1300 shown in FIG. 41 comprises a central processing device (CPU) 1301 for carrying out the above remote control program, an input device 1302 such as a keyboard, mouse and the like, a read only memory (ROM) 1303 for storing various data, RAM 1304 for storing computation parameter and the like, a reader 1305 for reading a remote control program from the recording medium 1400, an output device 1306 such as a display, printer and the like, and a bus BU for connecting those respective parts.

After the CPU 1301 reads a remote control program stored in the recording medium 1400 via the reader 1305, it executes the remote control program so as to remote-control the control object appliances. The recording medium 1400 includes not only a portable recording medium such as optical disk, floppy disk, hard disk and the like, but also a transmitting medium for holding data temporarily like a network.

According to the first aspect, as described above, a monitoring result of commands issued from the plurality of the command issuing units is held as a command string in the database and a command to be issued from the plurality of the command issuing units based on this database is automatically issued by the estimated command issuing unit. Thus, ease of use by the user can be improved without a necessity of troublesome registering operation on the user side.

According to the second aspect of the invention, a monitoring result on commands issued from the plurality of command issuing units is held in the database with time information (for example, time, day, date) and based on this database, commands to be issued from the plurality of the command issuing unit are estimated with time information as one of determining criteria. Thus, the accuracy of an estimated command can be improved and further ease of use by the user can be improved.

According to the third aspect of the invention, by referring to the content of a command as one of determining criteria, a command can be estimated based on an effective command string, so that the accuracy of the estimated command can be improved.

According to the fourth embodiment, by carrying out a procedure which is usually performed last at first of a serial operation, the serial remote control operation is automatically carried out by a single operation. Therefore, ease of use by the user can be improved remarkably.

According to the fifth aspect of the invention, the estimated command is not issued until the user's approval is obtained. Therefore, the accuracy of the estimated command can be improved remarkably and a waste remote control can be avoided.

According to the sixth aspect of the invention, a dedicated database is provided for each user. Therefore, as compared to a case in which a single database is shared by a plurality of users, the command estimation can be done with the user's own interest and active pattern reflected, thereby the accuracy of the estimated command being improved.

According to the seventh aspect of the invention, the command estimation is carried out considering the state of the control object appliance. Therefore, the command estimation can be carried out accurately, thereby the reliability being improved.

According to the eighth aspect of the invention, a command is automatically issued according to the issue schedule based on the database, so that a troublesome schedule setting does not have to be carried out on the user side, thereby ease of use by the user being further improved.

According to the ninth aspect of the invention, a command monitoring result issued from the plurality of the command issuing units is held in the database as a command string and based on this database, a command string to be issued from the plurality of the command issuing units is automatically issued in the estimated command issuing step. Therefore, ease of use by the user can be improved without a necessity of complicated registering operation on the user side.

According to the tenth aspect of the invention, a command is automatically issued according to the issue schedule based on the database. Therefore, a troublesome schedule setting does not have to be carried out on the user side, thereby ease of use by the user being further improved.

Altough the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A remote control device for use in a remote control system having a plurality of control object appliances to be remote-controlled based on a command or signal issued from each of a plurality of command issuing units, said remote control device comprising:

a monitoring unit for monitoring a command or signal issued from each of the plurality of said command issuing units;

a database registering unit for registering a plurality of commands or signals issued continuously in a database as a command string based on the result of monitoring by said monitoring unit;

an estimating unit for retrieving a command string when a command or signal is issued from the plurality of said command issuing units containing the command or signal from the database and estimating a command or signal to be issued from the plurality of said command issuing units based on a retrieval result; and an estimated command issuing unit for issuing a command or signal estimated by said estimating unit to the plurality of said control object appliances.

2. The remote control device according to claim 1 further comprising a time information generating unit for generating time information, wherein said database registering unit registers the command string with said time information upon monitoring in the database and said estimating unit estimates said command or signal with the time information upon estimation and the time information upon monitoring as a determining criterion.

3. The remote control device according to claim 1, wherein said estimating unit narrows down the retrieval result with a content of the command or signal as one of determining criteria and estimates the command or signal based on the narrowed retrieval result.

4. The remote control device according to claim 1, wherein when a command or signal is issued from the plurality of said command issuing units, said estimating unit retrieves a command string containing this command or signal from the database and based on the retrieval result, estimates a command or signal to be issued by the plurality of said command issuing units.

5. The remote control device according to claim 1 further comprising an approval unit for obtaining an approval about an issuance of a command or signal estimated by said estimating unit from a user, wherein only when an approval by the user is obtained via said approval unit, said estimated command issuing unit issues a command or signal estimated by said estimating unit to the plurality of said control object appliances.

6. The remote control device according to claim 1 further comprising a user specifying unit for specifying a particular user for operating the plurality of said command issuing units from a plurality of users, wherein said database registering unit registers a plurality of commands or signals issued continuously based on a monitoring result of said monitoring unit in a database dedicated for user specified by said user specifying unit as a command string and said estimating unit retrieves a command string containing this command or signal from the database dedicated for said user and estimates a command or signal issued by the plurality of said command issuing units based on the retrieval result.

7. The remote control device according to claim 1 further comprising a state information obtaining unit for obtaining states of the plurality of said control object appliances as a state information, wherein said estimating unit estimates the command or signal with said state information as one of the determining criteria.

8. A remote control device for use in a remote control system having a plurality of control object appliances to be remote-controlled based on a command or signal issued from each of the plurality of command issuing units, said remote control device comprising:

a time information generating unit for generating a time information;

a monitoring unit for monitoring a command or signal issued from each of the plurality of said command issuing units;

a database registering unit for registering the command or signal as well as the time information upon monitoring in a database based on a monitoring result of said monitoring unit;

a schedule estimating unit for estimating an issue schedule for commands or signals to be issued by the plurality of said command issuing units with the time information based on the database as one of the criteria; and an estimated command issuing unit for issuing a command or signal to the plurality of said control object appliances according to the issue schedule.

9. A computer readable recording medium for recording a remote control program to be applied to a remote control system having a plurality of control object appliances subjected to remote control based on a command or signal issued from a plurality of command issuing unit, said remote control program performing:

monitoring a command or signal issued from each of the plurality of said command issuing units;

registering a plurality of commands or signals issued continuously in a database as a command string based on the result of monitoring in said monitoring;

retrieving a command string when a command or signal is issued from the plurality of said command issuing units containing the command or signal from the database and estimating a command or signal to be issued from the plurality of said command issuing units based on the retrieval result; and issuing a command or signal estimated in said estimating to the plurality of said control object appliances.

10. A computer readable recording medium for recording a remote control program to be applied to a remote control system having a plurality of control object appliances subjected to remote control based on a command or signal issued from each of a plurality of command issuing units, said remote control program performing:

generating a time information;

monitoring a command or signal issued from the plurality of said command issuing units;

registering the command or signal as well as the time information upon monitoring in a database based on a monitoring result in said monitoring;

estimating an issue schedule for commands or signals to be issued by each of the plurality of said command issuing units with the time information based on the database as one of criteria; and issuing a command or signal to the plurality of said control object appliances according to the issue schedule.

11. A method for recording a remote control program to be applied to a remote control system having a plurality of control object appliances subjected to remote control based on a command or signal issued from a plurality of command issuing unit, said method comprising:

monitoring a command or signal issued from each of the plurality of said command issuing units;

registering a plurality of commands or signals issued continuously in a database as a command string based on the result 0o monitoring in said monitoring;

retrieving a command string when a command or signal is issued from the plurality of said command issuing units containing the command or signal from the database and estimating a command or signal to be issued from the plurality of said command issuing units based on the retrieval result; and issuing a command or signal estimated in said estimating to the plurality of said control object appliances.

12. A method for recording a remote control program to be applied to a remote control system having a plurality of control object appliances subjected to remote control based on a command or signal issued from each of a plurality of command issuing units, said method comprising:

generating a time information;

monitoring a command or signal issued from the plurality of said command issuing units;

registering the command or signal as well as the time information upon monitoring in a database based on a monitoring result in said monitoring;

estimating an issue schedule for commands or signals to be issued by each of the plurality of said command issuing units with the time information based on the database as one of criteria; and issuing a command or signal to the plurality of said control object appliances according to the issue schedule.

* * * * *

UNITED STATES PATENT AND TRADEMARK OFFICE
CERTIFICATE OF CORRECTION

PATENT NO.    : 6,469,751 B1
DATED         : October 22, 2002
INVENTOR(S)   : Yasuhiko Isobe et al.

It is certified that error appears in the above-identified patent and that said Letters Patent is hereby corrected as shown below:

<u>Column 42,</u>
Line 67, change "$O_o$" to -- of --.

Signed and Sealed this

Twenty-fifth Day of March, 2003

JAMES E. ROGAN
*Director of the United States Patent and Trademark Office*